United States Patent
Suryanarayana et al.

(10) Patent No.: US 10,481,927 B2
(45) Date of Patent: Nov. 19, 2019

(54) APPARATUS AND METHODS FOR MANAGING WIDGETS IN A WIRELESS COMMUNICATION ENVIRONMENT

(71) Applicant: QUALCOMM Incorporated, San Diego, CA (US)

(72) Inventors: Lalitha Suryanarayana, San Diego, CA (US); Giridhar D. Mandyam, San Diego, CA (US); Christophe G. Bernard, San Diego, CA (US); Kevin E. Hunter, Del Mar, CA (US); Noam Raffaelli, Middlesex (GB)

(73) Assignee: QUALCOMM Incorporated, San Diego, CA (US)

( * ) Notice: Subject to any disclaimer, the term of this patent is extended or adjusted under 35 U.S.C. 154(b) by 1033 days.

(21) Appl. No.: 14/825,977

(22) Filed: Aug. 13, 2015

(65) Prior Publication Data

US 2015/0346993 A1     Dec. 3, 2015

Related U.S. Application Data

(62) Division of application No. 12/407,559, filed on Mar. 19, 2009, now Pat. No. 9,110,685.

(51) Int. Cl.
*G06F 3/0484* (2013.01)
*G06F 9/451* (2018.01)
*G06F 8/65* (2018.01)

(52) U.S. Cl.
CPC .............. *G06F 9/451* (2018.02); *G06F 8/65* (2013.01)

(58) Field of Classification Search
CPC .......... G06F 9/4443; G06F 8/65; G06F 9/451; G06F 3/0484; G06F 8/38; G06F 9/44; Y10S 715/967; H04L 67/34
See application file for complete search history.

(56) References Cited

U.S. PATENT DOCUMENTS

| | | |
|---|---|---|
| 5,329,360 A | 7/1994 | Gillard et al. |
| 5,333,063 A | 7/1994 | Yoo |

(Continued)

FOREIGN PATENT DOCUMENTS

| | | |
|---|---|---|
| CN | 1449219 A | 10/2003 |
| CN | 1758794 A | 4/2006 |

(Continued)

OTHER PUBLICATIONS

Boloix G., et al., "Framework for Evaluating Quality and Sophistication of Software", Nikkei Electronics, No. 657, Mar. 11, 1996, pp. 163-178.

(Continued)

*Primary Examiner* — Oanh Duong
(74) *Attorney, Agent, or Firm* — Muncy, Geissler, Olds & Lowe, P.C.

(57) ABSTRACT

Apparatus and methods relating to mobile widgets. In particular, apparatus and methods for integrating network services and/or network resources with widget capabilities, managing mobile widgets, providing portability to mobile widgets, and generating content with respect to a mobile widget. In one aspect, a method for integration of network services and/or resources with widget capabilities is provided. The method may include providing for an interface between a widget management component and at least one of a network resource or a network service. The method may also include accessing, at the widget management component via the interface, at least one of a network resource or network service. Further, the method may include integrating the network resource or the network service with a widget functionality.

19 Claims, 35 Drawing Sheets

(56) References Cited

U.S. PATENT DOCUMENTS

| | | |
|---|---|---|
| 5,375,068 A | 12/1994 | Palmer et al. |
| 5,386,568 A | 1/1995 | Wold et al. |
| 5,563,649 A | 10/1996 | Gould et al. |
| 5,617,467 A | 4/1997 | Bacher et al. |
| 5,786,815 A | 7/1998 | Ford |
| 5,894,473 A | 4/1999 | Dent |
| 5,936,616 A | 8/1999 | Torborg, Jr. et al. |
| 6,049,330 A | 4/2000 | Redford |
| 6,064,771 A | 5/2000 | Migdal et al. |
| 6,125,283 A | 9/2000 | Kolev et al. |
| 6,237,004 B1 | 5/2001 | Dodson et al. |
| 6,289,382 B1 | 9/2001 | Bowman-Amuah |
| 6,324,651 B2 | 11/2001 | Kubik et al. |
| 6,434,447 B1 * | 8/2002 | Shteyn .................. G06F 3/033 700/245 |
| 6,441,833 B1 | 8/2002 | Anderson et al. |
| 6,587,129 B1 | 7/2003 | Lavendel et al. |
| 6,608,841 B1 | 8/2003 | Koodli |
| 6,728,208 B1 | 4/2004 | Puuskari |
| 6,925,609 B1 | 8/2005 | Lucke |
| 6,996,393 B2 | 2/2006 | Pyhalammi et al. |
| 6,996,537 B2 | 2/2006 | Minear et al. |
| 7,030,890 B1 | 4/2006 | Jouet et al. |
| 7,054,954 B2 | 5/2006 | Kalliokulju |
| 7,200,390 B1 | 4/2007 | Henager et al. |
| 7,227,900 B2 | 6/2007 | Porter et al. |
| 7,304,585 B2 | 12/2007 | Suomela et al. |
| 7,379,731 B2 | 5/2008 | Natsuno et al. |
| 7,499,878 B2 | 3/2009 | Janakiraman et al. |
| 7,523,331 B2 | 4/2009 | Van Der Heijden |
| 7,587,486 B2 | 9/2009 | Taniguchi |
| 7,596,389 B2 | 9/2009 | Tsuda et al. |
| 7,660,871 B2 | 2/2010 | Koh et al. |
| 7,672,690 B2 | 3/2010 | Hsu et al. |
| 7,711,806 B1 | 5/2010 | Roka et al. |
| 7,734,285 B2 | 6/2010 | Chmaytelli et al. |
| 7,743,336 B2 | 6/2010 | Louch et al. |
| 7,831,670 B2 | 11/2010 | Goodman et al. |
| 7,873,908 B1 | 1/2011 | Varanasi et al. |
| 7,886,229 B2 | 2/2011 | Pachet |
| 7,890,572 B2 | 2/2011 | Goodman et al. |
| 7,917,858 B2 | 3/2011 | Pereira et al. |
| 7,948,817 B2 | 5/2011 | Coteus et al. |
| 7,957,691 B1 | 6/2011 | Lee |
| 7,983,711 B2 | 7/2011 | Juneja et al. |
| 8,010,095 B2 | 8/2011 | Natsuno et al. |
| 8,086,225 B2 | 12/2011 | Lee |
| 8,131,271 B2 | 3/2012 | Ramer et al. |
| 8,131,875 B1 | 3/2012 | Chen et al. |
| 8,195,133 B2 | 6/2012 | Ramer et al. |
| 8,196,112 B1 * | 6/2012 | Cansizlar .......... G06F 17/30905 717/116 |
| 8,271,889 B1 | 9/2012 | Beckert et al. |
| 8,522,132 B2 | 8/2013 | Caceres |
| 8,522,269 B2 | 8/2013 | Dharmaji |
| 8,539,476 B2 | 9/2013 | Goring et al. |
| 8,589,893 B1 | 11/2013 | Allen |
| 8,667,415 B2 | 3/2014 | Rudolph et al. |
| 9,037,984 B2 | 5/2015 | Park et al. |
| 9,069,575 B2 | 6/2015 | Mandyam et al. |
| 9,110,685 B2 | 8/2015 | Suryanarayana et al. |
| 9,323,515 B1 | 4/2016 | Daley et al. |
| 9,417,888 B2 | 8/2016 | Forstall et al. |
| 9,442,703 B2 | 9/2016 | Roll et al. |
| 9,483,164 B2 | 11/2016 | Louch et al. |
| 2002/0002605 A1 | 1/2002 | Honda |
| 2002/0049788 A1 | 4/2002 | Lipkin et al. |
| 2002/0100950 A1 | 8/2002 | Babcock et al. |
| 2002/0107947 A1 | 8/2002 | Moragne et al. |
| 2002/0131404 A1 | 9/2002 | Mehta et al. |
| 2002/0152268 A1 | 10/2002 | Kureshy et al. |
| 2003/0041159 A1 | 2/2003 | Tinsley et al. |
| 2003/0059985 A1 | 3/2003 | Adkisson et al. |
| 2003/0061122 A1 | 3/2003 | Berkowitz et al. |
| 2003/0120599 A1 | 6/2003 | Agboatwalla et al. |
| 2003/0181242 A1 | 9/2003 | Lee et al. |
| 2003/0191859 A1 | 10/2003 | Ramsey |
| 2004/0044999 A1 | 3/2004 | Gibson |
| 2004/0098421 A1 | 5/2004 | Peng |
| 2004/0119754 A1 | 6/2004 | Bangalore et al. |
| 2004/0153992 A1 | 8/2004 | Molina-Moreno et al. |
| 2004/0190853 A1 | 9/2004 | Dow et al. |
| 2005/0021477 A1 | 1/2005 | Krishnan et al. |
| 2005/0039136 A1 | 2/2005 | Othmer |
| 2005/0049989 A1 | 3/2005 | Kaminsky et al. |
| 2005/0086105 A1 | 4/2005 | McFadden et al. |
| 2005/0091576 A1 | 4/2005 | Relyea et al. |
| 2005/0104880 A1 | 5/2005 | Kawahara et al. |
| 2005/0125787 A1 | 6/2005 | Tertitski et al. |
| 2005/0278443 A1 | 12/2005 | Winner et al. |
| 2006/0005207 A1 | 1/2006 | Louch et al. |
| 2006/0010394 A1 | 1/2006 | Chaudhri et al. |
| 2006/0015818 A1 | 1/2006 | Chaudhri et al. |
| 2006/0117263 A1 | 6/2006 | Locke |
| 2006/0173838 A1 | 8/2006 | Garg et al. |
| 2006/0190580 A1 | 8/2006 | Shu et al. |
| 2006/0224716 A1 | 10/2006 | Nakazawa et al. |
| 2006/0230395 A1 | 10/2006 | Paul et al. |
| 2006/0235766 A1 | 10/2006 | Mifune et al. |
| 2006/0236258 A1 | 10/2006 | Othmer et al. |
| 2006/0242249 A1 | 10/2006 | Swanson et al. |
| 2006/0242279 A1 | 10/2006 | Chen et al. |
| 2006/0253680 A1 | 11/2006 | Vitanov et al. |
| 2006/0267966 A1 | 11/2006 | Grossman et al. |
| 2006/0271618 A1 | 11/2006 | Kokubo et al. |
| 2006/0277469 A1 | 12/2006 | Chaudhri et al. |
| 2007/0038934 A1 | 2/2007 | Fellman |
| 2007/0067807 A1 | 3/2007 | O'Neil |
| 2007/0078953 A1 | 4/2007 | Chai et al. |
| 2007/0101291 A1 | 5/2007 | Forstall et al. |
| 2007/0101297 A1 | 5/2007 | Forstall et al. |
| 2007/0101433 A1 * | 5/2007 | Louch .................. G06F 21/552 726/25 |
| 2007/0106627 A1 | 5/2007 | Srivastava et al. |
| 2007/0118813 A1 | 5/2007 | Forstall et al. |
| 2007/0124688 A1 | 5/2007 | Nauerz et al. |
| 2007/0124701 A1 | 5/2007 | Gong et al. |
| 2007/0130541 A1 | 6/2007 | Louch et al. |
| 2007/0130589 A1 | 6/2007 | Davis et al. |
| 2007/0133484 A1 | 6/2007 | Albal et al. |
| 2007/0192763 A1 | 8/2007 | Helvick |
| 2007/0198698 A1 | 8/2007 | Boyd et al. |
| 2007/0203984 A2 | 8/2007 | Alhusseini et al. |
| 2007/0234215 A1 | 10/2007 | Graham et al. |
| 2007/0244750 A1 | 10/2007 | Grannan et al. |
| 2007/0245269 A1 | 10/2007 | Kim et al. |
| 2007/0250643 A1 | 10/2007 | Pyhalammi et al. |
| 2007/0266093 A1 | 11/2007 | Forstall et al. |
| 2007/0277109 A1 | 11/2007 | Chen et al. |
| 2007/0300185 A1 | 12/2007 | MacBeth et al. |
| 2007/0300265 A1 | 12/2007 | Karkkainen |
| 2008/0010133 A1 | 1/2008 | Pyhalammi et al. |
| 2008/0034309 A1 | 2/2008 | Louch et al. |
| 2008/0034314 A1 | 2/2008 | Louch et al. |
| 2008/0040681 A1 | 2/2008 | Synstelien et al. |
| 2008/0052348 A1 | 2/2008 | Adler et al. |
| 2008/0052372 A1 | 2/2008 | Weber et al. |
| 2008/0098420 A1 | 4/2008 | Khivesara et al. |
| 2008/0113656 A1 | 5/2008 | Lee et al. |
| 2008/0126476 A1 | 5/2008 | Nicholas et al. |
| 2008/0139189 A1 | 6/2008 | Hyatt et al. |
| 2008/0147530 A1 | 6/2008 | Kwan et al. |
| 2008/0160956 A1 | 7/2008 | Jackson et al. |
| 2008/0195483 A1 | 8/2008 | Moore |
| 2008/0201225 A1 | 8/2008 | Maharajh et al. |
| 2008/0222613 A1 * | 9/2008 | Allen ................ G06F 17/30038 717/128 |
| 2008/0222658 A1 | 9/2008 | Allen et al. |
| 2008/0235602 A1 | 9/2008 | Strauss et al. |
| 2008/0242373 A1 | 10/2008 | Lu et al. |
| 2008/0248815 A1 | 10/2008 | Busch |
| 2008/0255962 A1 | 10/2008 | Chang et al. |
| 2008/0307301 A1 | 12/2008 | Decker et al. |
| 2009/0007186 A1 | 1/2009 | Hartwell |

(56) References Cited

U.S. PATENT DOCUMENTS

| | | |
|---|---|---|
| 2009/0037509 A1 | 2/2009 | Parekh et al. |
| 2009/0049097 A1 | 2/2009 | Nocifera et al. |
| 2009/0070228 A1 | 3/2009 | Ronen |
| 2009/0089668 A1 | 4/2009 | Magnani et al. |
| 2009/0113346 A1 | 4/2009 | Wickramasuriya et al. |
| 2009/0138477 A1 | 5/2009 | Piira et al. |
| 2009/0164641 A1 | 6/2009 | Rogers et al. |
| 2009/0164653 A1 | 6/2009 | Mandyam et al. |
| 2009/0171939 A1 | 7/2009 | Athsani et al. |
| 2009/0172567 A1 | 7/2009 | Brooks et al. |
| 2009/0235149 A1 | 9/2009 | Frohwein |
| 2009/0248883 A1 | 10/2009 | Suryanarayana et al. |
| 2009/0248996 A1 | 10/2009 | Mandyam et al. |
| 2009/0249321 A1 | 10/2009 | Mandyam et al. |
| 2009/0249359 A1 | 10/2009 | Caunter et al. |
| 2009/0271778 A1 | 10/2009 | Mandyam et al. |
| 2009/0318124 A1 | 12/2009 | Haughn |
| 2010/0185938 A1 | 7/2010 | Rising, III et al. |
| 2010/0305999 A1 | 12/2010 | Fujioka |
| 2011/0055434 A1 | 3/2011 | Pyers et al. |
| 2011/0099487 A1 | 4/2011 | Pyhalammi et al. |
| 2011/0191583 A1 | 8/2011 | Liu |
| 2011/0237234 A1 | 9/2011 | Kotani et al. |
| 2012/0265613 A1 | 10/2012 | Ramer et al. |
| 2012/0330750 A1 | 12/2012 | Ramer et al. |
| 2013/0046852 A1 | 2/2013 | Saxena et al. |
| 2013/0053005 A1 | 2/2013 | Ramer et al. |
| 2013/0166527 A1 | 6/2013 | Kasterstein et al. |
| 2013/0312028 A1 | 11/2013 | Dharmaji |
| 2014/0143803 A1 | 5/2014 | Narsimhan et al. |
| 2014/0250432 A1 | 9/2014 | Zuverink |
| 2014/0280475 A1 | 9/2014 | Chiussi et al. |
| 2015/0248231 A1 | 9/2015 | Mandyam et al. |
| 2015/0347204 A1 | 12/2015 | Stanley-Marbell et al. |
| 2016/0004527 A1 | 1/2016 | Udd |

FOREIGN PATENT DOCUMENTS

| | | |
|---|---|---|
| CN | 1849773 A | 10/2006 |
| CN | 1864367 A | 11/2006 |
| CN | 1893418 A | 1/2007 |
| CN | 1963819 A | 5/2007 |
| CN | 101080095 A | 11/2007 |
| CN | 101103612 A | 1/2008 |
| EP | 1168758 | 1/2002 |
| EP | 1217857 A2 | 6/2002 |
| EP | 1406174 A2 | 4/2004 |
| EP | 1536327 A2 | 6/2005 |
| EP | 1848163 A1 | 10/2007 |
| GB | 2443991 | 5/2008 |
| JP | S63185069 A | 7/1988 |
| JP | 5020016 A | 1/1993 |
| JP | 10116170 A | 5/1998 |
| JP | 11075257 A | 3/1999 |
| JP | 2000106689 A | 4/2000 |
| JP | 2000507365 A | 6/2000 |
| JP | 2000276332 A | 10/2000 |
| JP | 2002014821 A | 1/2002 |
| JP | 2002118267 A | 4/2002 |
| JP | 2002140213 A | 5/2002 |
| JP | 2002345050 A | 11/2002 |
| JP | 2002373272 A | 12/2002 |
| JP | 2003016286 A | 1/2003 |
| JP | 2003124222 A | 4/2003 |
| JP | 2003177736 A | 6/2003 |
| JP | 2003283494 A | 10/2003 |
| JP | 2003330849 A | 11/2003 |
| JP | 2003345716 A | 12/2003 |
| JP | 2004500661 A | 1/2004 |
| JP | 2004530958 A | 10/2004 |
| JP | 2004326039 A | 11/2004 |
| JP | 2005011218 | 1/2005 |
| JP | 2005228228 A | 8/2005 |
| JP | 2006127382 A | 5/2006 |
| JP | 2006139443 A | 6/2006 |
| JP | 2006146600 A | 6/2006 |
| JP | 2006155605 A | 6/2006 |
| JP | 3812743 B2 | 8/2006 |
| JP | 2006227855 A | 8/2006 |
| JP | 2006244229 A | 9/2006 |
| JP | 2006260418 A | 9/2006 |
| JP | 2006285936 A | 10/2006 |
| JP | 2006302144 A | 11/2006 |
| JP | 2006526229 A | 11/2006 |
| JP | 2006345214 A | 12/2006 |
| JP | 2007026094 A | 2/2007 |
| JP | 2007133871 A | 5/2007 |
| JP | 2007164486 A | 6/2007 |
| JP | 2007249373 A | 9/2007 |
| JP | 2007251920 A | 9/2007 |
| JP | 2007293849 A | 11/2007 |
| JP | 2007295201 A | 11/2007 |
| JP | 2007299259 A | 11/2007 |
| JP | 2007535047 A | 11/2007 |
| JP | 2008501173 A | 1/2008 |
| JP | 2008046674 A | 2/2008 |
| JP | 2008504610 A | 2/2008 |
| JP | 2008065695 A | 3/2008 |
| JP | 2008516324 A | 5/2008 |
| JP | 2008527563 A | 7/2008 |
| JP | 2008532119 A | 8/2008 |
| JP | 2010503052 A | 1/2010 |
| JP | 2010503127 A | 1/2010 |
| JP | 2014157847 A | 8/2014 |
| KR | 20060107950 A | 10/2006 |
| KR | 100861656 B1 | 10/2008 |
| KR | 20080109473 A | 12/2008 |
| RU | 2254611 C2 | 6/2005 |
| RU | 2371758 C2 | 10/2009 |
| WO | 9735296 A1 | 9/1997 |
| WO | 9966394 A1 | 12/1999 |
| WO | 2001043017 | 6/2001 |
| WO | 0167785 A2 | 9/2001 |
| WO | 0244892 A2 | 6/2002 |
| WO | 02082265 A2 | 10/2002 |
| WO | 03030559 A1 | 4/2003 |
| WO | 2004008781 | 1/2004 |
| WO | 2004061615 A2 | 7/2004 |
| WO | 2005025252 A2 | 3/2005 |
| WO | 2005104572 A1 | 11/2005 |
| WO | 2006000152 A1 | 1/2006 |
| WO | 2006012343 A2 | 2/2006 |
| WO | 2006037786 A2 | 4/2006 |
| WO | 2006040506 A1 | 4/2006 |
| WO | 2006075334 A2 | 7/2006 |
| WO | 2006075677 A1 | 7/2006 |
| WO | 2006089880 A1 | 8/2006 |
| WO | 2006117107 | 11/2006 |
| WO | 2006135844 A2 | 12/2006 |
| WO | 2007073404 A1 | 6/2007 |
| WO | 2008009312 A1 | 1/2008 |
| WO | 2008010872 A1 | 1/2008 |
| WO | 2008025017 A2 | 2/2008 |
| WO | 2008030780 A1 | 3/2008 |
| WO | 2008030875 A2 | 3/2008 |
| WO | 2008030976 A2 | 3/2008 |

OTHER PUBLICATIONS

Cruz I., et al., "The Semantic Web-ISWC 2006", 5th International Semantic Web Conference, ISWC 2006 Athens, GA, USA, Nov. 2006 Proceedings—© Springer-Verlag Berlin Heidelberg, 2006, 1024 Pages.

Lenehan D., "World Wide Web of Widgets", https://readwrite.com/2007/05/09/world_wide_web_of_widgets/ May 9, 2007 (May 9, 2007), 4 pages.

Armstrong et al., "Efficient and Transparent Dynamic Content Updates for Mobile Clients," 2006 ACM, MobiSys'06 Jun. 2006, pp. 56-68; http://dl.acm.org/citation.cfm?id=1134687&CFID=673176692&CFTOKEN=90539733.

Liu et al., "A Dynamic Assignment Scheduling Algorithm for Big Data Stream Processing in Mobile Internet Services," Springer, Apr.

(56) References Cited

OTHER PUBLICATIONS 2016, pp. 373-383; http://link.springer.eom/article/10.1007/s00779-016-0914-z.

Sahu et al.,"A New Method for Detecting Users Behavior from Web Access Logs," IEEE, Aug. 2016, CICN'15, pp. 1003-1007; http://ieeexplore.ieee.org/document/7546248/.

Bott E., et al., "Microsoft Windows Vista Official Manual, First Volume," Nikkei Business Publications, Inc., Sep. 3, 2007, 1st edition, pp. 104-106.

Co-pending U.S. Appl. No. 09/668,600, filed Sep. 22, 2000.

Inoue T., "RIA"—Three-Sided Offence and Deffence, I/O, Japan, vol. 33, No. 2, Kohgakusha Co., Ltd., Feb. 1, 2008, vol. 33, pp. 65-68.

International Search Report and Written Opinion—PCT/US2009/037802, International Search Authority—European Patent Office—dated Sep. 29, 2009.

Live GPS Tracking: "FreeMacWare", Internet Archive, Oct. 5, 2007, 5 Pages, Retrieved from the internet.

Mizuno T., "All about Google," Sotechsha Co., Ltd., Nov. 20, 2007, 1st edition, p. 322.

RSS Reader: "Dashboard Widget", Internet Archive, Aug. 22, 2007, 2 Pages, Retrieved from the internet.

shockwidgets.com: "ministat21.91b" Macupdate, [Online] Nov. 10, 2007 (Nov. 10, 2007), XP002536607 online Retrieved from the Internet: URL:http://www.macupdate.com/info.php/id/19368> [retrieved on Jul. 9, 2009] the whole document.

Suzaki S., et al., "Automatic Estimation Method of Use Interest Based on WWW Access Logs," Proceedings of Multimedia, Distributed, Cooperative and Mobile (DICOMO) Symposium, the Information Processing Society of Japan, Jul. 2, 1997, vol. 97, No. 2, pp. 251-256.

"Web widget", Wikipedia.org, http://en.wikipedi.org/wiki/Web_widget, Dec. 18, 2008.

Widgets 1.0 Requirements: "W3C Working Draft 9", Feb. 2007, 21 Pages, Retrieved from the internet.

Kim Y., et al., "Mobile Advertisement System Using Data Push Scheduling Based on User Preference", IEEE, Apr. 2009, pp. 1-5. Retrieved from Internet: http://ieeexplore.ieee.org/document/5068977/?reload=true.

Li K., et al., "Building a Targeted Mobile Advertising System for Location-Based Services", Elsevier, Feb. 2012, pp. 1-8. Retrieved from Internet: http://www.sciencedirect.com/science/article/pii/S0167923612000607.

Nath S., et al., "Smartads: Bringing Contextual Ads to Mobile Apps", MobiSys' 13, Jun. 25-28, 2013, pp. 111-123. Retrieved from Internet: http://dl.acm.org/citation.cfm?id=2464452&CFID=711797576&CFTOKEN=61084486.

\* cited by examiner

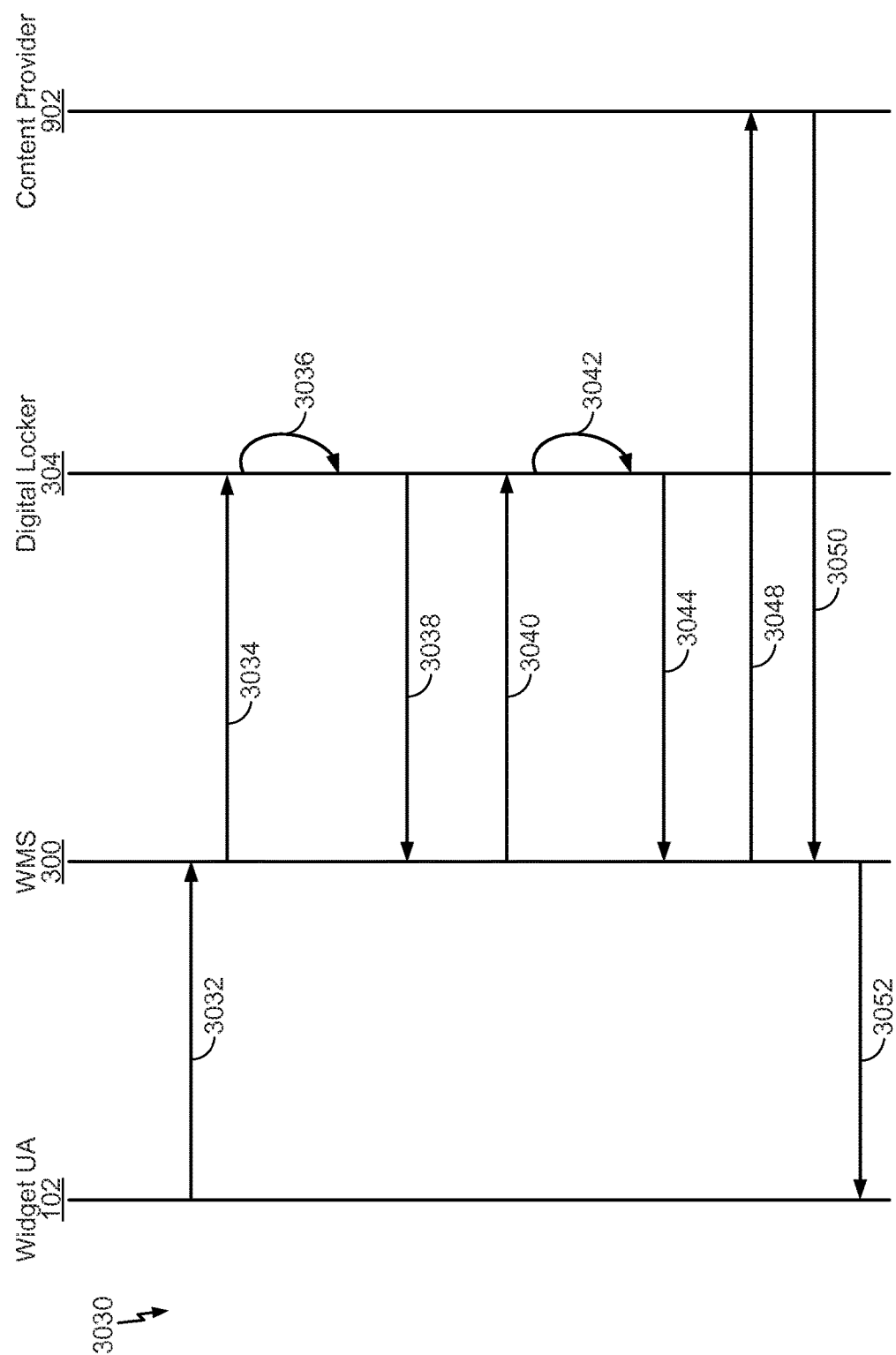

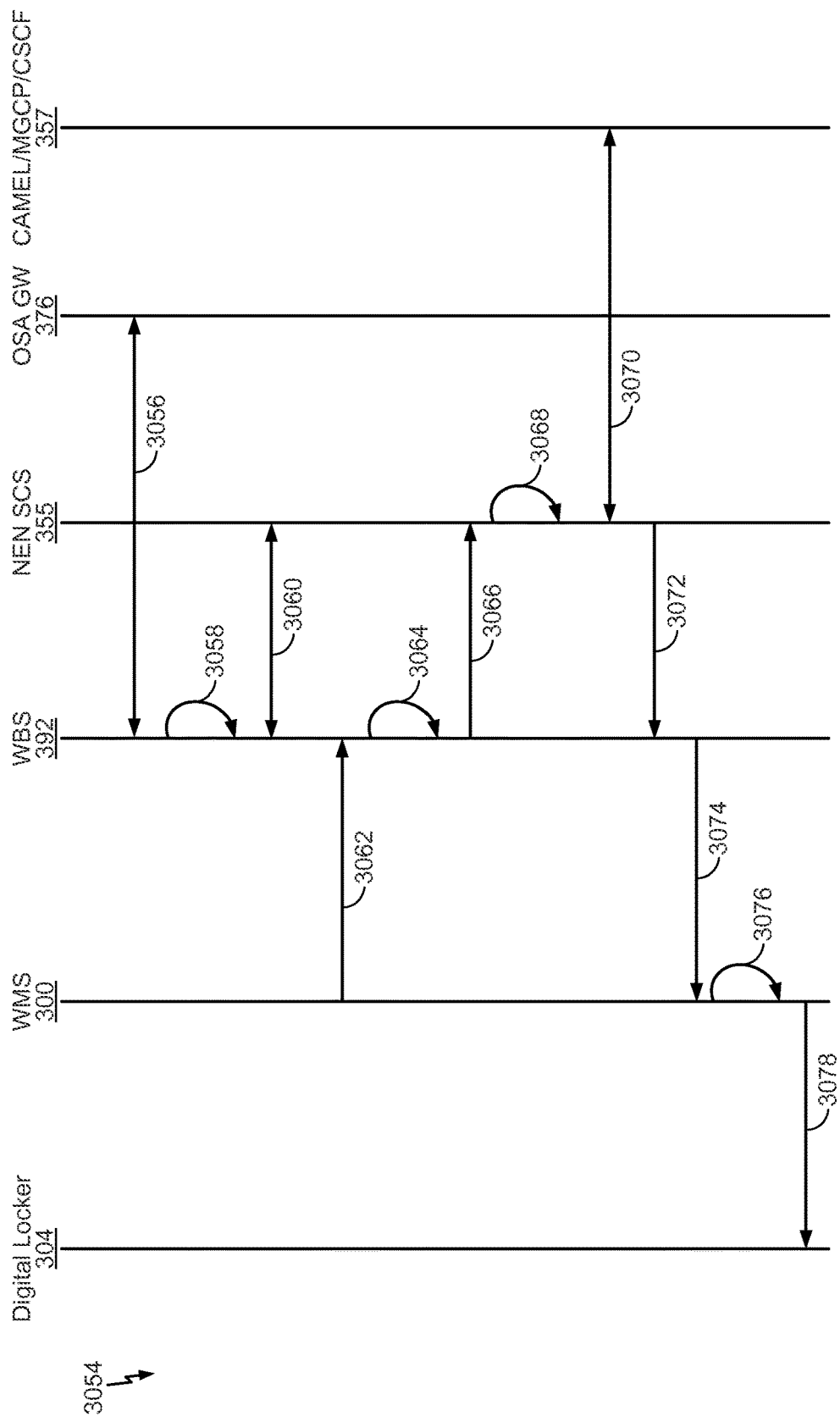

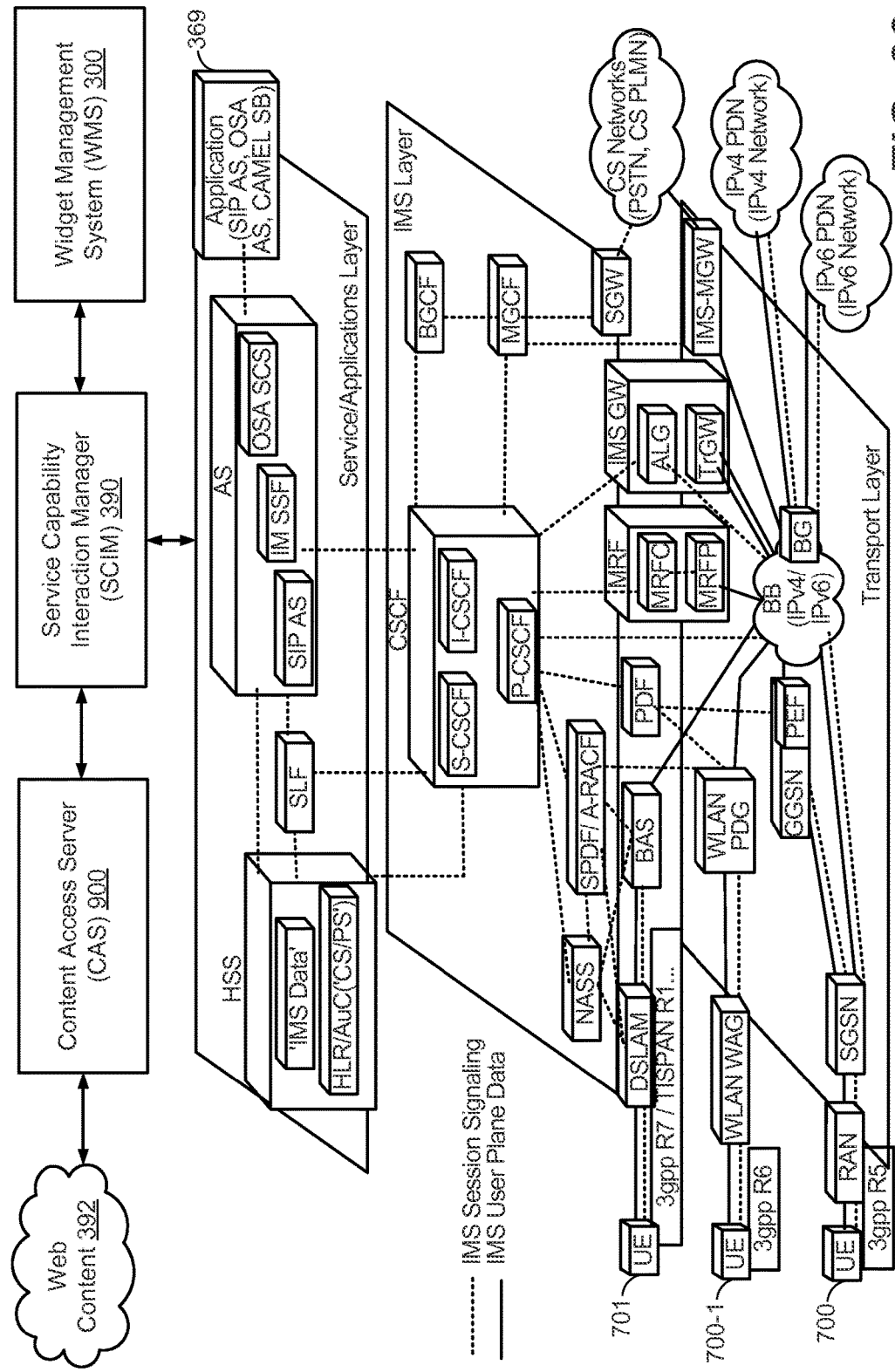

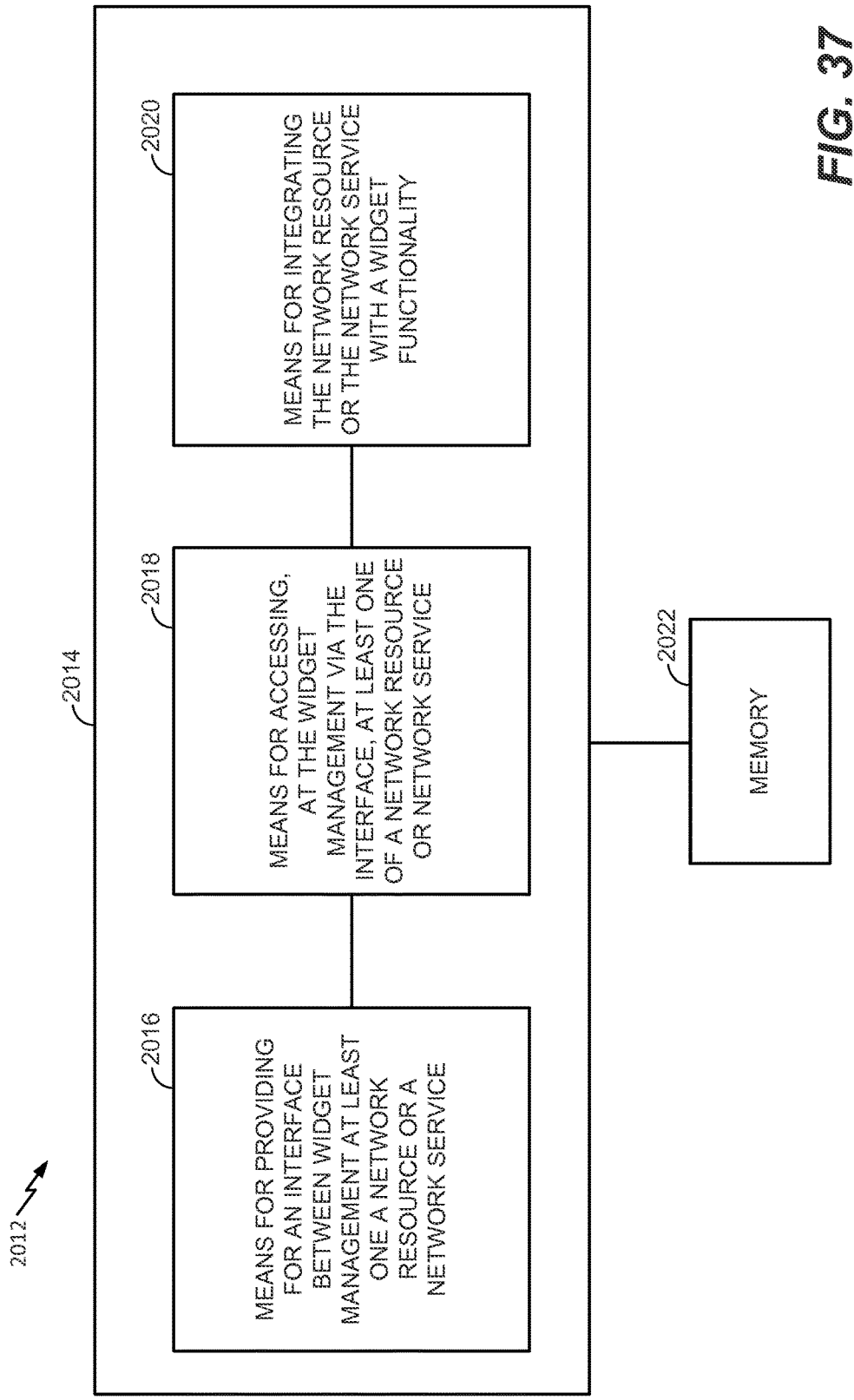

APPARATUS AND METHODS FOR MANAGING WIDGETS IN A WIRELESS COMMUNICATION ENVIRONMENT

CLAIM OF PRIORITY UNDER 35 U.S.C. § 119

The present Application for Patent is a Divisional of Non-Provisional application Ser. No. 12/407,559 entitled "APPARATUS AND METHODS OF MANAGING WIDGETS IN A WIRELESS COMMUNICATION ENVIRONMENT" FILED Mar. 19, 2009, which in turn claims priority to Provisional Application No. 61/039,402 entitled "APPARATUS AND METHODS OF MANAGING WIDGETS IN A WIRELESS COMMUNICATION ENVIRONMENT" filed Mar. 25, 2008, each of which is hereby expressly incorporated by reference herein in its entirety.

REFERENCE TO CO-PENDING APPLICATIONS FOR PATENT

The present Application for Patent is related to the following co-pending U.S. Patent Applications:

"APPARATUS AND METHODS FOR TRANSPORT OPTIMIZATION FOR WIDGET CONTENT DELIVERY" having Ser. No. 12/407,583 filed on Mar. 19, 2009, and expressly incorporated by reference herein in its entirety;

"APPARATUS AND METHODS FOR WIDGET UPDATE SCHEDULING" having Ser. No. 12/407,574, filed on Mar. 19, 2009, and expressly incorporated by reference herein in its entirety;

"APPARATUS AND METHODS FOR WIDGET-RELATED MEMORY MANAGEMENT" having Ser. No. 12/407,567, filed on Mar. 19, 2009, and expressly incorporated by reference herein in its entirety; and "APPARATUS AND METHODS FOR WIDGET INTER-COMMUNICATION IN A WIRELESS COMMUNICATION ENVIRONMENT" having Ser. No. 12/407,593, and expressly incorporated by reference herein.

BACKGROUND

The described aspects relate to widgets, and more specifically to apparatus and methods relating to an end-to-end system for the creation, storage, delivery, and management of widgets and widget-related content in a wireless communication environment.

Wireless networking systems have become a prevalent way to communicate with others worldwide. Wireless communication devices, such as a mobile or cellular telephone, a personal digital assistant (PDA), etc., operate on such networks, and have become smaller and more powerful in order to meet consumer needs and to improve portability and convenience. Consumers have become dependent upon these devices, demanding reliable service, expanded areas of coverage, additional services such as web browsing capabilities, and continued reduction in the size and cost of such devices.

Many of the functionalities and end user experiences of wireless communication devices have been developed, with limited success, to mimic the functionalities and end user experiences of a personal computing (PC) environment. For example, mobile web services have seen varying levels of success, even with the deployment of relatively high speed and high capacity services, such as advanced 3G services (1×-EV-DO Rev. A, UMTS HSPA). Much of the problem lies in the fact that the mobile web browsing experience is distinct from the PC experience with which most users are familiar. In particular, many end users find mobile web browsing applications to be hard to use, for example, with regard to entering search information, and difficult to enjoy, for example, as the resulting presentation of content is unpleasant.

Therefore, apparatus and methods are desired to improve the experience of an end user in interacting with web services on a wireless communication device.

SUMMARY

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later.

One aspect relates to a method for integration of network services and/or resources with widget capabilities including providing for an interface between a widget management component and at least one of a network resource or a network service. The method may also include accessing, at the widget management component via the interface, at least one of a network resource or network service. Further, the method may include integrating the network resource or the network service with a widget functionality.

Another aspect relates to at least one processor including a first module for providing for an interface between a widget management component and at least one of a network resource or a network service. The method may further include a second module for accessing, at the widget management component via the interface, at least one of a network resource or network service. Moreover, the method may include a third module for integrating the network resource or the network service with a widget functionality.

Yet another aspect relates to a computer program product including a computer-readable medium. The computer-readable medium may include at least one instruction for causing a computer to provide for an interface between a widget management component and at least one of a network resource or a network service. in addition, the computer-readable medium may include at least one instruction for causing the computer to access, at the widget management component via the interface, at least one of a network resource or network service. Furthermore, the computer-readable medium may include at least one instruction for causing the computer to integrate the network resource or the network service with a widget functionality.

Another aspect relates to an apparatus including means for providing for an interface between a widget management component and at least one of a network resource or a network service. The apparatus may further include means for accessing, at the widget management component via the interface, at least one of the network resource or network service. Additionally, the apparatus may include means for integrating the network resource or the network service with a widget functionality.

Still another aspect relates to a system for widget management and network/resource/service integration including a widget management system operable to manage mobile widgets executing on at least mobile platforms. The system may also include at least one of network resource or a network service. Moreover, the system may further include an interface for interfacing the widget management system with at least one of the network resource or the network service, wherein the widget management system is further operable to integrate the network resource or the network service with a widget functionality.

Another aspect relates to a method of managing a mobile widget including receiving performance data corresponding to operation of a mobile widget. The method may also include obtaining a mobile widget specification corresponding to the mobile widget, wherein the mobile widget specification comprises one or more acceptable activity standards for a respective one or more activities of an acceptable mobile widget. In addition, the method may include comparing the performance data to the mobile widget specification. Further, the method may include identifying the mobile widget as a trusted mobile widget if the performance data meets the respective one or more acceptable activity standards. Moreover, the method may include storing the identification corresponding to the mobile widget.

Yet another aspect relates to a network device for managing a mobile widget including a memory comprising widget validation component, wherein the widget validation component comprises a mobile widget specification having one or more acceptable activity standards for a respective one or more activities of an acceptable mobile widget. The network device may also include a processor in communication with the memory and operable to execute the widget validation component and the mobile widget. The widget validation component is operable to receive performance data corresponding to operation of a mobile widget. The widget validation component is further operable to compare the performance data to the mobile widget specification. The widget validation component is further operable to identify the mobile widget as a trusted mobile widget if the performance data meets the respective one or more acceptable activity standards. The widget validation component is further operable to store in the memory the identification corresponding to the mobile widget.

Another aspect relates to a method of managing a mobile widget on a wireless communication device including tracking performance data corresponding to operation of a mobile widget on a wireless communication device. The method may also include forwarding the tracked performance data across a wireless network for analysis. Moreover, the method may include receiving a widget disabling message based on a comparison of the performance data to a mobile widget specification, wherein the mobile widget specification comprises one or more acceptable activity standards for a respective one or more activities of an acceptable mobile widget. Furthermore, the method may include disabling the mobile widget based on the widget disabling message.

Still yet another aspect relates to a wireless communication device operable to manage mobile widgets including a memory comprising a widget management client, a mobile widget, and a disabling module. The wireless communication device may further include a processor in communication with the memory and operable to execute the widget management client and the disabling module. The widget management client is operable to track performance data corresponding to operation of the mobile widget on the wireless communication device. The widget management client is further operable to forward the tracked performance data across a wireless network for analysis. The widget management client is further operable to receive a widget disabling message based on a comparison of the performance data to a mobile widget specification. The mobile widget specification comprises one or more acceptable activity standards for a respective one or more activities of an acceptable mobile widget. The disabling module is operable to disable the mobile widget based on the widget disabling message.

Another aspect relates to a method for providing portability to mobile widgets including providing for a mobile widget client that includes generic code operable to more than one platform and a plurality of platform specific codes operable to a specific platform. The platform specific codes includes one or more operational modes. Further, the method may include implementing the mobile widget client in a plurality of platforms associated with the plurality of platform specific codes.

Yet another aspect relates to a system for creating portability for mobile widgets including a widget development module operable for providing a mobile widget client that includes generic code operable to more than one platform and a plurality of platform specific codes operable to a specific platform. The platform specific codes includes one or more operational modes. In addition, the system may further include a widget deployment module in communication with the widget development module that is operable implementing the mobile widget client in a plurality of platforms associated with the plurality of platform specific codes.

Another aspect relates to a method for generating content at a widget for upstream control of an event including generating content at a mobile widget. The method may also include communicating the content to a network entity, wherein the mobile widget generated content is operable for controlling an event at the network entity.

Still another aspect relates to an apparatus for generating widget content and communicating the content for upstream control of an event. The apparatus may also include a processor. In addition, the apparatus may include a memory in communication with the processor. Moreover, the apparatus may include at least one mobile widget client stored in the memory, executable by the processor and operable to generate content. Furthermore, the apparatus may include a communications module in communication with the processor and operable to communicate the content to a network entity. The mobile widget generated content is operable for controlling an event at the network entity.

Another aspect relates to a method for controlling a network event based on content received from a mobile widget including receiving, at a network entity, content generated at mobile widget executing on a wireless device. Further, the method may include controlling a predetermined event at the network entity based on received mobile widget-generated content.

Another aspect relates to an apparatus for controlling a network event based on content received from a mobile widget including a processor. The apparatus may further include a memory in communication with the processor. Additionally, the apparatus may include a widget management module stored in the memory, executable by the processor and operable to receive content generated at mobile widget executing on a wireless device and control a predetermined event at the network entity based on received mobile widget-generated content.

To the accomplishment of the foregoing and related ends, the one or more aspects comprise the features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

BRIEF DESCRIPTION OF THE DRAWINGS

The disclosed aspects will hereinafter be described in conjunction with the appended drawings, provided to illustrate and not to limit the disclosed aspects, wherein like designations denote like elements, and in which:

FIG. 34 is an example flow diagram of interactions between the widget management system and IMS in accordance with another aspect;

FIG. 35 is an example flow diagram of interactions between the widget management system and a network event notification SCS;

FIG. 36 is a further block diagram illustration of integrated widget system that provides further content integration and portability between platforms; and FIG. 37 is an illustration of an example system that facilitates widget management and network/resource/service integration in accordance with an aspect.

DETAILED DESCRIPTION

Figure 1:
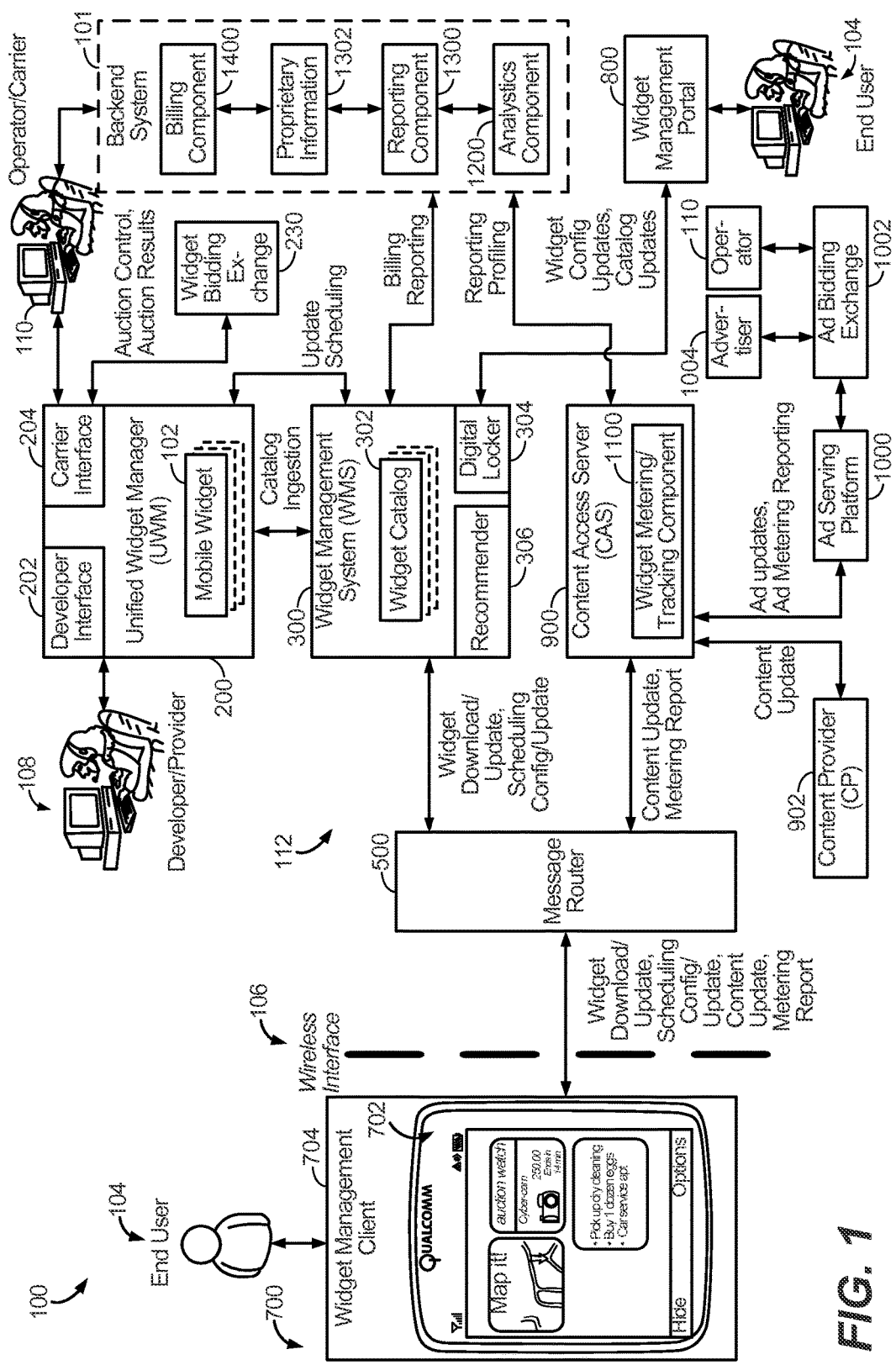
FIG. 1 is a schematic diagram of an aspect of an end-to-end mobile widget system.

Various aspects are now described with reference to the drawings. In the following description, for purposes of explanation, numerous specific details are set forth in order to provide a thorough understanding of one or more aspects. It may be evident, however, that such aspect(s) may be practiced without these specific details.

As used in this application. the terms "component," "module," "system" and the like are intended to include a computer-related entity, such as but not limited to hardware, firmware, a combination of hardware and software, software, or software in execution. For example, a component may be, but is not limited to being, a process running on a processor, a processor, an object, an executable, a thread of execution, a program, and/or a computer. By way of illustration, both an application running on a computing device and the computing device can be a component. One or more components can reside within a process and/or thread of execution and a component may be localized on one computer and/or distributed between two or more computers. In addition, these components can execute from various computer readable media having various data structures stored thereon. The components may communicate by way of local and/or remote processes such as in accordance with a signal having one or more data packets, such as data from one component interacting with another component in a local system, distributed system, and/or across a network such as the Internet with other systems by way of the signal.

In the subject description, the word "exemplary" is used to mean serving as an example, instance, or illustration. Any aspect or design described herein as "exemplary" is not necessarily to be construed as preferred or advantageous over other aspects or designs. Rather, use of the word exemplary is intended to present concepts in a concrete fashion.

Furthermore, various aspects are described herein in connection with a terminal, which can be a wired terminal or a wireless terminal. A terminal can also be called a system, device, subscriber unit, subscriber station, mobile station, mobile, mobile device, remote station, remote terminal, access terminal, user terminal, terminal, communication device, user agent, user device, or user equipment (UE). A wireless terminal may be a cellular telephone, a satellite phone, a cordless telephone, a Session Initiation Protocol (SIP) phone, a wireless local loop (WLL) station, a personal digital assistant (PDA), a handheld device having wireless connection capability, a computing device, or other processing devices connected to a wireless modem. Moreover, various aspects are described herein in connection with a base station. A base station may be utilized for communicating with wireless terminal(s) and may also be referred to as an access point, a Node B, or some other terminology.

Moreover, the term "or" is intended to mean an inclusive "or" rather than an exclusive "or." That is, unless specified otherwise, or clear from the context, the phrase "X employs A or B" is intended to mean any of the natural inclusive permutations. That is, the phrase "X employs A or B" is satisfied by any of the following instances: X employs A; X employs B; or X employs both A and B. In addition, the articles "a" and "an" as used in this application and the appended claims should generally be construed to mean "one or more" unless specified otherwise or clear from the context to be directed to a singular form.

The techniques described herein may be used for various wireless communication systems such as CDMA, TDMA, FDMA, OFDMA, SC-FDMA and other systems. The terms "system" and "network" are often used interchangeably. A CDMA system may implement a radio technology such as Universal Terrestrial Radio Access (UTRA), cdma2000, etc. UTRA includes Wideband-CDMA (W-CDMA) and other variants of CDMA. Further, cdma2000 covers IS-2000, IS-95, and IS-856 standards. A TDMA system may implement a radio technology such as Global System for Mobile Communications (GSM). An OFDMA system may implement a radio technology such as Evolved UTRA (E-UTRA), Ultra Mobile Broadband (UMB), IEEE 802.11 (Wi-Fi), IEEE 802.16 (WiMAX), IEEE 802.20, Flash-OFDM, etc. UTRA and E-UTRA are part of Universal Mobile Telecommunication System (UMTS). 3GPP Long Term Evolution (LTE) is a release of UMTS that uses E-UTRA, which employs OFDMA on the downlink and SC-TDMA on the uplink. UTRA, E-UTRA, UMTS, LTE, and GSM are described in documents from an organization named "3rd Generation Partnership Project" (3GPP). Additionally, cdma2000 and UMB are described in documents from an organization named "3rd Generation Partnership Project 2" (3GPP2). Further, such wireless communication systems may additionally include peer-to-peer (e.g., mobile-to-mobile) ad hoc network systems often using unpaired unlicensed spectrums, 802.xx wireless LAN, BLUETOOTH and any other short- or long-range, wireless communication techniques.

Various aspects or features will be presented in terms of systems that may include a number of devices, components, modules, and the like. It is to be understood and appreciated that the various systems may include additional devices, components, modules, etc. and/or may not include all of the devices, components, modules etc. discussed in connection with the figures. A combination of these approaches may also be used.

Terminology

To enhance the description of the present aspects, the following provides a list of some of the discussed terminology.

Mobile widget or widget: a user interface (UI) element with which a device end user interacts; in some aspects, a mobile widget may have a specific relationship with a respective content source. For example, a mobile widget or widget is a relatively small, specialized graphical user interface (GUI) application, which may include a combination of a graphical symbol and program code or a software module executable to provide visual information or easy access to a function, such as but not limited to a clock, a calendar, a news aggregator, weather information, etc.

Widget frame: a static user interface display area of a mobile widget.

Widget management client (WMC): a client application that instantiates and manages one or more mobile widgets.

Widget wall: an initial view in the WMC where a device end user can see all or some portion of mobile widgets, depending on the size of the view and the size of the respective mobile widgets, resident on the respective wireless communication device.

Widget operation modes: (i) compressed mode: an individual widget frame for display on a widget wall; and (ii) expanded mode: an individual widget frame for display when the mobile widget is selected, where the widget frame may be sized larger than the respective widget frame in the compressed mode.

Mobile widget types: (i) updateable widget: a widget whose underlying widget package can be updated after instantiation at the client; (ii) locked widget: widget that cannot be modified, deleted or re-positioned by the user; it is updateable, but not at user discretion; (iii) dynamic widget mobile widget having: a compressed mode appearance on UT that can be manipulated by end user (as opposed to a locked widget); (iv) floating widget: a mobile widget having a compressed mode appearance that cannot be modified by the end user; (v) discovery widget: a mobile widget that presents widget management functionality to the end user, including widget selection and widget wall management.

Widget security: (i) trusted widget: a widget that has gone through an approval process; and (ii) untrusted widget: a widget that has not gone through any approval; could be user defined, public domain, or from a developer.

Standalone ad widget: an optional form of a locked widget displayed on the widget wall; may have content relevant to the end user based on, among other things, other widget selections made by the WMC.

Widget management system (WMS): an infrastructure element for managing widget subscriptions and downloads.

Widget management portal (WMP): in one aspect, an end user-facing web tool for end users to manage widgets.

Content access server (CAS): an infrastructure element operable to handle routing of metering information related to mobile widget activity or end user interactivity with mobile widgets from one or more wireless communication devices; further operable to manage providing content updates to mobile widgets, and to retrieve/cache corresponding content updates from one or more content providers.

Widget wizard: a client management engine for mobile widgets.

Unified widget manager (UWM): an infrastructure element that operates as a clearinghouse for mobile widgets.

Message router: a network element through which all communication between the widget system infrastructure elements and the WMC is routed.

Schedule record: a data record that provides update schedules for widget content updates and a timetable for periodic retrieval of digital locker contents, where the digital locker may be a WMS component that includes mobile widget information and configuration for end users; for example, the schedule record may be sent from the WMS digital locker to the WMC.

Catalog record: a data record sent from the WMS digital locker to the WMC and WMP that provides a widget catalog listing mobile widgets, e.g. catalog items, available to the end user; the catalog record may be customized for an end user.

Overview

The described aspects relate to widgets, and more specifically to apparatus and methods relating to an end-to-end system for the creation, storage, delivery, and management of user-defined mobile widgets and widget-related content in a wireless communication environment. The described aspects provide apparatus and methods which enable end users to customize mobile widgets. Further, the described aspects provide apparatus and methods that are operable to operate efficiently in a wireless network environment having constraints with regard to network connectivity, communications bandwidth or throughput, and wireless device memory and processing usage.

As such, the described aspects particularly relate to "mobile" widgets optimized for a wireless network environment. To understand mobile widgets, one should also understand their counterpart—desktop widgets. Desktop widgets are essentially compact, client applications that provide specific functionality to the end user via a specialized user interface. It should be understood, however, that mobile widgets are not a straightforward extension of desktop widgets, particularly in several respects: (a) Desktop widgets are simple to write, and leverage existing web programming technologies (particularly Javascript and XML). In some aspects, mobile widgets may include compact protocols and utilize limited interpreters (e.g. Javascript, etc.) due to limitations in device memory and processing power; (b) Desktop widgets generally function with an expectation of consistent connectivity. Such consistent connectivity is not necessarily feasible in the wireless network environment due to inconsistent available throughput, limited cellular capacity, and specific wireless data plans; (c) Functionality utilized by desktop widgets specified in standard Javascript (e.g. ECMAScript versions, etc.) does not interface with wireless device-specific API's that can be extended to the mobile widget developer. Examples of such API's include the handset power meter, location information, and wireless connectivity status; (d) In some aspects, mobile widget accessibility may be provided in several forms, while, in general, desktop widgets are accessible directly on the PC desktop. In some aspects, mobile widgets are accessible via the wireless device application manager, while in other aspects mobile widgets may be accessible via a specific mobile widget management application or via a network portal; and (e) Mobile widget discovery and instantiation may be controlled by a wireless device application manager, or by a mobile widget management application, or by a network portal. In contrast, desktop widget discovery and instantiation is not restricted to one client or one portal. Therefore, the described aspects take these considerations into account to provide a mobile widget service optimized for the wireless network environment.

In particular, the described mobile widgets provide an alternative to the mobile browser to access content on a wireless device, and also allow individual users to easily create custom mobile widgets for arbitrary wireless device or web resources.

Thus, the described aspects offer a true replacement to receiving content via a mobile browser, addressing the above-noted challenges by developing a system with the constraints of wireless access, wireless device capabilities, and web development in mind.

End-To-End System Architecture

Figure 2:
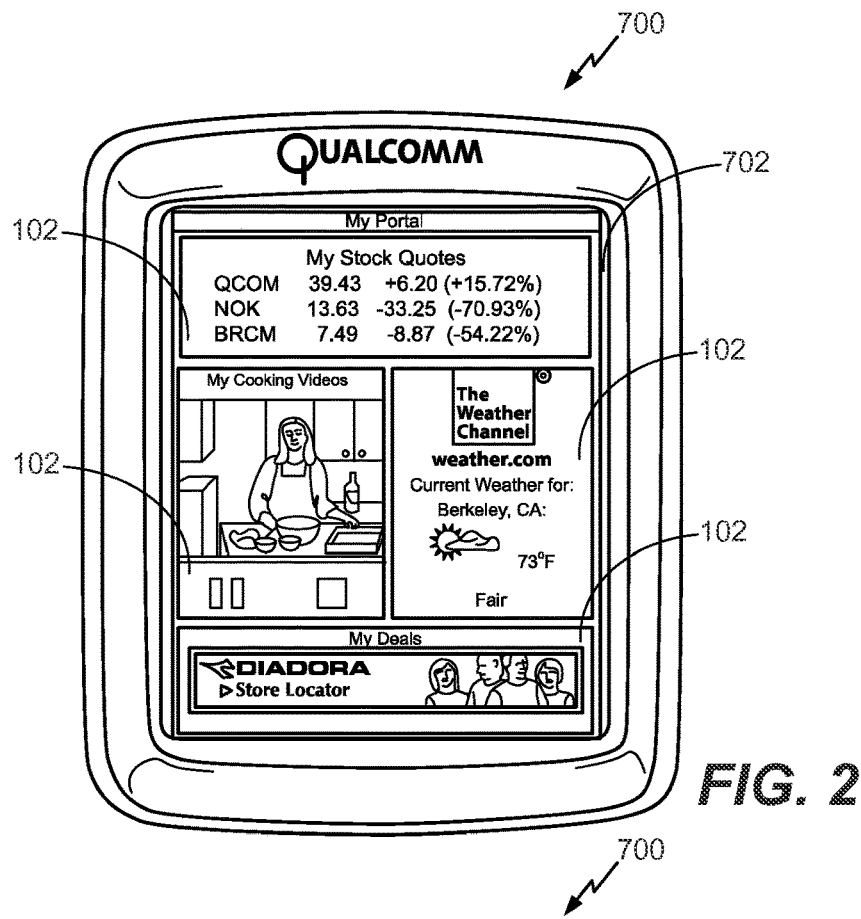
FIG. 2 is a schematic representation of an aspect of a wireless device having a display with a number of mobile widgets in a first state.
Figure 3:
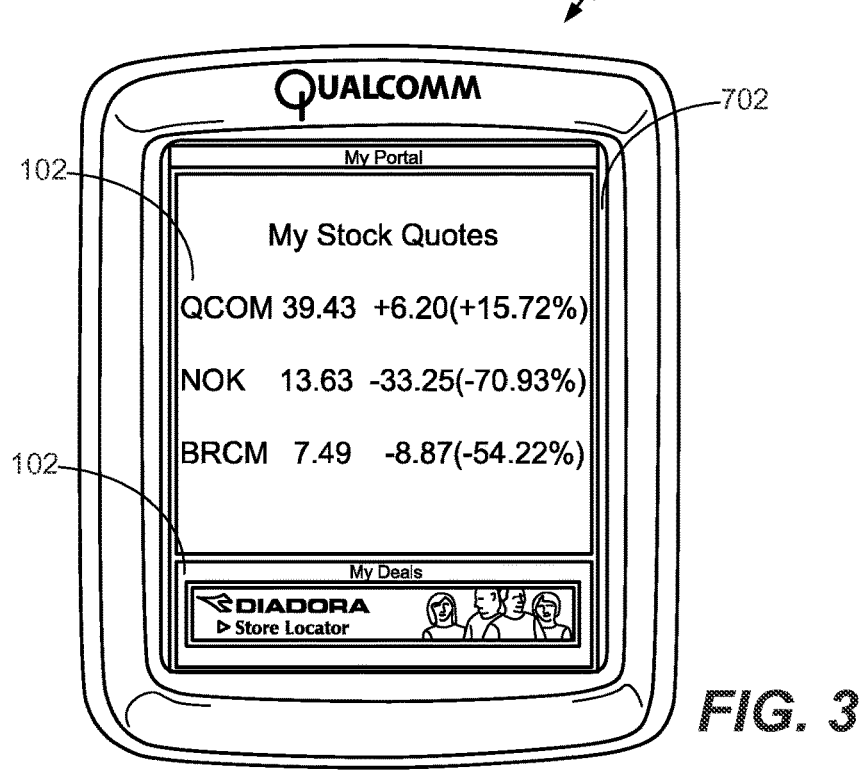
FIG. 3 is a schematic representation of an aspect of the wireless device of FIG. 2 with one of the mobile widgets in a second state.

Referring to FIGS. 1-3, in one non-limiting aspect, a mobile widget system 100 provides an end-to-end architecture for the creation, storage, delivery, operation, and management of mobile widgets in a wireless network environment.

A mobile widget 102 includes a compact application or set of codes executable by a wireless communication device 700 to interact with a content source, such as a content access server (CAS) 900, to retrieve content for presentation to a device end user 104 via a user interface 702, such as a display, on the device. In one non-limiting aspect, for example, mobile widget 102 may be a Really Simple Syndication (RSS) reader operable to retrieve a data feed from a news source and display the corresponding news item or headline(s) to allow end user 104 to view the latest news.

It should be noted, however, that mobile widget 102 is not limited to the prior example, and may have any functionality and may include any type of content. For example, mobile widget 102 may present any content generated by a content provider 902, including text, graphics, audio, video and multimedia content. Further, for example, content presentable by mobile widget 102 may include an advertisement, such as from an advertisement serving platform 1000, where the advertisement may be mixed with other content or may be the sole content. Advertisement serving platform 1000 may be a specialized version of content provider 902, supplying system 100 with advertising content, managing the placement of advertisements in system 100, and tracking feedback relating to the usage of advertisements on wireless communication devices 700. Additionally, advertisement serving platform 1000 may be operable to interface with an advertisement virtual negotiation component 1002, such as an advertisement bidding exchange, which provides advertisers 1004 and an operator 110 of system 100 with a virtual marketplace to enable the placement and management of advertising content within system 100.

Further, in system 100, wireless communication device 700 provides a platform for the storage, operation, and management of mobile widget 102 for end user 104. For example, wireless communication device 700 may include a widget management client (WMC) 704 that is executable to obtain one or more mobile widgets 102, such as from a widget management system 300. Additionally, WMC 704 may be executable to supervise mobile widget operation, and to track mobile widget activities on wireless communication device 700 and report such activities to a widget tracking component 1100.

Widget management system (WMS) 300 is operable to communicate with WMC 704, for example via a wireless interface 106 and a message router component 500, and includes one or more catalogs 302 of one or more widgets 102 available for purchase and/or download to wireless communication device 700. WMS 300 may include a digital locker 304 operable to store records of each widget 102 downloaded to each device 700, as well as the corresponding configuration of each widget 102 on each device 700. A widget configuration may include settings relating to an appearance of widget 102, as well as an operation of widget 102, including one or more content update settings. In conjunction with providing access to widget catalogs 302 and widgets 102, WMS 300 optionally may include a widget recommender 306 to provide end user 104 with advice, suggestions, or recommendations of mobile widgets 102 that may be of benefit or of interest to end user 104.

As noted, message router component 500 is operable to interface between WMC 704 and the widget-supplying and content-supplying components of system 100. In particular, message router component 500 provides the interface with WMS 300 and CAS 900 to exchange messages relating to downloading mobile widget 102, configuring mobile widget 102, updating mobile widget content, scheduling of content updates, and reporting of data tracking the activity of or end user interaction with mobile widget 102. As such, in some aspects, message router component 500 defines a network element that manages and controls all communications with WMC 704.

Further, in some aspects, system 100 may include a widget management portal 800 that allows end user 104 to access WMS 300 to inquire about available mobile widgets 102 and widget catalogs 302. Further, widget management portal 800 allows end user 104 to configure the functionality and appearance of mobile widget 102 on wireless communication device 700. As such, widget management portal 800 provides end user 104 with alternative interface for mobile widget management.

In system 100, WMS 300 may obtain mobile widget 102 and widget catalog 302 from a unified widget manager (UWM) 200. UNUM 200 provides a controlled point-of-entry into system 100 for mobile widget 102. In particular, UWM 200 may be operable to insure that each mobile widget 102 meets one or more predetermined architectural and/or operational widget standards for functioning within system 100. Additionally, UWM 200 provides a common, virtual marketplace that enables one or more mobile widget developers/providers 108 to introduce their respective mobile widget 102 to an operator 110, such as a wireless network carrier, of system 100. For example, widget developers/providers 108 may submit one or more mobile widgets 102 to UWM 200 via a developer interface 202, and operator/carrier 110 may access and review mobile widgets 102 at UWM 200 via an operator interface 204, where developer and operator interfaces 202 and 204 may be a network-accessible interface such as an extranet. Further, for example, via UWM 200, one or more developers/providers 108 and one or more operators/carriers 110 may access a widget virtual negotiation component 206, such as a widget bidding exchange, where an agreement may be reached regarding one or more of mobile widget pricing, mobile widget operation, mobile widget content updating, mobile widget placement in widget catalogs, mobile fidget billing, developer/provider compensation, or operator/carrier mobile widget cost in system 100.

Additionally, in some aspects, system 100 may have a backend system 101 for analyzing the tracked data and transactions within system 100. In particular, backend system 101 may include an analytics component 1200 that receives and examines the data of system 100, and a reporting component 1300 that generates reports, including operator/carrier proprietary information 1302, based on the results of the analysis of analytics component 1200. Further, backend system 101 may include a billing component 1400 that accounts for transactions in system 100 and debits and/or credits one or more end users 104, developers/providers 108, operators/carriers 110, or advertisers 908. For example, end user 104 may purchase and download mobile widget 102 to a respective wireless communication device 700. This purchase transaction may be recorded by WMS 300 and reported to analytics component 1200, which extracts relevant information for use by reporting component 1300 and/or billing component 1400 to generate, respectively, an accounting of the transaction and a bill or invoice corresponding to the transaction. The accounting and the billing may represent, for example, one or more of a purchase price/account receivable to be debited to an end user account, an operator/carrier account payable to be credited to an operator/carrier account, a developer/provider account payable to be credited to a developer/provider account, or an advertiser account receivable to be debited to an advertiser account.

It should be noted that the components within and functionalities provided by system 100 may be configured in any manner. For example, the various functionalities of any single system component alternately may be performed by individual system components. As such, it should be noted that the aspects of system 100 may be rearranged in any of a variety of manners, and yet still achieve the stated functionality.

Further, it should be noted that the infrastructure components, e.g. the components to the right of wireless interface 106 in FIG. 1, may be communicatively coupled by one or any combination of wired or wireless links, referred to as infrastructure communication network 112. As such, infrastructure communication network 112 may be a wired network, a wireless network, or a combination wired/wireless network, for example including LANs, WANs, PSTNs, the Internet, circuit-switched and/or packet-switched networks.

Thus, system 100 provides one aspect of an end-to-end system for managing mobile widgets in a wireless network environment. Further details of the various system components and their aspects will now be discussed.

Infrastructure Element/Network Device

In system 100, the network-side or infrastructure elements may include one or more of any type of computer device, such as a network device, operable to perform the functionality described herein. In particular, the network-side or infrastructure elements that may include network device include, but are not limited to, one or any combination of the following system components: end user 104, developer/provider 108, operator/carrier 110, unified widget manager (UWM) 200, widget bidding exchange 230, widget management system (WMS) 300, digital locker 304, recommender 306, message router 500, content access server (CAS) 900, content provider 902, advertisement serving platform 1000, advertisement bidding exchange 1002, advertiser 1004, widget tracking component 1100, analytics component 1200, reporting component 1300, billing component 1400 and, generally, backend system 101.

Figure 4:
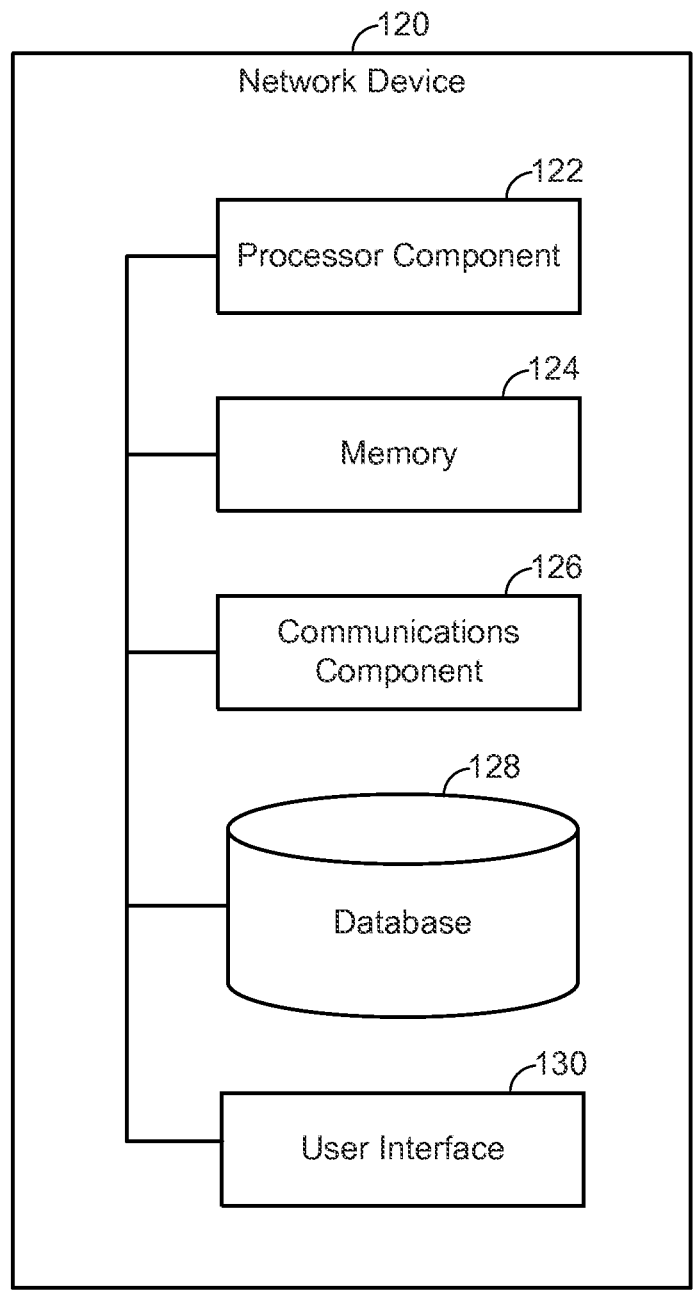
FIG. 4 is a schematic diagram of an aspect of a network device of the system of FIG. 1.

Referring to FIG. 4, in one aspect, such a computer device or network device may be represented by network device 120, which is operable to communicate with any other network-side or infrastructure elements of system 100 and/or with wireless communication device 700 (FIG. 1) and/or WMC 704 (FIG. 1). Network device 120 includes any type of network-based communication device, such as a network server operable on a communication network that links the components of system 100 (FIG. 1). For example, the communication network underlying system 100 (FIG. 1) may be a wired or wireless communication system, or a combination of both, and includes wireless interface 106, such as a wireless access network of operator/carrier 110 (FIG. 1) on which wireless communication device 700 operates.

Network device 120 includes a processor component 122 for carrying out processing functions associated with one or more of components and functions described herein. Processor component 122 can include a single processor, or multiple set of processors or multi-core processors. Moreover, processor component 122 can be implemented as an integrated processing system and/or a distributed processing system. In particular, processor component 122 is operable to execute a software program or application from memory in order to receive and process inputs and generate outputs corresponding to the functionality of the respective infrastructure element as described herein.

Network device 120 further includes a memory 124, such as for storing local versions of software programs or applications, including scripts, codes, algorithms, heuristics, neural networks, rules, fuzzy logic, and executable instructions, being executed by processor component 122. Memory 124 can include one or more types of random access memory (RAM), read only memory (ROM), and a combination thereof.

Further, network device 120 includes a communications component 126 that provides for establishing and maintaining con with one or more other components utilizing hardware, software, and services as described herein. Communications component 126 may carry communications between components on network device 120, as well as between network device 120 and external devices, such as wireless communication device 700 (FIG. 1), other network-side or infrastructure elements, or other devices serially or locally connected to network device 120. Communications component 120 includes a receiver to receive communications and a transmitter to transmit communications. Further, communications component 120 includes the corresponding receive chain components and transmit chain components to enable exchanging messages according to one or more respective protocols.

Additionally, network device 120 may further include database 128, which can be any suitable combination of hardware and/or software, that provides for mass storage of data/information, data relationships, and software programs/applications employed in connection with aspects described herein.

Network device 120 may additionally include a user interface component 130 operable to receive inputs from a user of network device 120, and to generate outputs for presentation to the user. User interface component 130 may include one or more input devices, including but not limited to a keyboard, a number pad, a mouse, a touch-sensitive display, a navigation key, a function key, a microphone, a voice recognition component, any other mechanism capable of receiving an input from a user, or any combination thereof. Further, user interface component 130 may include one or more output devices, including but not limited to a display, a speaker, a haptic feedback mechanism, a printer, any other mechanism capable of presenting an output to a user, or any combination thereof.

Thus, network device 120 includes hardware, or software, or combinations of hardware and software, operable to enable performing the functionality of one or more of the network-side or infrastructure elements of system 100 (FIG. 1).

Unified Widget Manager

Figure 5:
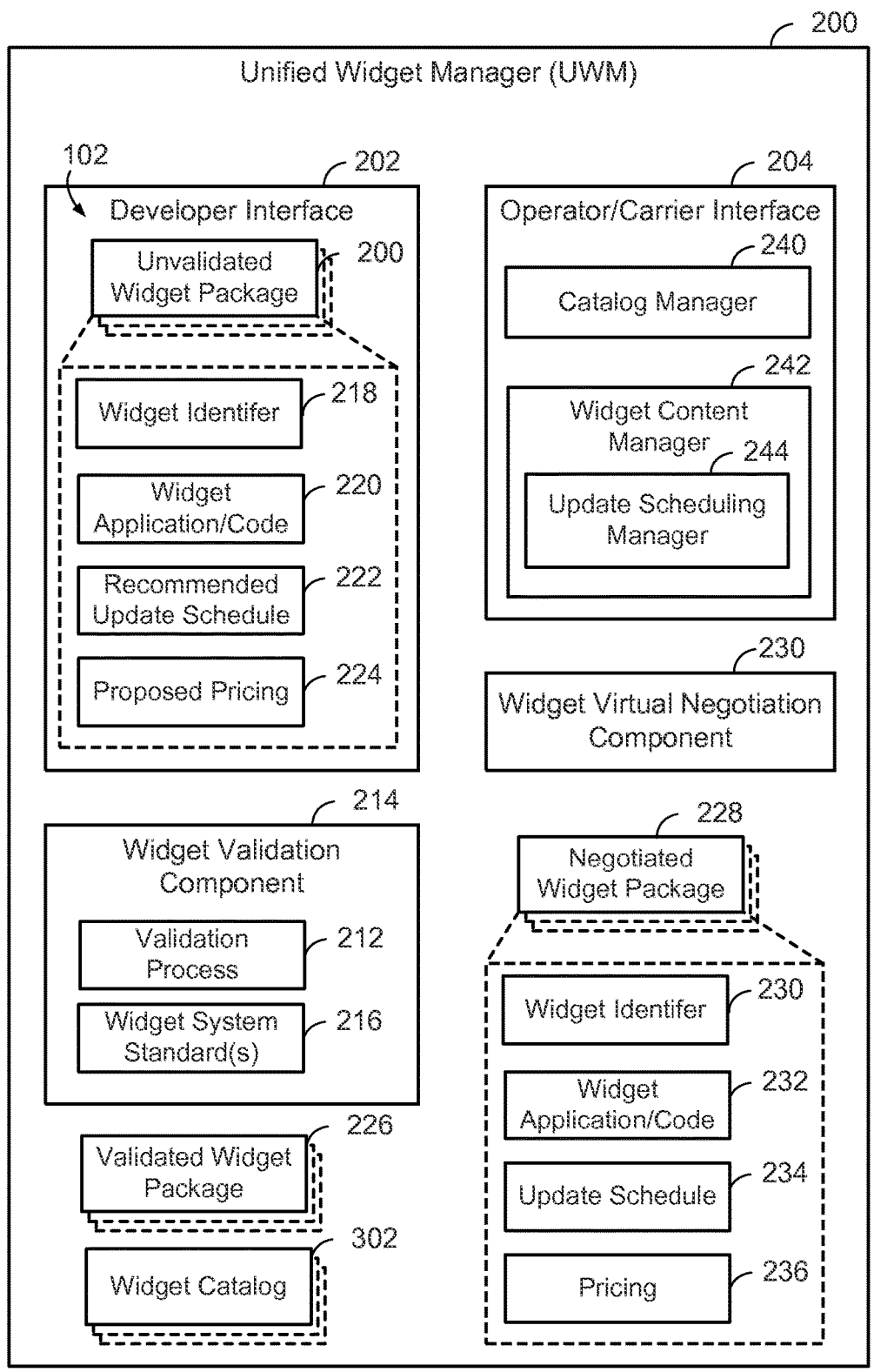
FIG. 5 is a schematic diagram of an aspect of the unified widget manager (UWM) of FIG. 1.

Referring to FIGS. 1 and 5, as discussed above, UWM 200 provides a clearinghouse for mobile widgets 102, which may be presented to system 100 by developer/provider 108 via developer interface 202 and which may be managed by operator/carrier 110 via operator/carrier interface 204.

Developer interface 202 provides an access point, such as an extranet, for developers/providers 108 to submit mobile widgets 102 to system 100. In some aspects, submitted mobile widgets 102 may be subject to a validation process 210 executable by a widget validation component 212, resulting in a respective submitted widget 102 being either a trusted widget or an entrusted widget or alternately being denied entry into system 100. Validation process 210 may be an automated process, a manual process, or a combination of both, that determines if submitted mobile widget 102 conforms to one or more widget system standards 216 and performs on system 100 as designed by developer/provider 108. If the submitted mobile widget 102 passes validation process 210, then the respective mobile widget 102 will be classified as a trusted widget. In some aspects, trusted mobile widgets may have a trust indicator, such as a digital certificate corresponding to UWM 200 or widget validation component 212 to indicate trustworthiness. If the submitted mobile widget 102 either fails validation process 210 or enters system 100 in another manner, such as via the public domain or from being directly defined by a user, then the respective mobile widget 102 may by considered an untrusted widget.

In some aspect, developer/provider 108 may submit mobile widget 102 to system 100 in the form of an unvalidated widget package 216, which represents a type of untrusted widget. Unvalidated widget package 216 may include the relevant components that define the respective widget, including its operation on system 100 and its pricing. For example, in one aspect, unvalidated widget package 216 may include: a fidget identifier 218 to identify or describe the widget, and/or to identify targeted demographics or user behavioral categories to which the widget may be directed; widget application or code 220 comprising the instructions, objects, etc. to allow the respective widget to operate on a given computer platform, such as different types of wireless communication device 700 and/or on a personal computer (PC) using different technologies; a recommended update schedule 222 that defines a recommendation or suggestion of the developer/provider 108 of when the content represented by the widget should be updated—for example, the temporal aspects of widgets may vary, as so some widgets such as a stock watcher widget may preferably have frequent updates during market hours and much less frequent updates after market hours, versus a weather widget which may preferably be updated only a few times per day; and proposed pricing 224 that defines one or more price-related and/or marketing/selling-related aspects of the widget, such as one or more of a desired end user price, developer/provider compensation or fee or royalty, discounts, carrier-specific pricing, catalog placement considerations including catalog type and slotting position, etc. Upon passing through validation process 210 and achieving widget system standard(s) 214 as defined by widget validation component 212, the respective unvalidated widget package 216 may be allowed into system 100 as a validated widget package 226, which represents a type of trusted widget.

Mobile widgets 102 accepted by UWM 200 may be accessed and modified by both developer/provider 108 and operator/carrier 110 via a widget virtual negotiation component 206 that may be entered, for example, via developer interface 202 and operator/carrier interface 204, respectively. Similar to developer interface 202, operator/carrier interface 204 provides an access point, such as an extranet, for operator/carrier 110 to interact with UWM 200. For example, one or more operators/carriers 110 may review mobile widgets 102, or in some aspects validated widget packages 226, to determine if they want to include the respective widget in one or more widget catalogs 302 available to end users 104 of system 100. Further, for example, widget virtual negotiation component 206 allows developers/providers 108 and operators/carriers 110 to negotiate various aspects of a respective mobile widget 102, such as widget pricing, developer compensation, operator compensation, update scheduling, etc. In one aspect, for example, widget virtual negotiation component 206 may include a widget bidding exchange including auction functionality to control and report the results of an auction process used to define agreed upon parameters corresponding to a respective mobile widget 102. In any case, in some aspects, after agreement between developers/providers 108 and operators/carriers 110 on the final set of widget parameters, the mobile widget 102 may be defined by a negotiated mobile widget package 228. For example, negotiated mobile widget package 228 may include: a widget identifier 230 to identify or describe the widget and/or to identify targeted demographics or user behavioral categories to which the widget may be directed, which may be the same as identifier 218 or which may be operator/carrier specific; widget application or code 232 comprising the instructions, objects, etc. to allow the respective widget to operate on a given computer platform, which may be the same as widget application or code 220 or which may be operator/carrier specific; a negotiated update schedule 234 that defines negotiated or initially accepted content update schedule, which may be the same as recommended update schedule 222 or which may be operator/carrier specific; and negotiated pricing 236 that defines one or more price-related and/or marketing/selling-related aspects of the widget as agreed upon during the negotiation, which may be the same as proposed pricing 224 or which may be operator/carrier-developer/provider specific or negotiation specific.

Figure 6:
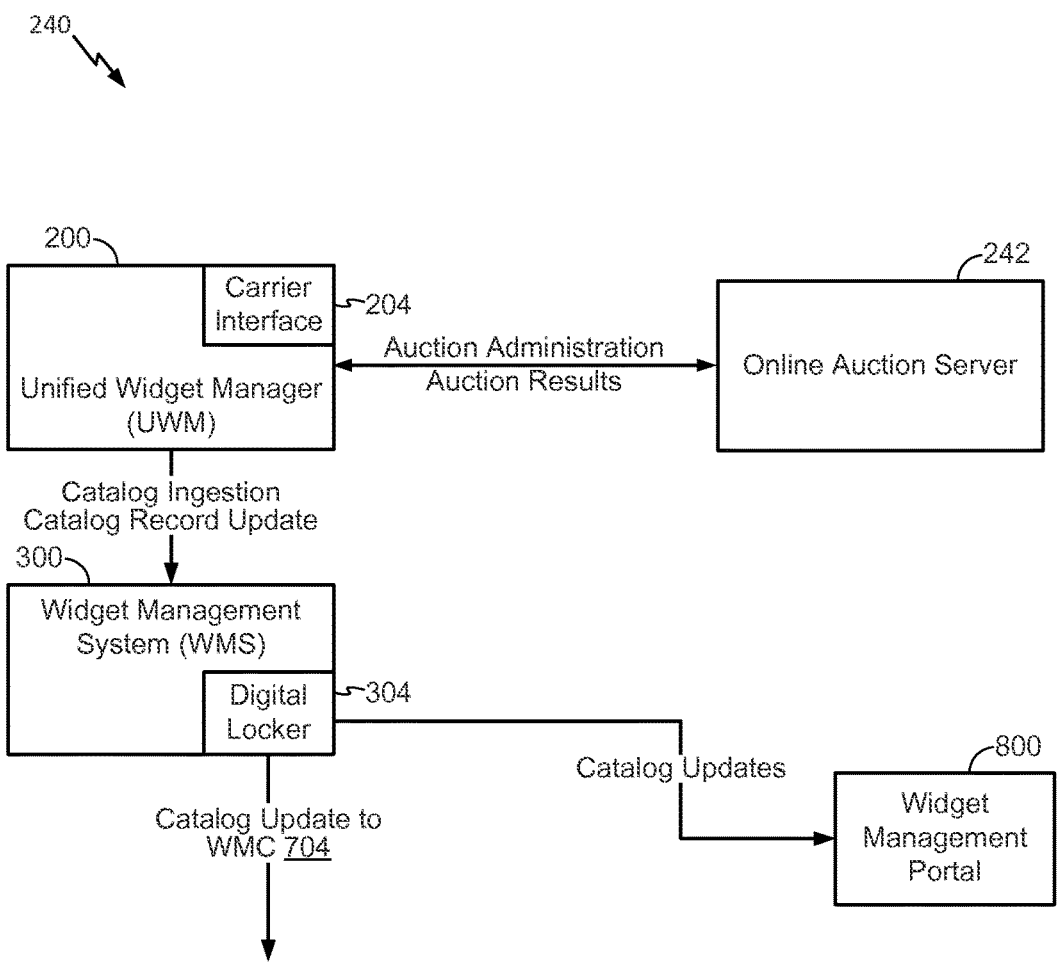
FIG. 6 is a schematic diagram of an aspect of an auction architecture of the system of FIG. 1.
Figure 7:
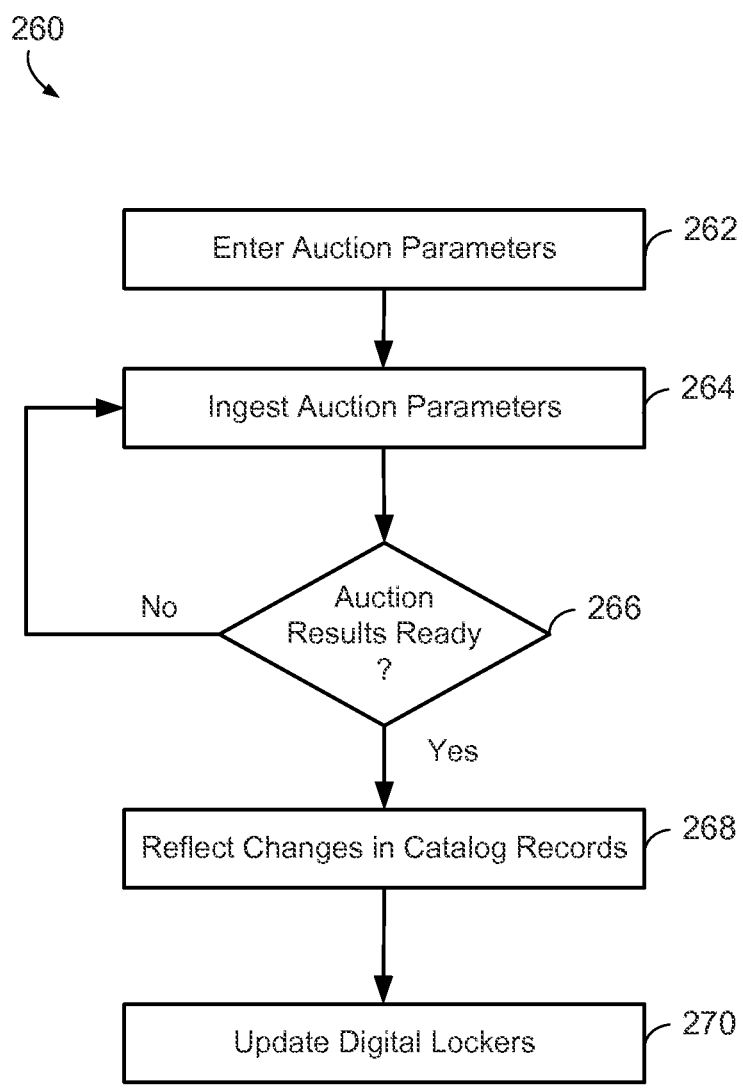
FIG. 7 is flow diagram of an aspect of an auction method of the system of FIG. 1.

Referring specifically to FIGS. 6 and 7, in one non-limiting example, one aspect of an architecture 240 and method 260 corresponding to widget virtual negotiation component 206 (FIGS. 1 and 5) include an online auction server 242 operable to interact with UWM 200 to perform auction administration duties and to transmit auction results. For example, online auction server 242 may be operable to present mobile widget inventory to operators/carriers 110 (FIG. 1), as well as biddable parameters associated with each mobile widget, such as pricing and placement (FIG. 7, action 262). For example, biddable parameters corresponding to mobile widget placement may include, but are not limited to, parameters such as slotting placement for position on a widget wall, a "featured" parameter corresponding to featuring the respective mobile widget in the display of a shopping mobile widget, and slotting placement for each category of widgets or for each widget catalog. Further, the mobile widgets presented by online auction server 242 may have additional targeting metadata, such as the data of the targeted demographics or user behavioral categories to which the widget may be directed. As such, operator/carrier 110 (FIG. 1) is able to access biddable items and enter bids corresponding thereto (FIG. 7, actions 264 and 266). Based on the auction results (FIG. 7, action 266), UWM 200 modifies the records of corresponding mobile widgets 102 and/or mobile widget catalogs 302 (FIG. 7, action 268), which are received by WMS 300 and updated in the corresponding records of digital locker 304 (FIG. 7, action 270). Thus, as a result, such updated records are then made available to WMC 704 and widget management portal 800 to insure end user 104 (FIG. 1) has access to the latest information.

Additionally, in some aspects, UWM 200 allows operator/carrier 110 to organize one or more mobile widgets 102 into one or more widget catalogs 302, for example, using a catalog manager component 240 accessible via operator/carrier interface 204. In one aspect, for example, operator/carrier 110 selects negotiated widget packages 228 for inclusion in one or more widget catalogs 302, which may be organized in many different fashions, such as by widget functionality, etc. Further, for example, each widget catalog 302 includes a listing of mobile widgets 102 that may be organized in a predetermined fashion, such as based on payments for a given slotting placement, etc. Widget catalog 302 may be defined by a catalog record that includes mobile widget metadata describing each mobile widget 102 and corresponding parameters that may be of interest to a catalog viewer, such as one or any combination of a name of the widget, a description of the widget functionality, a graphic or visual representation of the widget, widget pricing and purchasing information, etc. Further, for example, the listing of mobile widgets 102 in widget catalogs 302 may be varied after creation of widget catalog 302, such as based on end user preferences, and/or end user behavioral information, and/or end user device capabilities. In any case, catalog manager component 240 further allows operator/carrier 110 to transmit widget catalogs 302 to WMS 300 so that the listed mobile widgets 102 may he made available to end users 104.

Further, UWM 200 may further include a widget manager component 242 that allows operator/carrier 110 to change one or more parameters or characteristics of mobile widget 102. For example widget manager component 242 may allow operator/carrier 110 to: activate or deactivate a respective mobile widget 102 for operation on system 100; set or change a widget identifier, such as identifier 230; set or change widget application/code, such as application/code 232; set or change a widget update schedule, such as update schedule 234; and/or set or change pricing information, such a pricing 236. In one aspect, for example, widget manager component 242, may further include an update scheduling manager 244 to specifically allow interaction with and setting of updates schedules for one or a group of mobile widgets 102. For example, update scheduling manager 244 may include logic, algorithms, heuristics, fuzzy logic, neural networks, etc., operable to provide automated update schedules for individual or groups of mobile widgets 102 or end users 104, for example, that take into account and/or balance end user considerations, mobile widget characteristics such as temporal aspects of content, and operator/carrier considerations.

Thus, UWM 200 provides an access point and interfacing functionality for developers/providers 108 to submit mobile widgets 102 into system 100. Further, UWM 200 provides validation functionality to approve mobile widgets 102 for operation within system 100. Additionally, UWM 200 provides a clearinghouse or marketplace that allows developers/providers 108 and operators/carriers 110 to negotiate and agree upon financial and operational parameters of mobile widgets 1132. Moreover, UNUM 200 provides an access point and interfacing functionality for operators/carriers 110 to manage widget catalogs 302 and the content and characteristics of mobile widgets 102 within system 100.

Widget Management System

Figure 8:
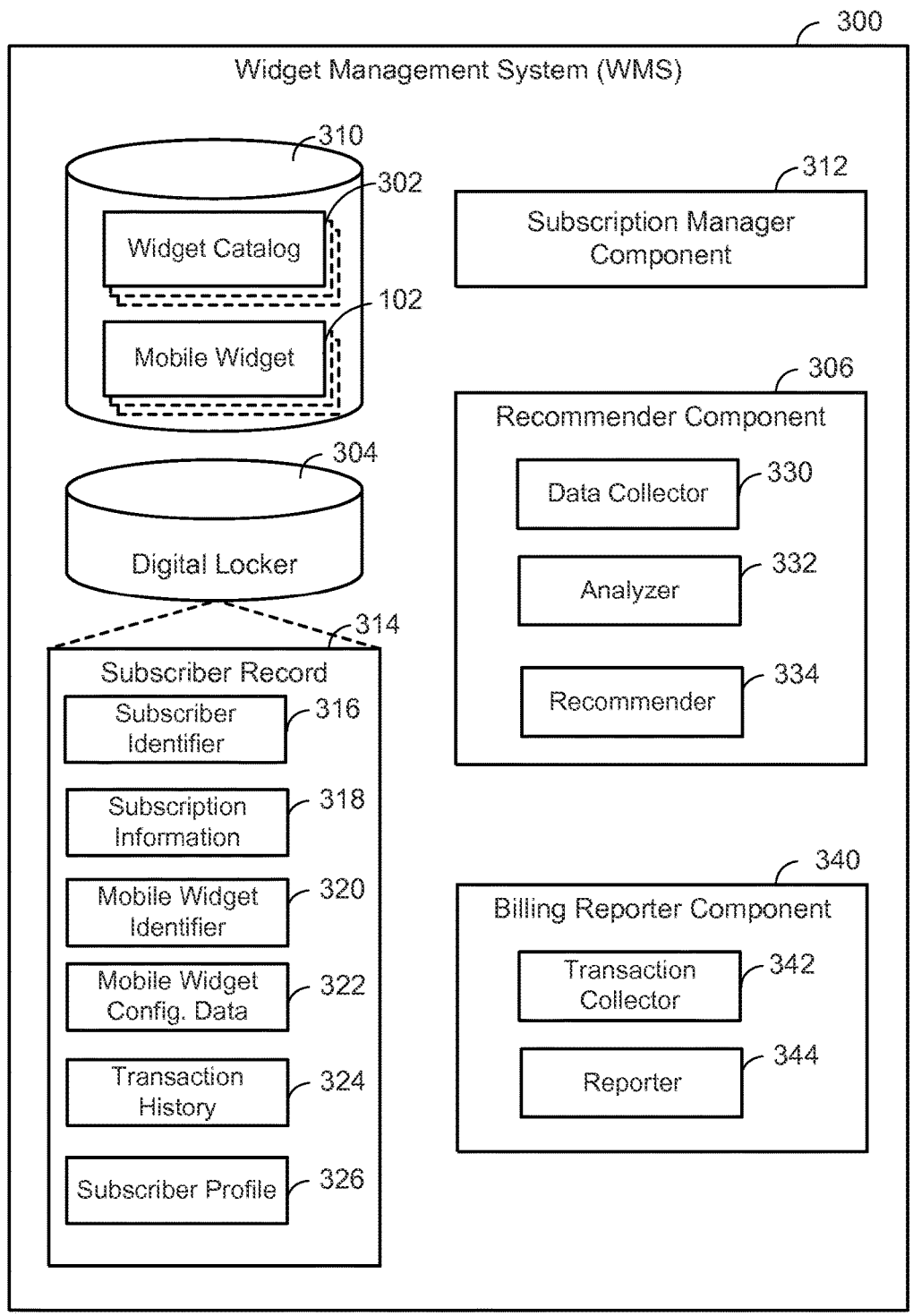
FIG. 8 is a schematic diagram of an aspect of the widget management system (WMS) of FIG. 1.

Referring to FIGS. 1 and 8, WMS 300 is an infrastructure element that interacts with UWM 200 to obtain mobile widgets 102, widget catalogs 302, and widget modifications such as changes to widget operational or configuration parameters. Further, WMS 300 provides an end user-facing interface that allows end user 104, via WMC 804 on wireless communication device 700 and/or via widget management portal 800, to view, select, purchase/download, and configure mobile widgets 102. Additionally, WMS 300 provides management functionality for mobile widget distribution to wireless communication devices, for storing and implementing mobile widget configuration and subscription parameters, and for effecting, recording, and reporting on mobile widget transactions.

In one aspect, for example, WMS 300 includes widget database 310 for storing one or more widget catalogs 302 and/or one or more mobile widgets 102. Further, WMS 300 may include a subscription manager component 312 that interacts with WMC 704 and/or widget management portal 800 to allow end user 104 to access widget catalog 302 or individual mobile widgets 102 for purchase and/or download onto less communication device 700.

Further, subscription manager component 312 may be operable to control one or a plurality of subscriber records 314 in a database such as digital locker 304. Each subscriber record 314 includes information on each end user and on each mobile widget 102 corresponding to each end user to enable the management and control of mobile widgets for subscribers. For example, in one aspect, subscriber record 314 may include one or any combination of: a subscriber identifier 316, such as a name, subscriber number, phone number, wireless device serial number, etc. that may be used to uniquely identify a given end user 104 and/or wireless communication device 700; subscription information 318 including a subscription identifier, a subscription description, a subscription key, a license, a validity time period, a service level, and any other information relevant to enabling operation of a mobile widget on a wireless device—such subscription information 318 may authorize end user 104 and/or wireless communication device 700 to receive or operate an individual or a class of mobile fidgets, and may further authorize or identify a service level that may allow one of a number of levels of service corresponding to a mobile widget, wherein such service levels may regulate a number or volume of content updates, message exchanges, etc. performed by the respective mobile widget; mobile widget identifier(s) 320 to identifier one or more mobile widgets 102 purchased/downloaded to wireless communication device 700 and/or WMC 704 and authorized for operation; mobile widget configuration data 322, corresponding to each mobile widget identifier 320, that defines how corresponding mobile widget 102 is presented and/or operates, which may include user-defined/customized configuration data entered by end user to personalize the respective mobile widget according to user preferences; a transaction history 324 that includes transaction details relating to end user 104 accessing, purchasing/downloading, and configuring a respective mobile widget 102; and a subscriber profile 326 that includes information that describes end user 104, defines demographic information of end user 104, and/or defines behavioral information of end user 104, wherein such information may be utilized for marketing purposes, such as to recommend mobile widgets to end user 104 and/or to provide advertising to end user 104. Thus, WMS 300 stores and controls the relationships between each mobile widget 102 and each subscriber or end user 104 in system 100 through digital locker 302.

Optionally, WMS 300 may include recommender component 306 operable to interact with subscription manager component 312, digital locker 304, widget database 310, other infrastructure elements such as UWM 200 or CAS 900 to obtain widget slotting information or widget advertising-related information and other external entities, such as providers of marketing and/or sales data, to suggest mobile widgets 102 that may be of interest to subscriber/end user 104. For example, in one aspect, recommender component 306 may include a data collector module 330 operable to perform one or any combination of: gathering data about available mobile widgets, such as mobile widget metadata; gathering data about subscriber/end user, such as subscription information 318, transaction history 324 and subscriber profile information 326; or gathering other internal or external information relating to widget popularity, widget profitability, widget sales, widget advertising, widget positioning/slotting, widget marketing, etc. Further, recommender component 306 may include an analyzer module 332 operable to execute one or more algorithms, heuristics, fuzzy logic, etc. in order to determine potential matches between one or more of the available mobile widgets or catalogs, the available subscriber/end user data, and/or external widget-related information. Additionally, based on the results of analyzer module 332, recommender component 306 may further include a recommender module 334 operable to generate a message including references to or links to or identification of one or more mobile widgets 102 or widget catalogs 302 that may be of interest to the subscriber/end user 104 and/or that may be of an economic interest of operator/carrier 110 to promote to subscriber/end user 104. Thus, recommender component 306 is operable to dynamically suggest or recommend mobile widgets 102 or widget catalogs 302 to subscribers/end users 104 based on any number of configurable parameters.

Further, in some aspects, WMS 300 may additionally include a billing reporter component 340 that keeps track of end user 104 interactions with WMS 300 in downloading/purchasing of mobile widgets 102 and reports such activity to backend system 101 for accounting and billing purposes. For example, billing reporter component 340 may include a transaction collector module 342 operable to interact with subscription manager component 312 and/or digital locker 304 in order to gather transaction data relating to the download or purchase of mobile widgets 102 by subscribers/end users 104. Further, a reporter module 344 is operable to interact with transaction collector module 342 and generate a message for transmission to backend system 101 documenting the collected transactions, including the transaction details identifying aspects of the corresponding subscriber information, mobile widget metadata and the transaction-specific data such as purchase price. Thus, billing reporter component 340 is operable to update backend system with billing-related information.

Message Router

Figure 9:
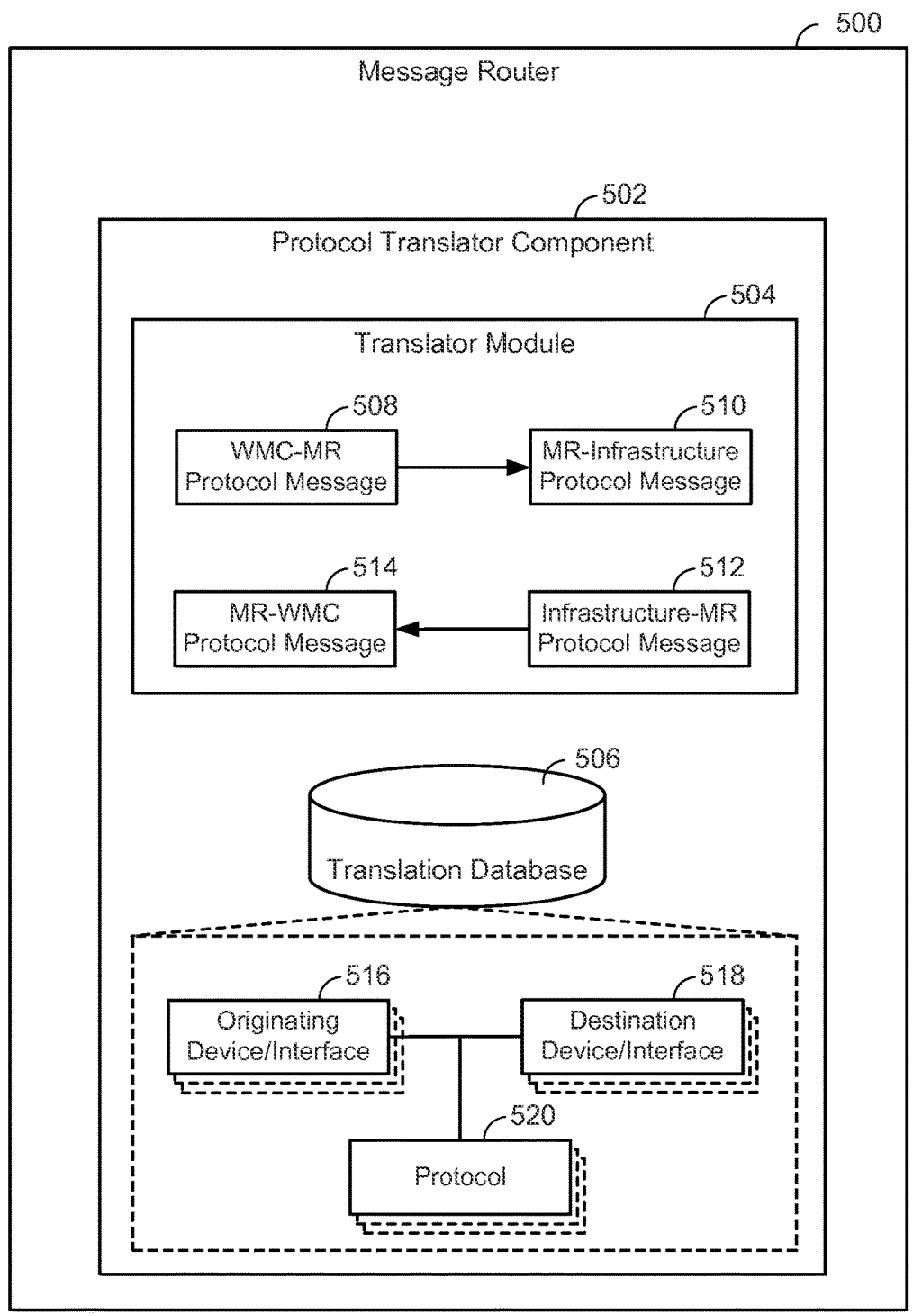
FIG. 9 is a schematic diagram of an aspect of the message router of FIG. 1.

Referring to FIGS. 1 and 9, in one aspect, system 100 includes a network element, such as message router (MR) 500, which provides a communication interface between the network infrastructure, such as WMS 300 and CAS 900, and wireless communication device 700 and/or WMC 704. In particular, in one aspect, message router 500 communicates directly with WMC 704 by sending and/or receiving over-the-air (OTA) messages via wireless interface 106, and further relays those messages to WMS 300 and/or CAS 900 via one or more infrastructure communications networks.

It should be noted that wireless interface 106 between message router 500 and WTC 704 may have a different transport protocol than the one or more infrastructure networks connecting message router 500, WMS 300 and CAS 900. As such, in some aspects, message router 500 may include a protocol translator component 502 to enable message router 500 to exchange messages between device or transport mediums operating with different protocols. For example, protocol translator component 502 may include a translator module 504 having translation logic operable to access a translation database 506 in order to convert a message from one protocol to another protocol. For example, translator module 504 is operable to translate a WMC-MR protocol message 508, for example a WMC originated message transmitted according to the protocol of wireless interface 106, into an MR-infrastructure message 510, for example a message transmitted according to the protocol of the corresponding infrastructure communication network 112. Similarly, for example, translator module 504 is operable to translate a infrastructure-MR protocol message 512, for example an infrastructure originated message transmitted according to the protocol of the corresponding infrastructure communication network 112, into an MR-WMC message 514, for example a message transmitted according to the protocol of wireless interface 106. In performing such message translation, translator module 504 is operable to access a local or remote translation database 506 that stores relationships and data corresponding to an originating device/interface 516, a destination device/interface 518, and communication protocols 520. For example, using translation database 506, translator module 504 is able to identify or determine the corresponding protocol used for a message received from a respective originating device or transported over a corresponding originating interface, as defined by the data of originating device/interface 516. Similarly, for example, using translation database 506, translator module 504 is able to determine the corresponding protocol to use for a message destined for a respective destination device or to be transported over a corresponding destination interface, as defined by the data of destination device/interface 518. It should be noted that originating device/interface 516 and destination device/interface 518 may be combined, for example, to provide relationships between devices and/or interfaces and corresponding protocols 520.

In any case, message router 500 is operable to transport messages in any desired protocol. For example, such protocols can include hypertext transfer protocol (HTTP), an Internet Protocol (IP) socket protocol, a short message service (SMS) protocol, and any wired and/or wireless network protocols, such as code division multiple access (CDMA)-based protocols and global system for mobile communications (GSM)-based protocols.

Wireless Interface

Referring to FIG. 1, wireless interface 106 may be any one or any combination of a variety of wireless communication systems. Such systems often employ different spectrum bandwidths and/or different air interface technologies. Exemplary systems include one or any combination of the wireless systems discussed above.

Infrastructure Communication Network

Referring to FIG. 1, infrastructure communication network 112 may be any one or any combination of a variety of wired or wireless communication systems, or a combination of both. Exemplary systems include one or any combination of the wired or wireless systems discussed above.

Wireless Communication Device and Widget-related Components

Figure 10:
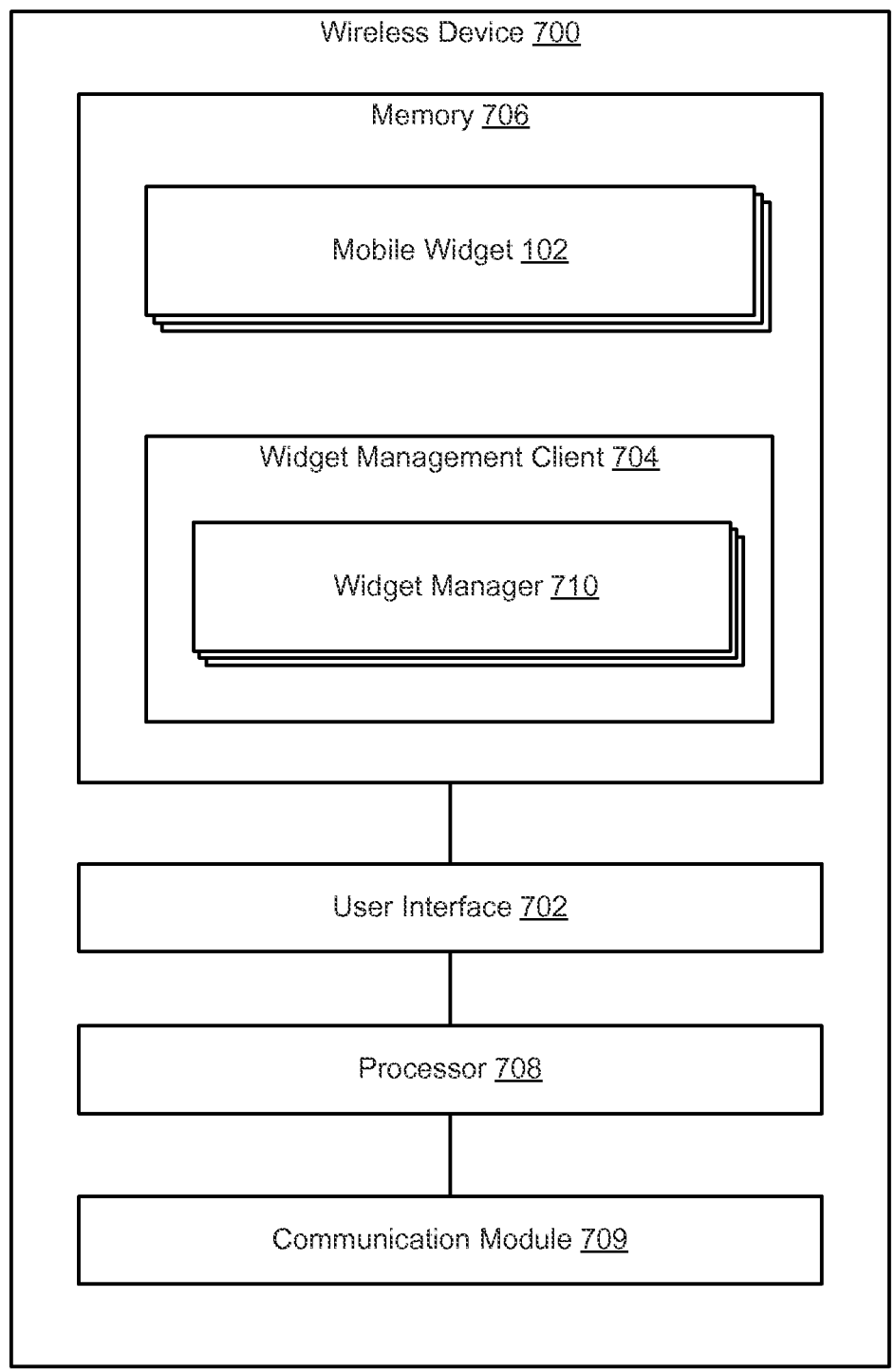
FIG. 10 is a schematic diagram of an aspect of the wireless device of FIG. 1.

FIG. 10 represents a high-level block diagram of a wireless device 700 operable to store, present, and manage mobile widgets 102. As previously noted, the wireless device may include any device capable of operating on a wireless communication system. For example, wireless device 700 may be embodied as a cellular telephone, a cordless telephone, a Session Initiation Protocol (SIP) phone, a wireless local loop (WLL) station, a personal digital assistant (PDA), a handheld device having wireless connection capability, or other processing device connected to a wireless modem. The wireless communication system may any of variety of systems, which often employ different spectrum bandwidths and/or different air interface technologies. Exemplary systems include CDMA (CDMA 2000, EV DO, WCDMA), OFDM, or OFDMA (Flash-OFDM, 802.20, WiMAX), FDMA/TDMA (GSM) systems using FDD or TDD licensed spectrums, peer-to-peer (e.g., mobile-to-mobile) ad hoc network systems often using unpaired unlicensed spectrums, and 802.xx wireless LAN or BLUETOOTH techniques.

The wireless device 700 includes a memory 706 and a processor 708 that is in communication with memory 706. Processor 708 is operable for carrying out processing functions associated with one or more of components and functions described herein. Processor 708 can include a single or multiple set of processors or multi-core processors. Moreover, processor 708 can be implemented as an integrated processing system and/or a distributed processing system. Memory 706 is operable for storing applications being executed by processor 708, such as mobile widgets 102. Memory 706 can include random access memory (RAM), read only memory (ROM), and a combination thereof.

Additionally, wireless device 700 includes user interface 702 operable to receive inputs from a user of wireless device 700, and to generate outputs for presentation to the user. Thus, user interface 702 may include one or more input devices, including but not limited to a keyboard, a number pad, a mouse, a touch-sensitive display, a navigation key, a function key, a microphone, a voice recognition component, any other mechanism capable of receiving an input from a user, or any combination thereof. Further, user interface 702 may include one or more output devices, including but not limited to a display, a speaker, a haptic feedback mechanism, a printer, any other mechanism capable of presenting an output to a user, or any combination thereof. In aspects herein disclosed user interface 702 may include a display operable to provide a visual presentation of widgets 102, a touch sensitive display operable to provide a visual presentation and receive inputs to the widgets 102 and/or a keypad to receive inputs to the widgets 102 or the like.

Memory 708 stores one, two, or a plurality of mobile widgets 102. As previously noted mobile widgets 102 are applications executable on the wireless device 700 that provide specific functionality, such as content delivery, to the user via a specialized user interface 702, such as a visual display. In most instances, mobile widgets 102 may provide the user access to web/Internet-based content that is delivered over the wireless network. However, in other instances, the mobile widgets 102 may provide for access to content that is device-based, such as, for example, current battery status, current location, or the like.

Additionally, memory 708 stores a Widget Management Client (WMC) 704 that includes a corresponding widget manager 710 for each mobile widget application 102 stored in the memory 708. WMC 704 is executable to wirelessly obtain one or more mobile widgets 102, from the wireless communication network and supervise mobile widget operation. Additionally, WMC 704 and, specifically widget managers 710, may be executable to track mobile widget activities on wireless communication device 700, report such activities to a network component, such as a widget tracking component 1100. Also, the widget managers 710 may provide management over the schedule for updating content and management cover the configuration of the presentation of the content on the user interface 702.

Figure 11:
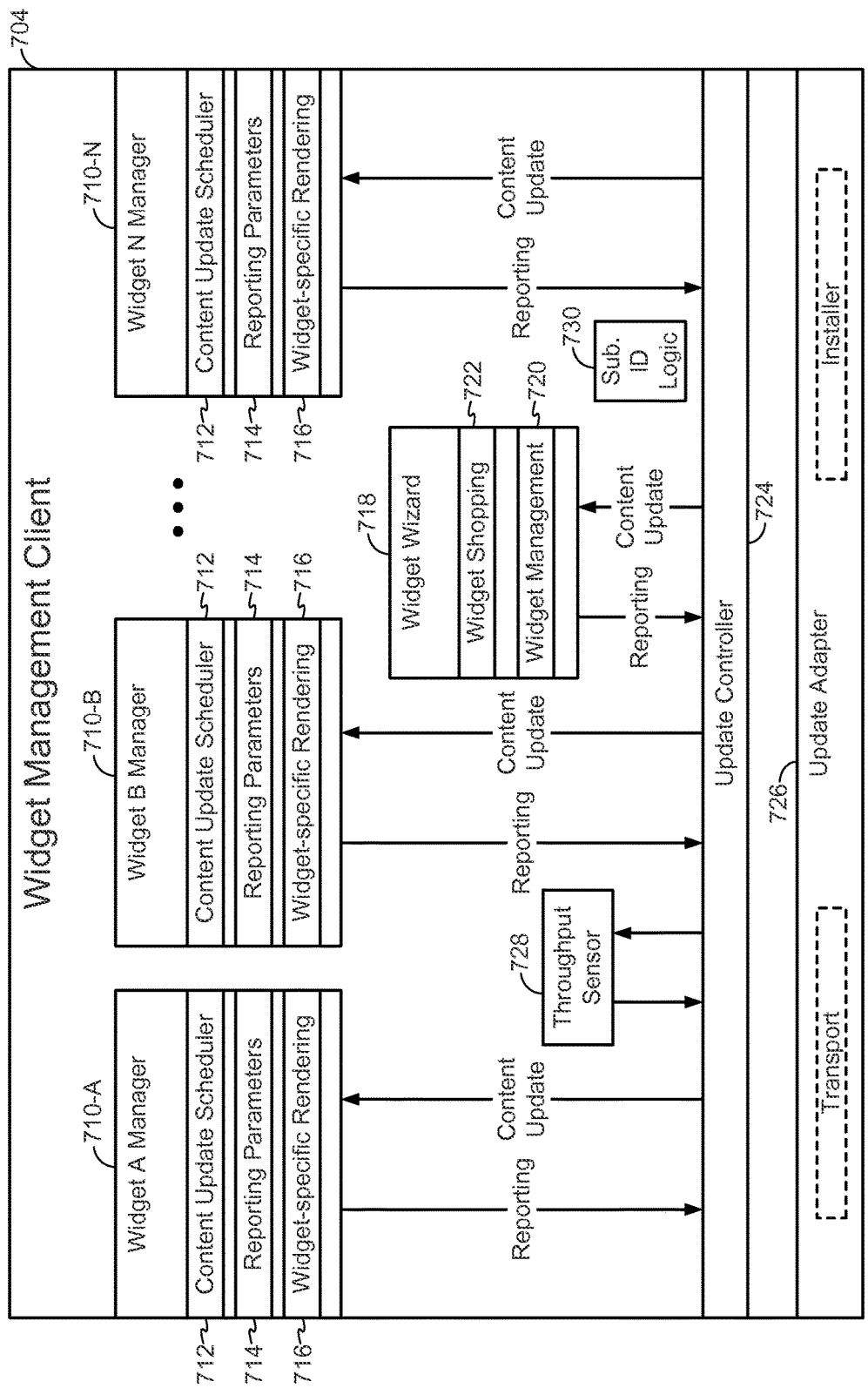
FIG. 11 is a schematic diagram of an aspect of the widget management client (WMC) of FIG. 1.

FIG. 11 provides a more detailed block diagram representation of the Widget Management Client (WMC) 704, which is stored on the wireless communication device 700. The WMC includes one or more widget managers 710 each corresponding to a mobile widget 102 stored on the wireless device 700. The illustrated aspect of FIG. 11 depicts widget managers, 710-A, 710-B and 710-N, where N represents the last widget manger 710 from among the plurality of widget managers.

Widget manager 710 includes a content update scheduler 712 that includes logic that is operable to be update the schedule for content delivery based on one or more preconfigured content delivery attributes. Content delivery attributes may include, but are not limited to, widget usage, time of day/week/month/year, user/device location or the like. For example, widget usage may dictate that more frequently accessed widgets (e.g., widgets that are clicked-on or the like) are provided more frequent content updates while less accessed widgets are provided less frequent content updates. In another example, the logic may determine what time of day a user is most likely to access a widget and, in turn, schedule more frequent content updates during that time. Additionally, the logic may associate location with content updates, such that when the user/device is the vicinity of a specified location, more or less frequent updates occur. For example, if a user is within the vicinity of a sports stadium, the logic may be configured to provide more frequent updates for a sports information-related widget.

It should be noted that while the content update scheduler 712, provides logic to determine update schedules based on one or more content delivery attributes; the schedule can also be based on network preferences/factors for content delivery and/or user configuration of content schedules. Therefore, the content update schedule 712 may additionally include logic that provides for prioritizing, weighting, or otherwise factoring content delivery based on the content delivery attributes, the network preferences/factors, and/or the user configuration. Additionally each widget manager 710 may be configured such that the user may override the content update scheduler 712 and either provide for their own content update schedule via an option in the widget management module 722 of the widget wizard 718. Additionally the widget may be configured through the widget management module 722 of the widget wizard 718 with a button or other user interface that allows for the user to instantaneously request a content update.

Figure 12:
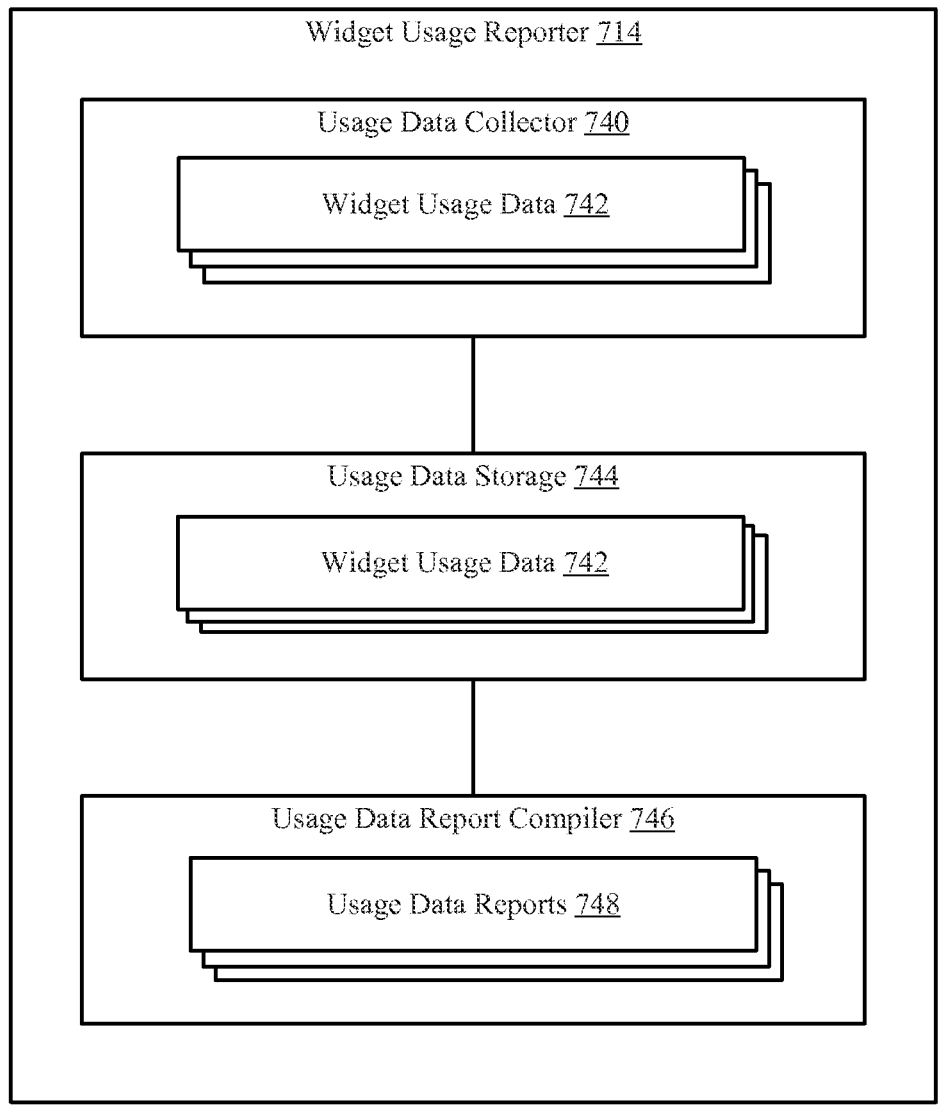
FIG. 12 is a schematic diagram of an aspect of a widget usage reporter of the system of FIG. 1.

Widget manager 710 also includes widget usage reporter 714 that includes logic operable for collecting and reporting widget usage information. FIG. 12 provides a more detailed block diagram of the widget usage reporter 714. The reporter 714 may include usage data collector 740 operable to collect widget usage data 742. The widget usage data may include, but is not limited to, such as widget access frequency, the depth of the access (i.e., how many click-throughs the widget undergoes during an access), the time of day/week that the widget is accessed and the like. The usage reporter 714 may additionally usage data storage 744 or optionally the widget usage data 742 may be stored in another data storage component external from the widget usage reporter 714 or the widget management client 704. The usage reporter 714 may additionally include a usage data report compiler 746 operable for compiling raw usage data into one or more usage data reports 748 based on network operator, widget developer and/or third party report criteria. Alternatively, in other aspects, the widget usage reporter may communicate raw widget usage data 742 to the network.

The collected widget usage information, either raw widget usage data 742 or compiled usage reports 748, to network entities. For example, the widget usage data 742 may be communicated to a network entity, such as digital locker 304 of Widget Management System (VMS) 300 (FIGS. 1 and 8). The WMS may implement the usage data 742 to determine content update schedules for the widget, to prioritize widgets in the user's personal widget catalog or the like. Additionally, the WMS 300 may communicate the usage information to a backend system 101 (FIG. 1) for reporting purposes and/or billing purposes.

Referring again to FIG. 11, widget manager 710 additionally includes widget-specific renderer 716 that includes logic operable for presenting the widget 102 on the wireless device 700 based on one or more rendering attributes. Rendering attributes widget usage, time of day/week/month/year, user/device location or the like. For example, widget usage may dictate that more frequently accessed widgets (e.g., widgets that are clicked-on or the like) are provided on the initial wall of the user interface or in a prominent position on the user interface. In another example, the logic may determine that the date is a Sunday during the fall season and therefore a football score reporting widget may be provided on the initial wall of the user interface or in a prominent position on the user interface. It should be noted that while the widget-specific renderer 716 provides logic to determine where a widget should be rendered on a display the renderer 716 may also provide for user configuration of rendering rules that may override or augment the rendering decision made by the logic.

The WMC 704 additionally includes a widget user interface, such as widget wizard 718, operable to provide the user with an interface to manage which widgets 102 are stored and presented on the wireless device 700, as well as an interface to purchase or otherwise obtain widgets from a marketplace. In addition to a wireless device-based user interface, such as the widget wizard 718, the system 100 may include a network-based user widget management portal 800 (FIG. 1), which provides for the device user to access the network from another wired or wireless device, such as a PC or the like, to make changes to the configuration settings, purchase/obtain additional widgets or otherwise manage the widgets presented on the wireless device.

Figure 13:
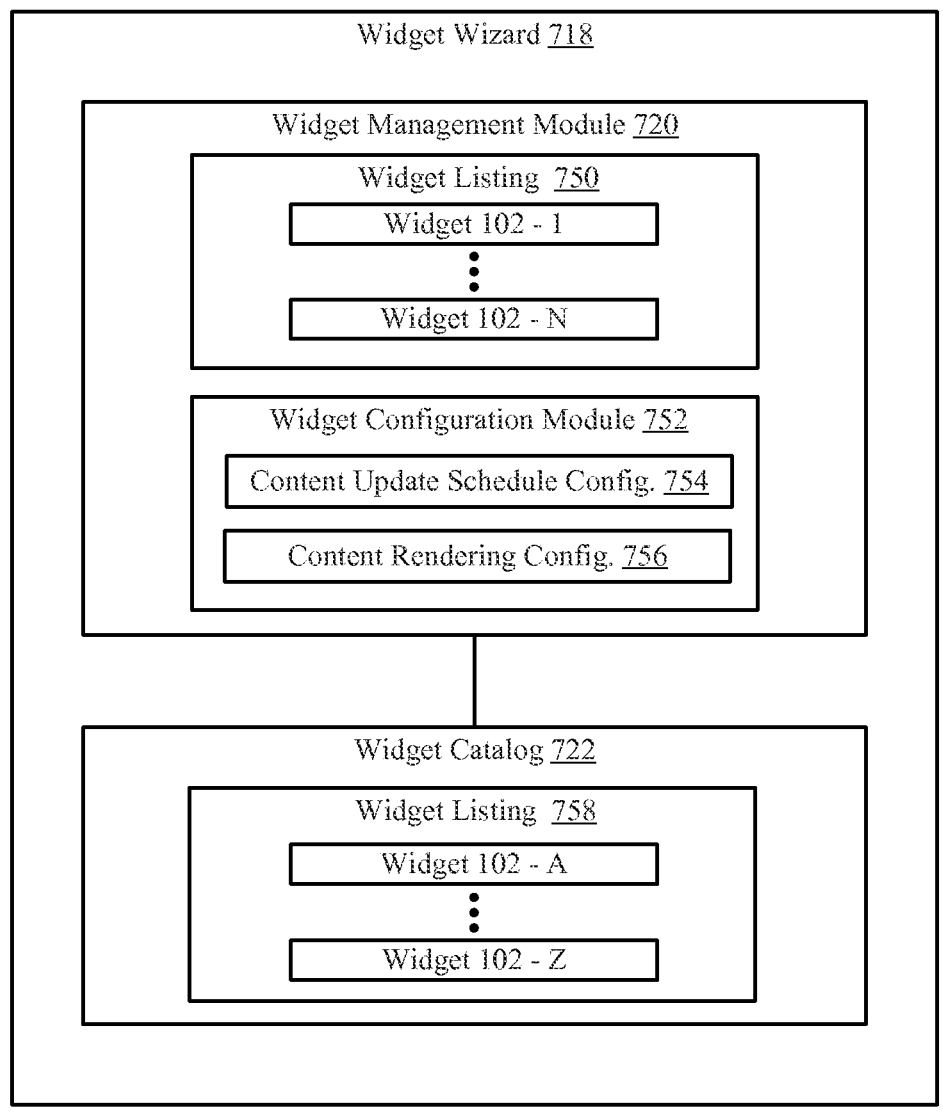
FIG. 13 is a schematic diagram of an aspect of a widget wizard of the WMC of FIG. 11.

The widget wizard 718 may include widget management module 720 operable to provide the user with management over the widgets that are displayed on the user interface 702. In addition, the widget wizard 718 may include widget catalog 722 operable to provide a user a current listing of the widgets currently available from the network operator or some other network source. FIG. 13 provides a detailed block diagram of various components of the widget wizard 718 including widget management module 720 and widget catalog 722. The widget management module may provide for a widget listing 750 that provides for the display of a listing of widgets 102 currently stored on the wireless device. The listing 750 provides for the user to instantaneously update the user interface with selected widgets. In this regard, a user can instantaneously deactivate a widget currently being presented/displayed and replace the widget with another widget stored on the device. In addition, the widget management module 720 provides for widget configuration module 752 that is operable to provide for the user to configure the widgets based on personal preferences. The widget configuration module 752 may include content update schedule configuration 754 operable to allow the user to define the frequency by which each widget is provided content updates and content rendering configuration 756 operable to provide the user with the ability to define the manner in which widgets are rendered/presented on the user interface, such as the position on the display, the size of the widget or the like. Upon user changes to the configuration settings in configuration module 752, the widget wizard 718 may upload or otherwise communicate the configuration changes to the network for storage in the digital locker 304 associated with the user 104 and/or the wireless device 700.

The widget wizard may additionally include widget catalog 722 that provides a widget listing 758 of widgets currently available from the network source. The listing of widgets in the catalog may be periodically updated, based on a set schedule or a user input, to insure the currency of the widgets available to the user. The update or initial receipt of the catalog may be provided by the WMS 300. In addition, the listing 758 may be customized for the user based on previous widget usage patterns or other attributes, such as time, location or the like.

In certain aspects, advertising widgets may be presented to the client as an option via the widget catalog 722. In some aspects, advertisement widgets may be offered to the user as a means of subsidizing or otherwise replacing the cost of other widgets. It should be noted that if widget management client 704 is configured to provide for the presentation of advertising widgets, the advertising widgets may be "locked" widgets, which do otherwise allow the user to manage or configure the widgets through the widget wizard 718. By locking the advertising widgets the network operator anti/or advertiser is assured that the advertisements are being displayed/presented without the user otherwise choosing to opt-out of the advertising widgets. Additionally, in those aspects that provide for advertising widgets the widget usage reporter 714 may be configured to provide specific collection and reporting of usage data related to the interaction that a user may experience with an advertisement, such as time viewed or the accessed depth of the advertisement.

Referring again to FIG. 11, the WMC 704 additionally includes update controller 724 and update adapter 726. The update controller 724 is operable to control upstream and downstream data delivery to and from WMC 704. For example, the update controller 724 may be operable to control the delivery of usage data 742 or usage data reports 748 to network entities, widget configuration settings, and/ or user requests to purchase/obtain a new or updated widget. In certain aspects, the update controller 724 may be operable to collate and provide data to network entities, such as the Widget Management System (WMS) 300. In addition, update controller 724 may be operable to receive widget content updates, updates to the widget catalog 722, configuration settings for content update schedules, content reporting requests or the like.

Further, the update adapter 726 is operable to handle the upstream and downstream transport of the data from the WMC 704 to the appropriate network entity. In this regard the update adapter 726 is operable to receive/transmit data over a specified type of network connection, for example, an Internet Protocol (IP) socket, a HyperText Transfer Protocol (HTTP) socket, Short Messaging Service (SMS), or the like. Additionally, the update adapter 726 is operable to compare the existing configuration of widgets with WMS-pushed configurations and make changes to the configurations accordingly; such as instantiating new widgets and/or disabling deactivated widgets.

The WMC 704 may additionally include a throughput sensor 728 operable for sensing the throughput time and estimating the time to download content update for a widget. The throughput sensor 728 is operable to be engaged upon opening WMC 704, and approximate throughput time can be sensed by establishing an IP connection and measuring the Round Trip Time (RTT). Based on the approximate throughput time and the size of the previous content update for a widget of interest, an estimate can be established of the time to update a widget and provided to the user when the user requests an update. In addition, the throughput sensor 728 may be configured to provide for a user warning if the content update will take more than a predetermined threshold of time.

The WMC 704 may additionally include subscriber ID/credential determiner 730 operable to determine the subscriber/user identification associated with the WMC 704. In one aspect, the subscriber ID determiner 730 may initiate a HTTP call and the response header may include the subscriber identification. In alternate aspects, the subscriber ID determiner may be derived from the wireless device or the like. Additionally, the subscriber ID/credential determiner 730 may be configured to determiner subscriber/user credentials by prompting the user to enter the appropriate credentials, e.g., user id. Based on the input, the user credentials are compared to the subscriber identification and if a match is determined, a report acknowledging the match may be communicated to the WMS 300 and a record created in the digital locker 304 associated with the subscriber/user. Subsequently the subscriber ID and the subscriber credentials may be included in all messages communicated from the WMC 704 to the message router 500.

Figure 16:
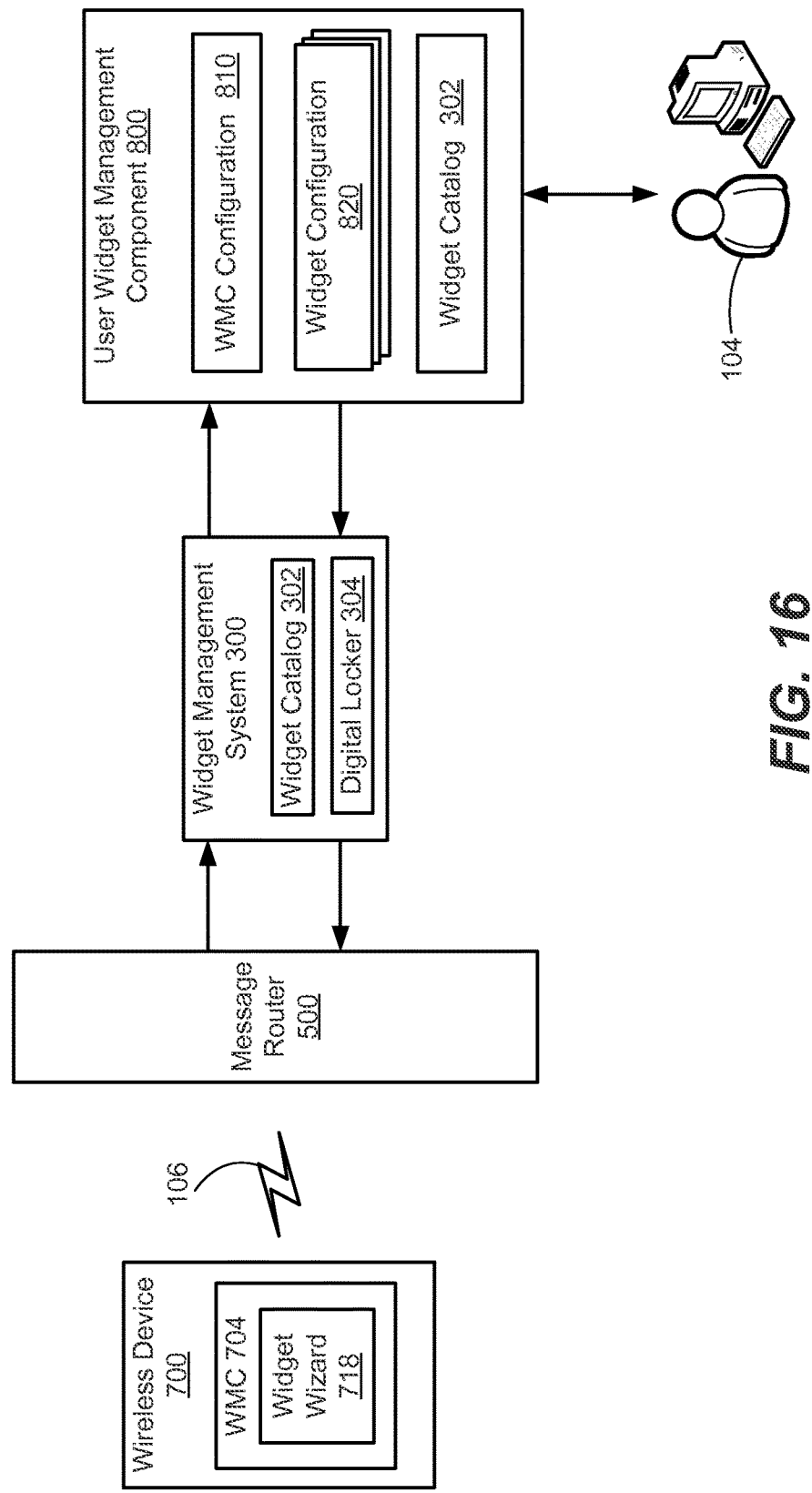
FIG. 16 is a schematic diagram of an aspect of a widget configuration architecture of the system of FIG. 1.

As previously noted, in addition to configuring the widget management client (WMC) 704 and associated mobile widgets 102 on the wireless device, the system provides for a user widget management portal 800. The user widget management portal 800 allows for the user 104 to access the component via another device, such as a wired PC or another wireless device, to manage the (WMC) on the wireless device 700. The user widget management portal 800 is in network communication with the widget management system (WMS) 300 and WMS 300 is in wireless communication with the wireless device 700 via message router 500. The user widget management portal 800 acts as complement to the widget wizard 718 on the wireless device 700 by providing user 104 remote access to the management of widgets on the wireless device. The user widget management portal 800 is operable to receive information pertaining to a user's current WMC 704 or widget 102 configurations from the user's profile stored in the digital locker 304 of WMS 300. As such, user widget management portal 800 may include a WMC configuration module 810 (FIG. 16) operable to provide user 104 with the ability to re-configure settings that apply to the overall WMC 704 in general. In addition, the user widget management portal 800 may include one or more widget configuration modules 820 operable to provide user 104 with the ability to reconfigure the widgets 102 currently stored on wireless device 700.

In addition to WMC and widget configuration, the user widget management portal 800 may provide for the user to learn about and/or acquire new widgets. As such, user widget management portal 800 may include widget catalog 302 as communicated from widget management system 300. In addition, the widget catalog 302 may be personalized for user 104 such that widgets of interest to user 104 are listed in the catalog near the beginning or are otherwise highlighted. Widgets of interest may be identified by the WMS 300 based on widget usage tracking/metering data communicated from the wireless device 700. Once a user selects, acquires or otherwise purchases a new widget, the user management portal 800 communicates the selection to the VMS 300 and the WMS 300 subsequently retries the widget from a corresponding content access server 900 (FIG. 17) and communicates the widget to the wireless device via message router 500.

Content Access Server/Content-Advertising-Tracking Components

Figure 17:
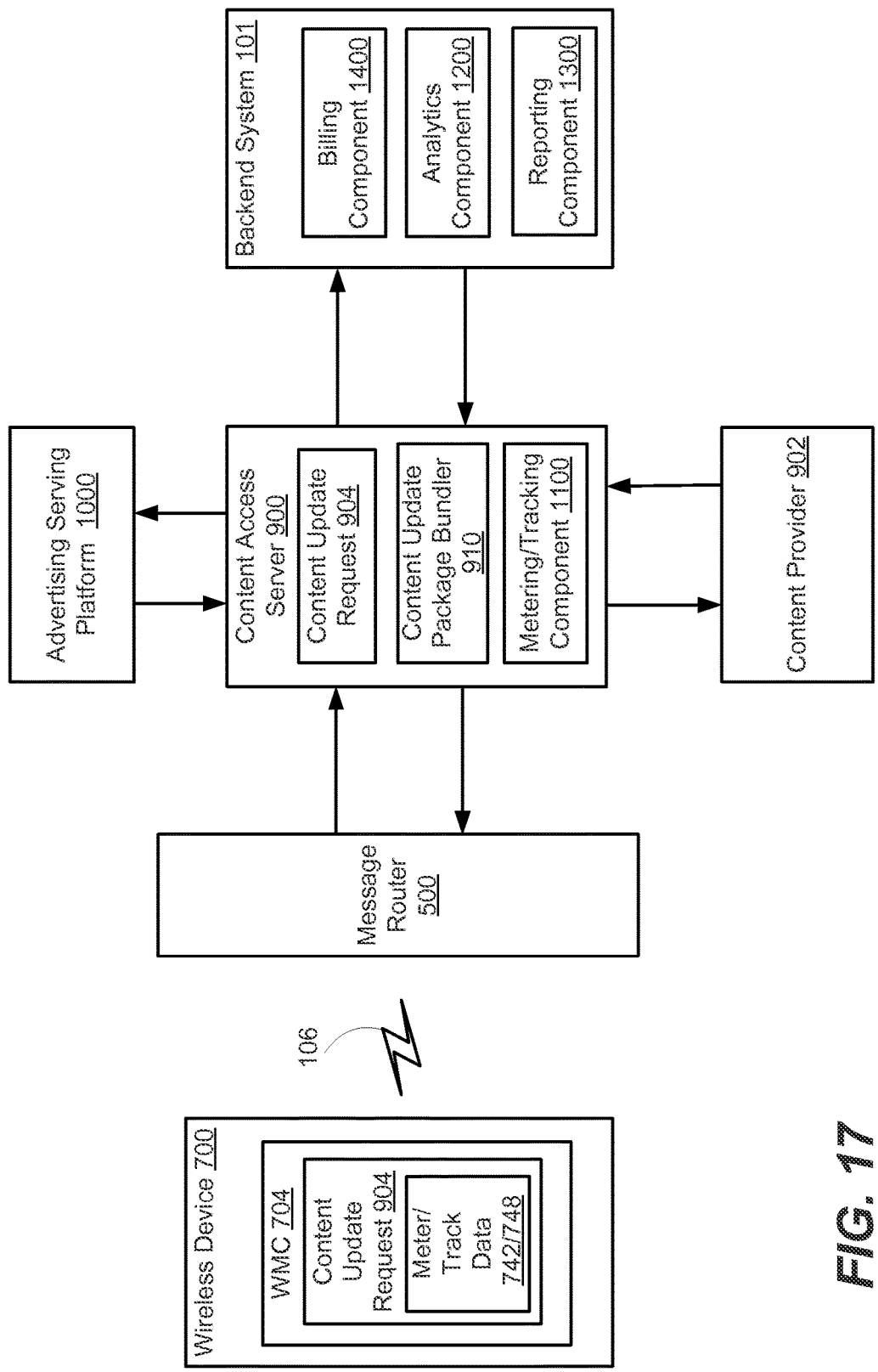
FIG. 17 is a schematic diagram of an aspect of a content access server of system of FIG. 1.

Referring to FIG. 17, a detailed block diagram highlighting the content access server 900 is depicted. Content access server 900 is operable to provide content to the mobile widgets 102 based on a predetermined update schedule for the widget. As previously mentioned the update schedule may be logically determined based on one or more content delivery attributes, network attributes and/or user configuration settings. A mobile widget 102 will initiate a content request 904 based on the update schedule, which is wirelessly received by the content access server 900 via the message router 500. The content access server 900 will act on the request 904 by retrieving current content from content provider 902 or, in the case of advertisements serving platform 1000, which is in communication with an advertisement source. Once the content update is retrieved, the update is communicated to the wireless device for presentation on the corresponding widget. For example, if the mobile widget is a sporting event score reporting widget, a request may be sent to the content access server and the content access server mat retrieve a content update, in the form of updated sporting event scores from a content provider 902, such as a web-based sports news site or the like, in one aspect, the content access server 900 may include a content package bundler 910 operable to bundle updates in a content update package, such as a /zip file or some other spectrally efficient compression mechanism. Bundling content updates in packages provides for smaller messages that can be more efficiently delivered to the wireless devices. Content updates can be communicated to the wireless device across different connections depending on the connections available at the wireless device. Examples of connections include, but are not limited, HTTP socket, IP socket, SMS, and the like.

In addition to providing content updates, content access server 900 may serve as the receiving point for metering/tracking data communicated from the WMC 704. In some aspects, the content update request 904 may include the metering/tracking data, such as widget usage data 742 or widget usage reports 748. In such aspects, the content access server 900 includes a metering/tracking component 1100 operable to parse the widget usage data 742 or widget usage reports 748 from the request and route the metering/tracking data to a content provider 902 or the advertising serving platform 1000. In addition, the content access server may communicate the metering/tracking data to a backend system 101, which includes an analytics component 1200 operable for receiving the metering/tracking data and logically determining usage patterns or the like. The analytical data may be subsequently communicated and used by the reporting component 1300 to generate predetermined reports and by the billing component 1400 to generate widget bills, such as widget billing based on widget usage rates.

Figure 14:
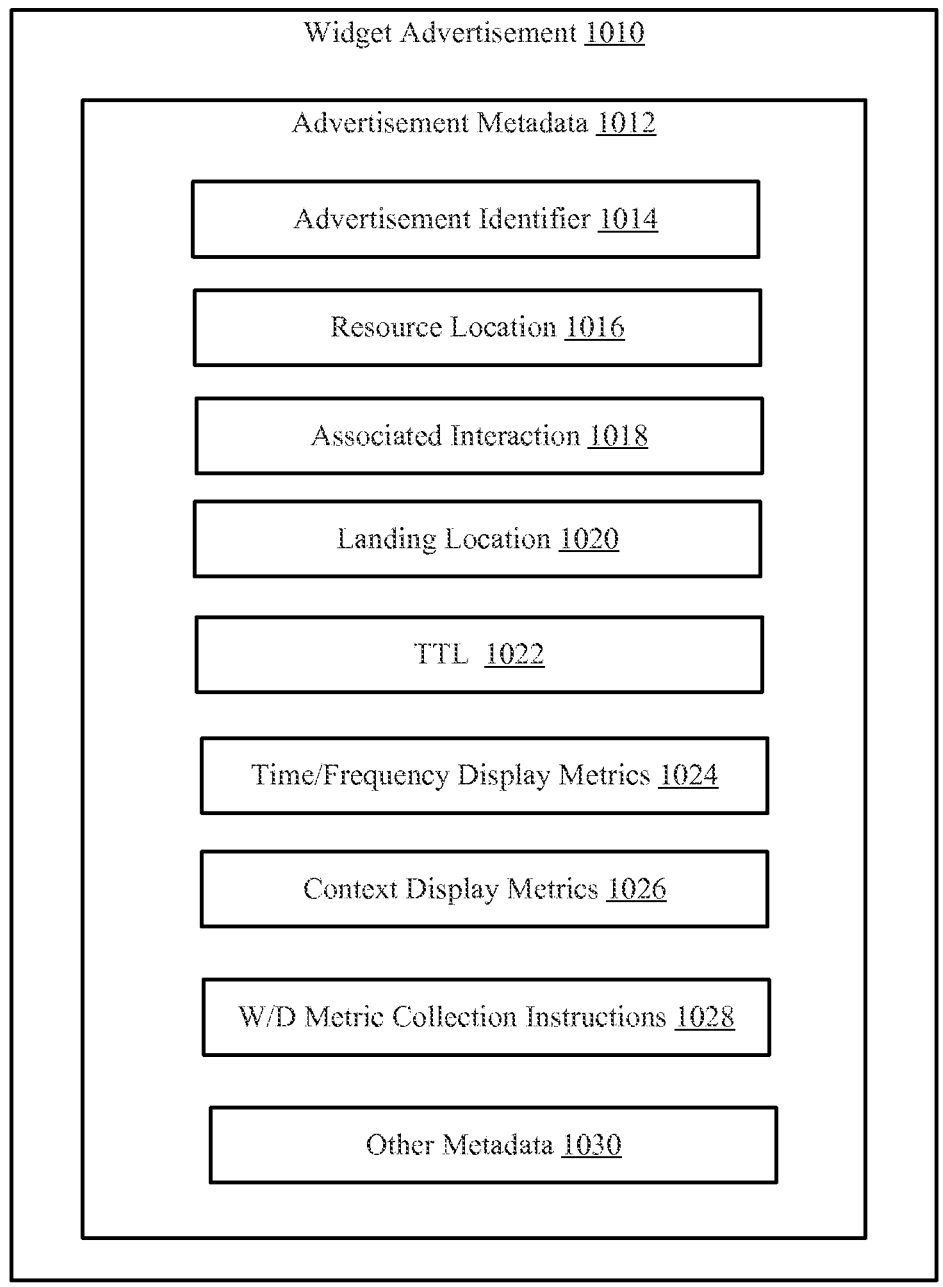
FIG. 14 is a schematic diagram of an aspect of a widget advertisement of the system of FIG. 1.

As previously noted, one or more widgets that are stored and presented on the wireless device 700 may include advertising widgets operable to display advertisements in widget form. In certain aspects, advertising widgets may be provided by the widget operator as an opt-in feature, in which the user is offered the option of opting to accept advertising widgets in lieu of some form of compensation, such as a reduction in the cost of other non-advertising widgets or the like. Thus, advertisement widgets may be configured be the widget providers in conjunction with the advertisers as a "locked" widget, meaning that the user is unable to re-configure the widget or otherwise deactivate the widget on the wireless device. FIG. 14 provides a block diagram of an example of a widget advertisement 1010 and, more specifically, the advertisement metadata 1012 included in such advertisements. The metadata 1012 may include an advertisement identifier 1014, such as id number that serves to identify the advertisement, and a resource location identifier 1016 that serves to identify the source of the advertisement, such as an IP address or the like. The metadata 1012 may additionally include associated interaction 1018, which serves to define user interactions with the advertisement, such as click-to-browse functionality or the like and/or landing location 1020, which defines a URL location for user interaction other than click-to-browse. In other aspects, the metadata 1012 may include the TTL (Time to Live) 1022 for the Advertisement, which defines the expiration date for the advertisement on the wireless device, and time/frequency of display metrics 1024, which define specific times and/or the frequency by which the advertisement should be displayed on the wireless device. Additionally, the metadata 1102 may include contextual display metrics 1026, which define other context parameters related to the display of the advertisement and wireless device metric collection instructions 1028, which define the metrics that are to be collected at the wireless device, and subsequently communicated to the network, in relation to the display of the advertisements, such as time/frequency of display, frequency of user interaction with the advertisements, depth of click-throughs and the like. The metadata 1012 may additionally any other metadata 1012 related to the advertisement 1010, the display of the advertisement on the widget or the reporting functions.

Figure 15:
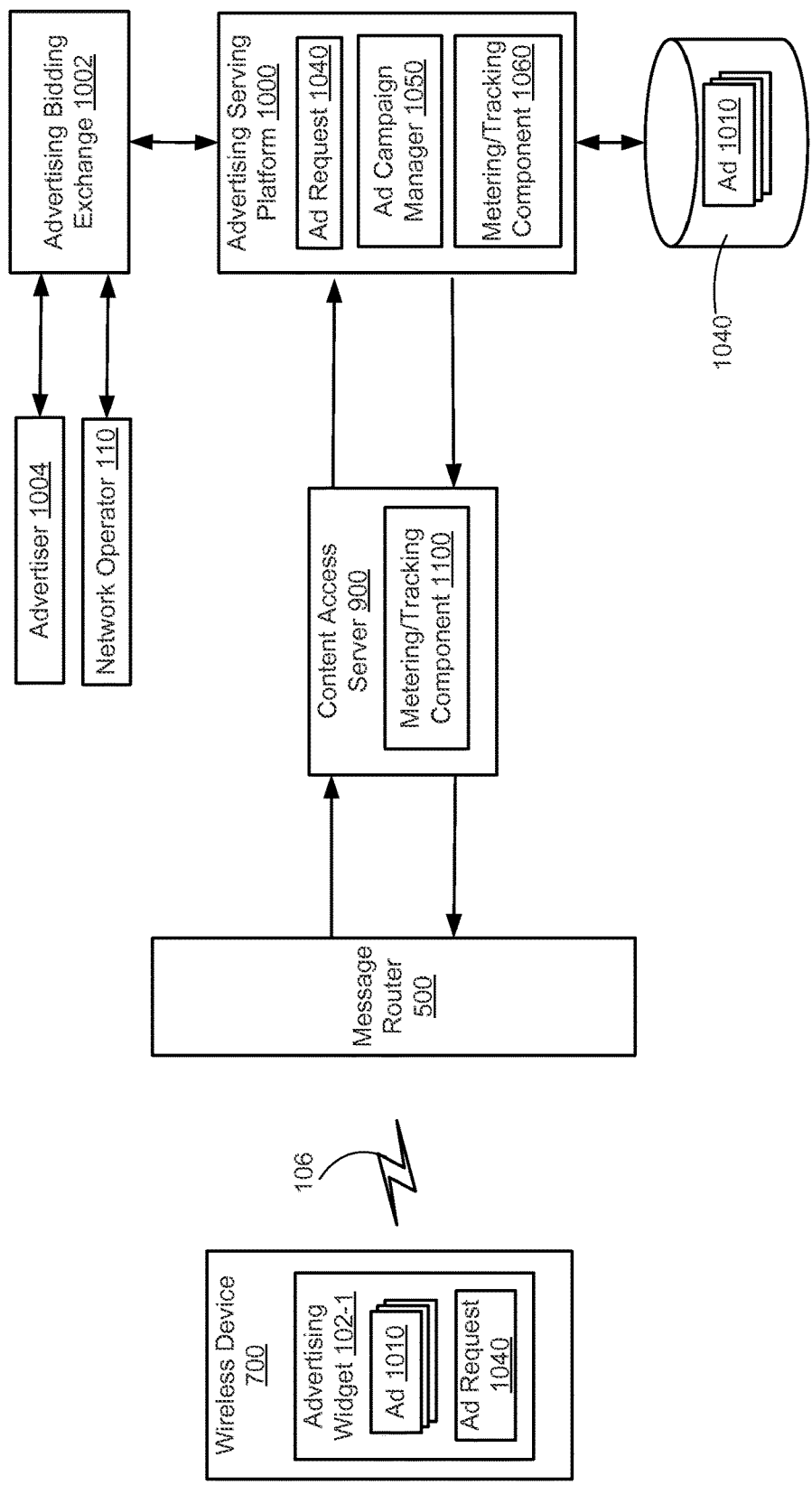
FIG. 15 is a schematic diagram of an aspect of an advertising architecture of the system of FIG. 1.

As shown in the block diagram of FIG. 15, advertisements 1010 are wirelessly communicated to the advertising widget 102-1 on the wireless device 700 via an advertising source, such as advertising serving component/platform 1000. The advertising serving platform 1000 is in communication with content access server 900, such that advertisements 1010 are communicated from the advertising serving platform 1000 to the wireless device 700 through the content access server 900. Additionally, the message router 500 is in communication with the content access server 900 and serves to insure that the advertisements and related information are communicated to and from the wireless device via the wireless network 106 using a unified communication protocol. The advertising serving platform is in communication with an advertisement database 1040 that stores the inventory of advertisements 1110. Thus, the advertising serving platform is operable to retrieve advertisements 1110 from the database 1020 and communicate the advertisements to the advertising widget 102-1 on the wireless device.

In addition, similar to a content update request as described above, wireless device may issue an advertisement request 1040 operable to request delivery of an advertisement for presentation of an advertisement on the wireless device. The advertisement request is received by the advertising serving platform 1000, which obtains an advertisement from advertisement database 1040. The advertisement request may include, an identifier, issued by the advertising serving platform 1000, which identifies the WMC 704. The request may additionally include a metering/tracking report that identifies advertisements recently presented and the number of presentations during the TTL.

Additionally, the advertising serving platform 1000 may further comprise an ad campaign manager 1050 operable to manage advertising campaigns for advertisers by communicating advertisements to advertising widgets based on advertising campaign criteria. Advertising campaign criteria may dictate that certain advertisements are pushed to wireless devices having expiration dates and frequency of display rates related to the advertising campaign. In other aspects, the advertising campaign may target certain demographic information related to users, or certain wireless devices, such that certain advertisements are targeted for users and/or wireless devices that are within the target audience confines. Demographic information may include, but is not limited to, user gender, user interests, user income, user age, user address, current used/wireless device location, and the like.

The advertising serving platform 1000 may additionally include a tracking/metering component 1060 that tracks and meters information related to the display of the advertisements on users advertising widgets. The tracking/metering component 1100 may parse out those metering and tracking data related specifically to advertisements 1010 and advertising widgets 102-1 and communicate the advertising related metering and tracking information to the tracking/metering component 1060 of the advertising serving platform 1000. The tracking/metering data that is communicated from the WMC 704 may include advertisement identifiers, number of presentations/displays on the advertising widget, depth of user interaction (e.g. number of click-throughs), elapsed time of user interaction/viewing of advertisement and the like.

The advertising serving platform 1000 may additionally be in communication with an advertising bidding exchange server 1002 that is operable to allow for an advertising bidding marketplace to occur between advertisers 1004 and network/widget operators 110. The bidding exchange marketplace may provide for the advertisers 1004 to bid on widget advertising based one or more advertising criteria, such as a position/placement of the advertisement on the widget wall, the frequency of presentation, the time of presentation, the demographics of the target audience and the like. In addition, the bidding exchange marketplace may provide for the advertisers to bid based on broadcast and/or multicast presentation of advertisements in the widget. In one aspect, the bidding exchange marketplace is a publicly available marketplace, such as an Internet-based marketplace that allows for all advertisers or potential advertisers to bid on widget-based advertising.

Backend System

Referring back to FIG. 1, as previously noted, in some aspects, system 100 may have a backend system 101 for analyzing the tracked data and transactions within system 100. Backend system 101 may include one or any combination of analytics component 1200, reporting component 1300, and billing component 1400.

Analytics component 1200 receives and examines the data of system 100.

Reporting component 1300 generates reports, including operator/carrier proprietary information 1302, based on the results of the analysis of analytics component 1200.

Billing component 1400 accounts for transactions in system 100 and debits and/or credits one or more end users 104, developers/providers 108, operators/carriers 110, or advertisers 908.

Sample Call Flows

Figure 18:
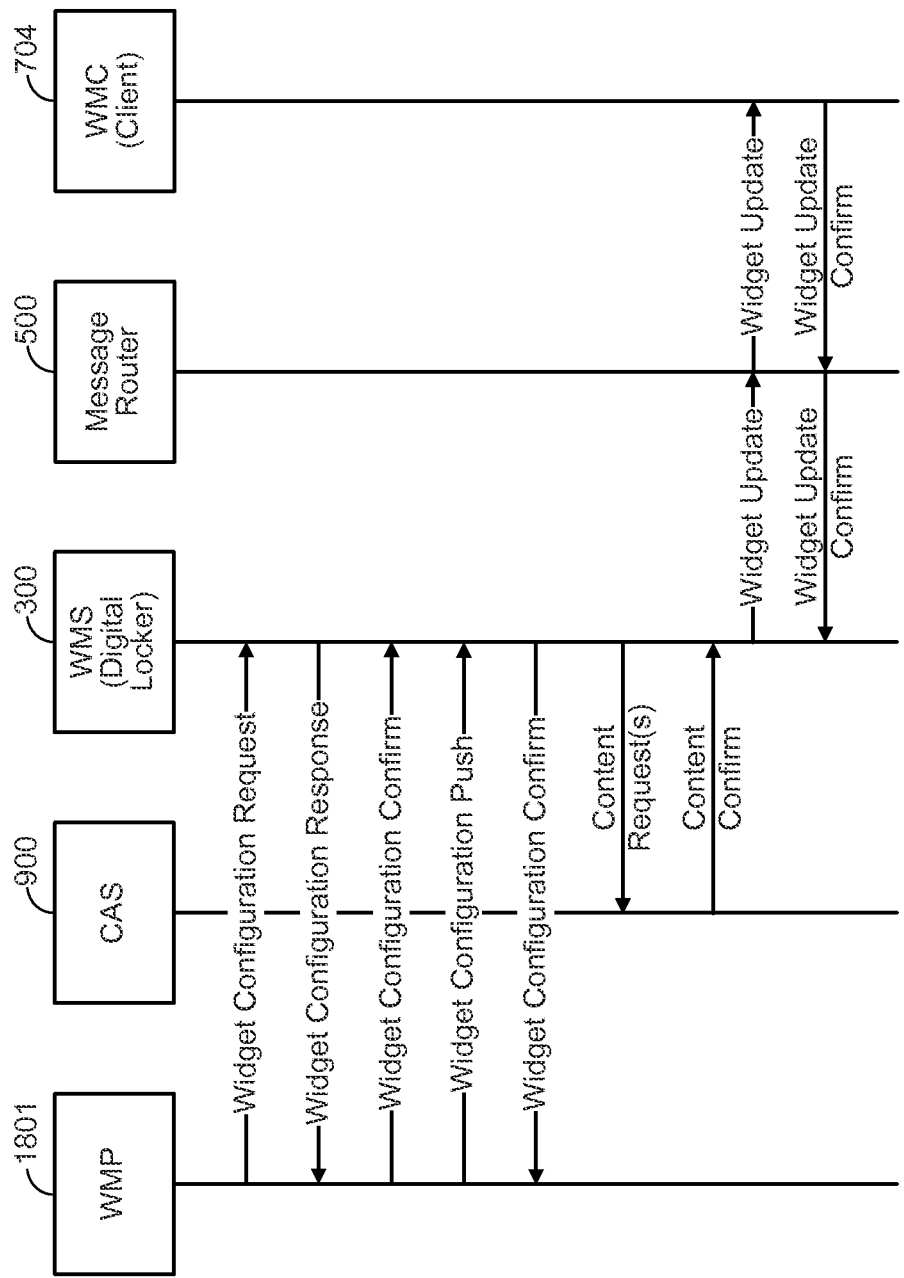
FIG. 18 is a call flow relating to an aspect of selecting and updating a mobile widget in the system of FIG. 1.

Referring to FIGS. 18-23, according to some aspects, some non-limiting examples of call or messages flows are listed for various scenarios. Referring to FIG. 18, for example in one aspect, a high level call flow relates to a widget management portal (WMP)-originated selection and configuration of a new mobile widget. In particular, WMP interacts with WMS to select and configure the mobile widget. The WMS interacts with CAS to obtain the content for the mobile widget. Additionally, the WMS forwards the mobile widget and/or the content update for the mobile widget to the WMC via the message router.

Figure 19:
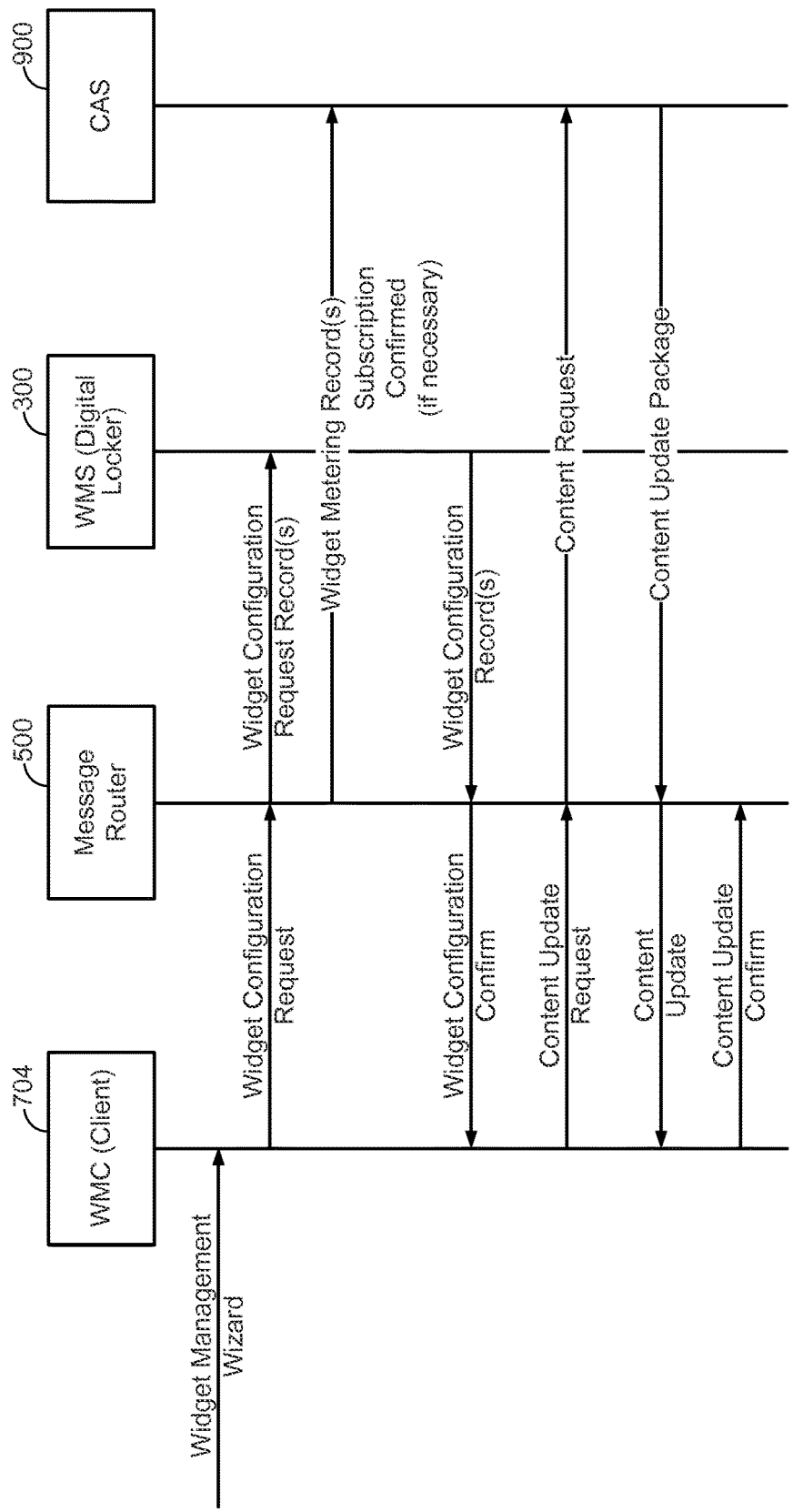
FIG. 19 is a call flow relating to an aspect of selecting and updating a mobile widget in the system of FIG. 1.

Referring to FIG. 19, for example in one aspect, a high level call flow relates to a WMC-originated selection, configuration and updating of a mobile widget. In particular, WMC interacts with WMS to select and configure the mobile widget. The WMS interacts with CAS to obtain the content for the mobile widget. Further, the WMC may request a content update for the mobile widget from the CAS, which responds with the updated content, which the WMC confirms receiving.

Figure 20:
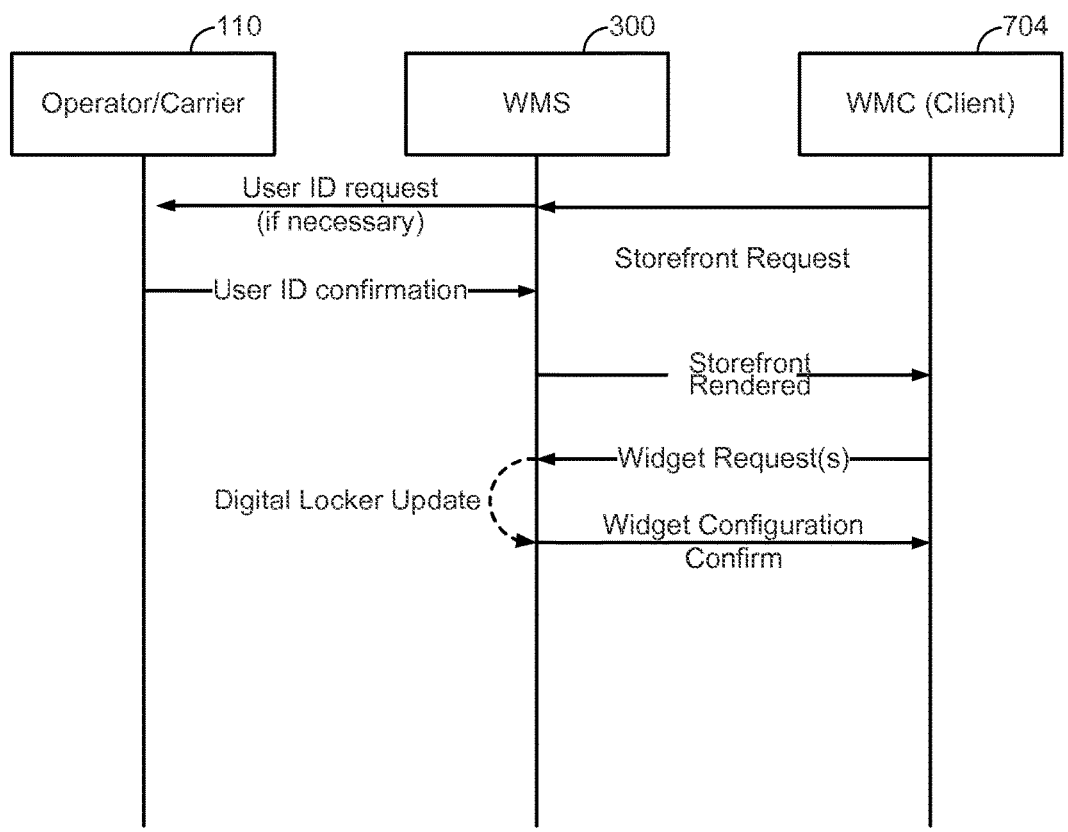
FIG. 20 is a call flow of relating to an aspect of operator/carrier control of access to mobile widgets in the system of FIG. 1.

Referring to FIG. 20, for example in one aspect, a high level call flow relates to a WMC accessing a web storefront in the WMS, wherein the operator/carrier authorizes the access. In particular, the WMC requests access to the storefront from the WMS, which verifies with the operator/carrier that WMC is authorized for such access. For example, the verification may include passing an identifier or a credential associated h the WMC or the end user to a content management server or authorization server of the operator/carrier to determine if WMC is authorized. Upon receiving an authorization, WMS is then able to provide WMC with access to the storefront and allows subsequent interaction for downloading of mobile widgets.

Figure 21:
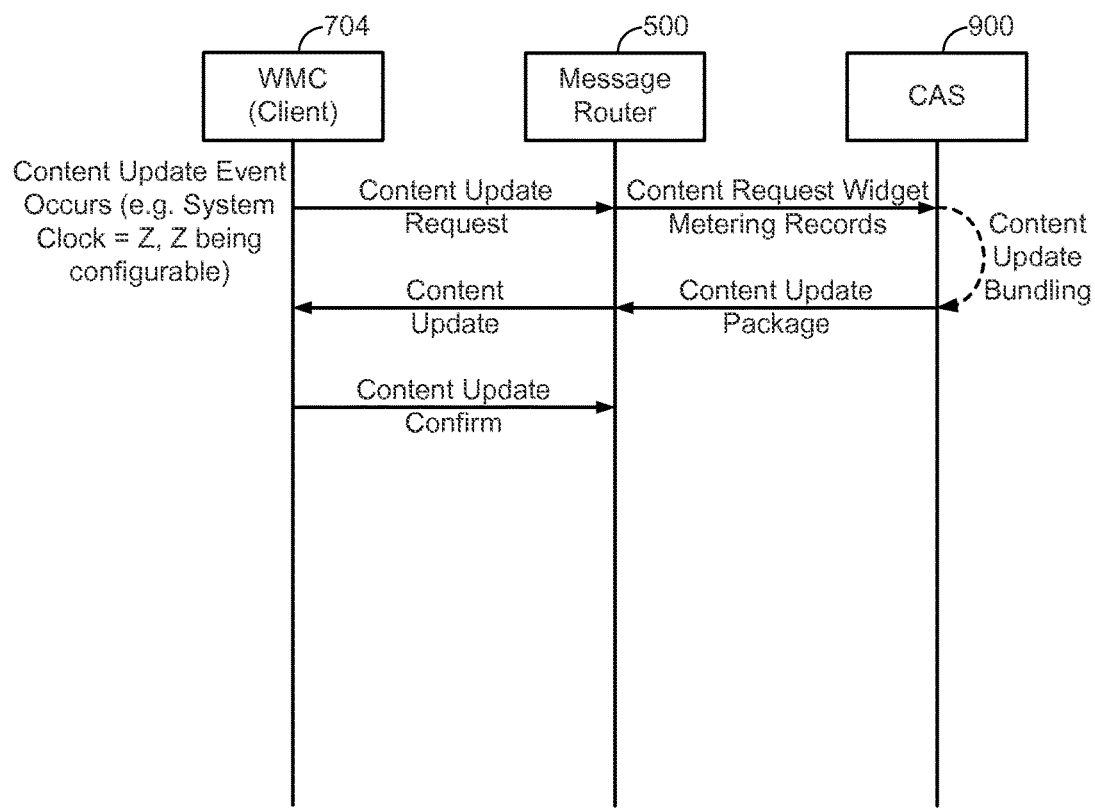
FIG. 21 is a call flow of relating to an aspect of updating a mobile widget in the system of FIG. 1.

Referring to FIG. 21, for example in one aspect, a high level call flow relates to a content update requested by a WMC. In particular, based on the occurrence of a content update event, WMC sends a content update request via the message router to the CAS. The CAS bundles the corresponding content update and transmit it to the WMC via the message router. It should be noted that in one example, the content update request may be user initiated. Additionally, it should also be noted that WMC may package metering/tracking data along with the content update request. In this case, CAS is operable to route the metering/tracking data to other infrastructure elements, such as the analytics component of backend system and/or the advertisement serving platform.

Figure 22:
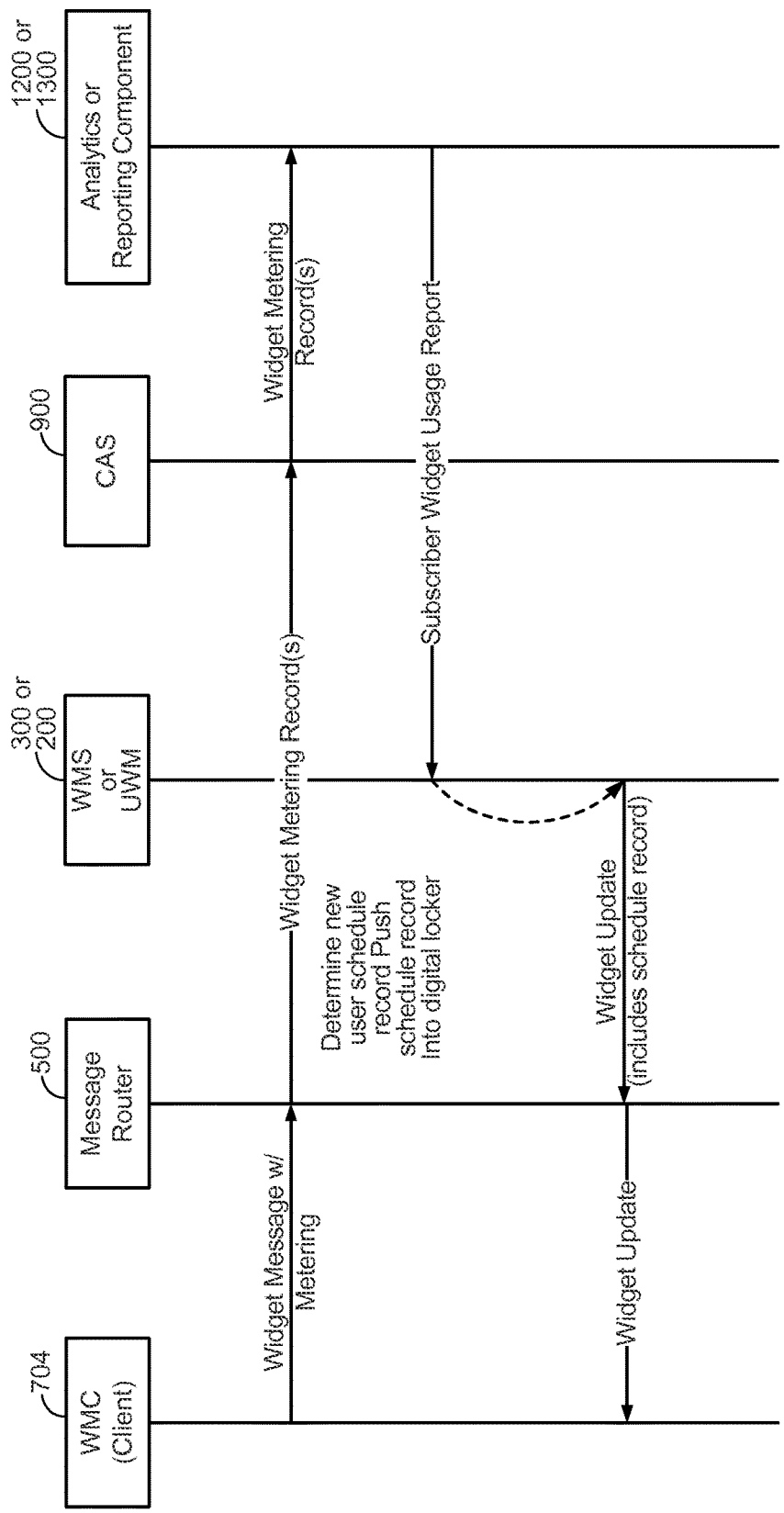
FIG. 22 is a call flow of relating to an aspect of adjusting a content update schedule for a mobile widget or an end user in the system of FIG. 1.

Referring to FIG. 22, for example in one aspect, a high level call flow relates to a reporting of widget metering/tracking data and a corresponding adjustment of a widget update schedule based on the reported metering/tracking data. In particular, WMC transmits a widget message that includes metering/tracking data to CAS via message router. CAS is operable to route the metering/tracking data to other infrastructure elements, such as the analytics and reporting components in this case. The analytics and reporting components then determine usage data based on the reported metering/tracking data, which is provided as an input to the WMS and/or the UWM for use in determining content update schedules. Based on the usage data, a new update schedule is determined for one or more users, and/or for one or more mobile widgets. The new update schedule is stored at the WMS and/or the UWM, and is further communicated to the WMC via the message router. Thus, a new update schedule is effected based on an analysis of the reported metering/tracking data provided by WMC.

Figure 23:
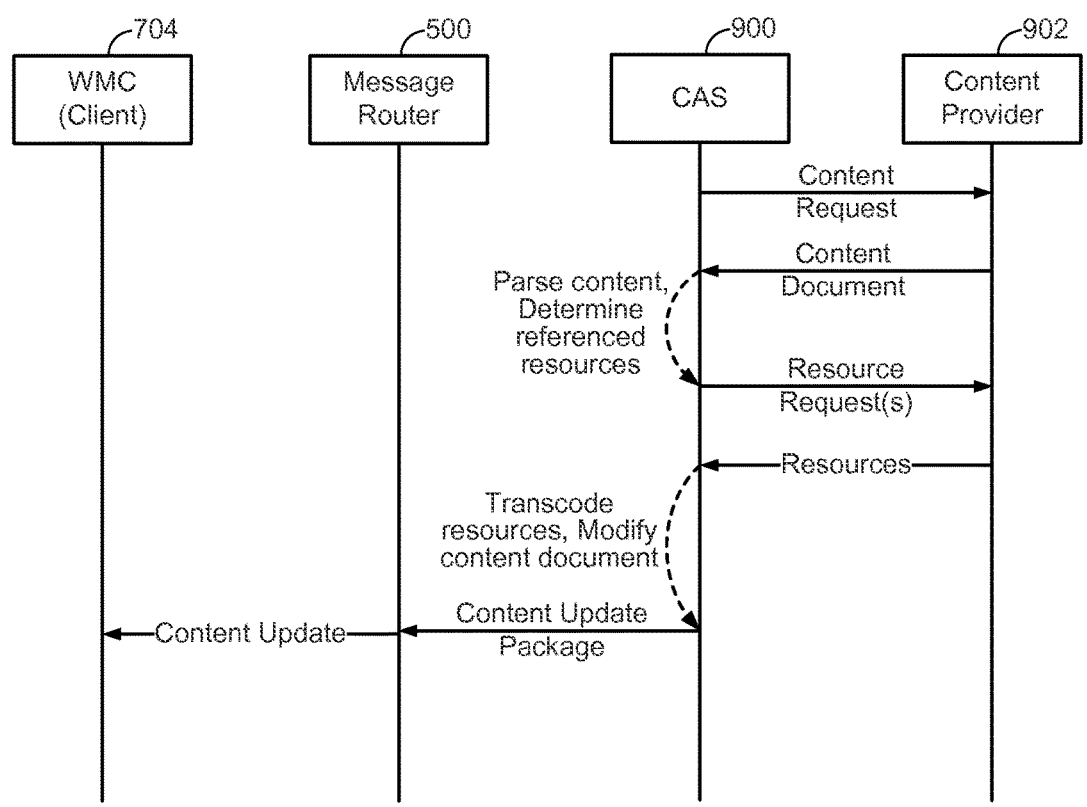
FIG. 23 is a call flow of relating to an aspect of updating a mobile widget in the system of FIG. 1.

Referring to FIG. 23, for example in one aspect, a high level call flow relates to the CAS providing WMC with a content update. In particular, CAS transmits a content request to a content provider, who responds with a content document. The content document may include various updated content, as well as references to resources for further content updates. The CAS parses the content document and, if necessary, requests the additional resources from the content provider. Upon receiving the requested resources, the CAS transforms the resources and the other content from the content document into an update package for delivery to WMC. Upon completing the transformation, the CAS forwards the content update packet to the WMC via the message router.

Widget/System Security

Figure 24:
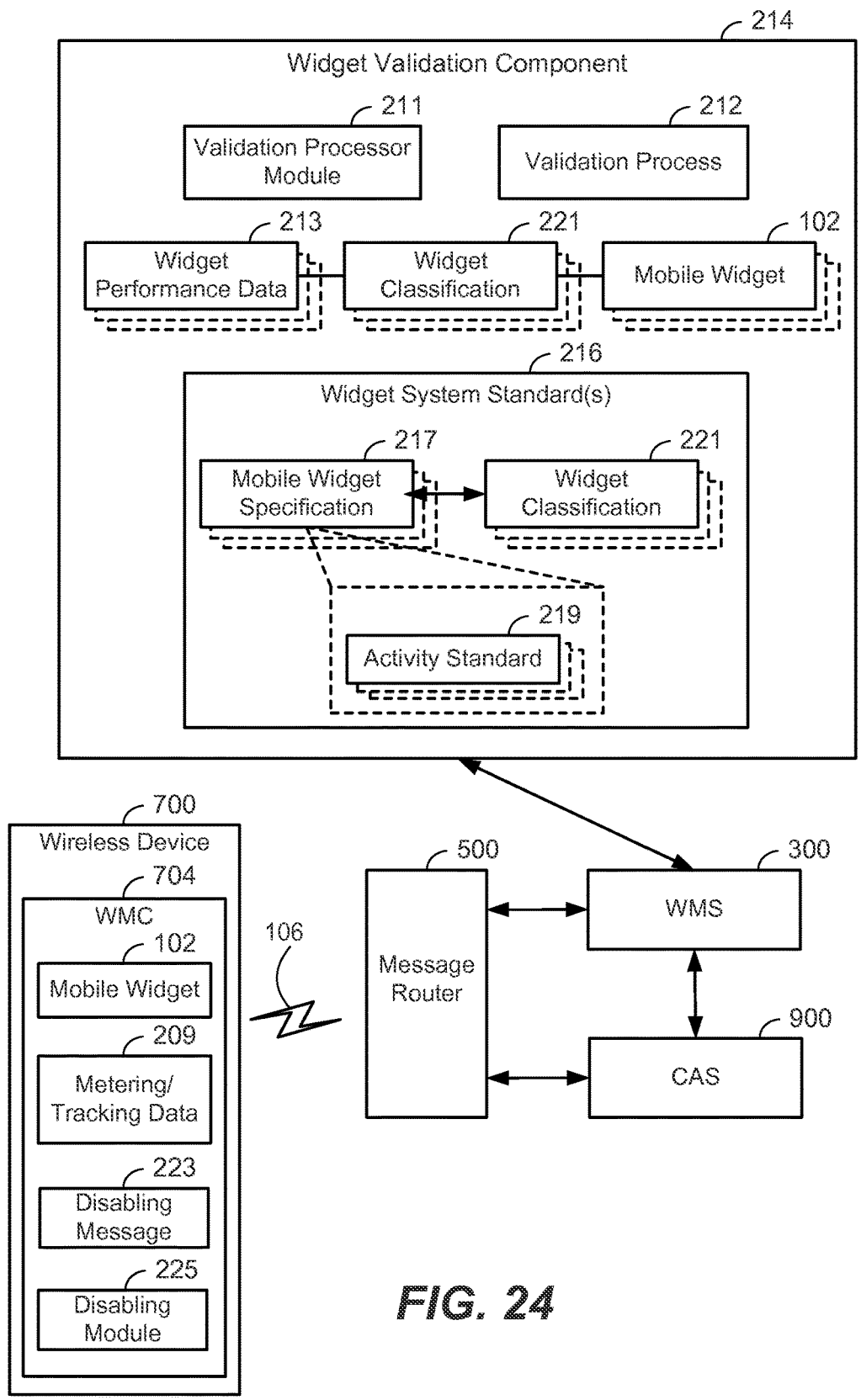
FIG. 24 is a schematic diagram of an aspect of insuring widget security in the system of FIG. 1.
Figures 25, 26:
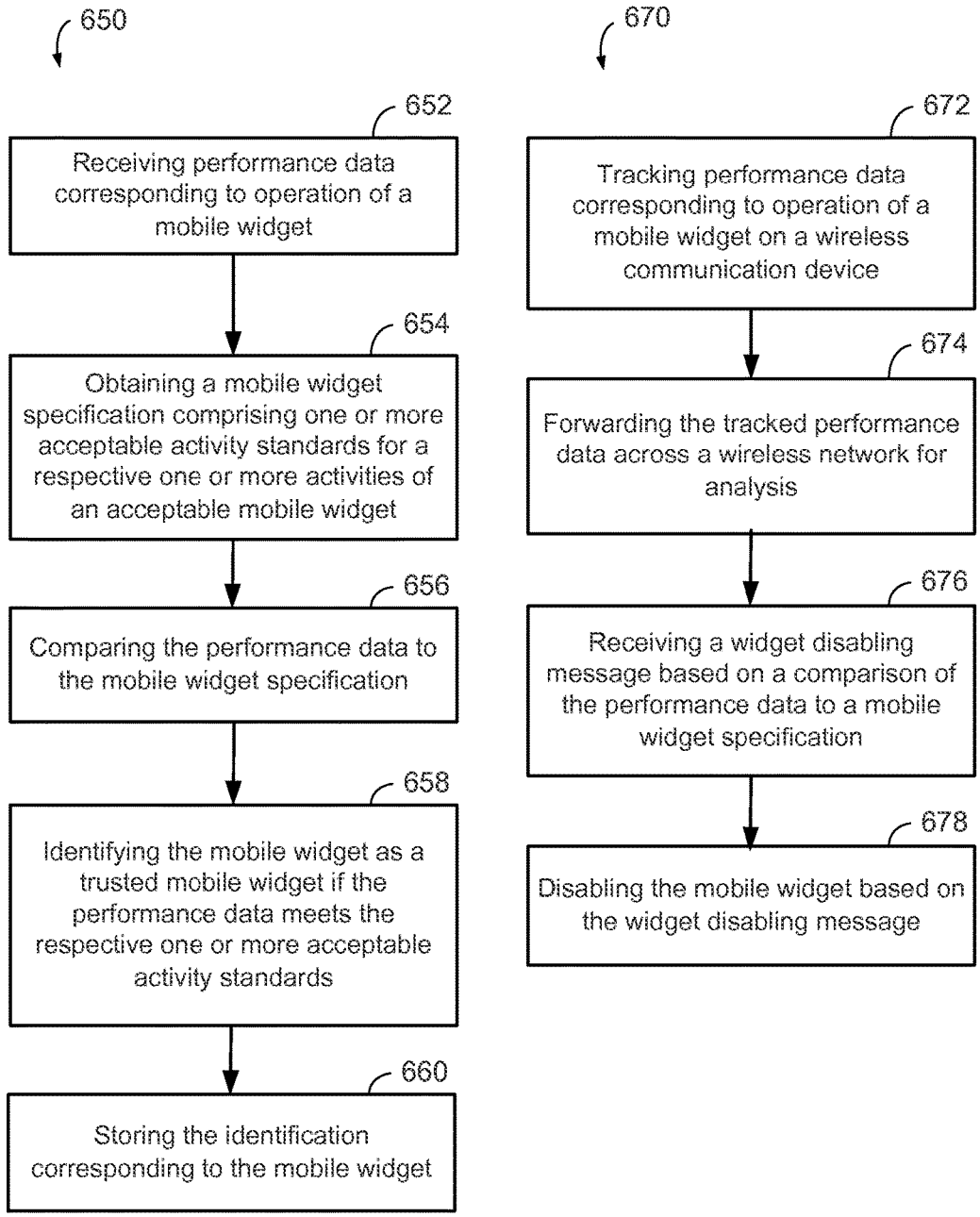
FIG. 25 is a flow diagram of an aspect of a method of insuring widget security in the system of FIG. 1.
FIG. 26 is a flow diagram of an aspect of a method of insuring widget security in the system of FIG. 1.

Referring to FIGS. 24-26, in one aspect, the described aspects include apparatus and methods for insuring the security of system 100 (FIG. 1) with respect to the operation of mobile widgets 102 (FIG. 1). In particular, in some aspects, one of the features of the widget management system of FIG. 1 is an ability to qualify mobile widgets through an acceptance process that could be implemented as part of the Unified Widget Manager (UWM) 200. The mechanism by which developers/providers 108 submit mobile widgets 102 may be as simple as a web upload, however, upon submission, the mobile widget may undergo one or more validation processes 212, some of which may be automated, some of which may be manual, and some of which may be a mix of manual and automated testing.

Widget validation component 214 may include a validation processor module 211 to actuate or manage validation process 212, including evaluating mobile widgets 102 according to one or more widget system standards 216.

In one aspect, for example, widget validation component 214 checks that submitted mobile widgets 102 conform to development and packaging guidelines, which may be a part of widget system standards 216. This can be a fully automated process, and includes ensuring the respective mobile widget 102 conforms to standardized packaging, for instance, as defined in the Worldwide Web Consortium, and pre-specified programming guidelines.

In another aspect, for example, widget validation component 214 may be operable to perform widget emulation and testing, which may involve manual testing (including human observations of widget performance), automated testing, or a combination of both. Such testing may result in widget performance data 213 for a respective mobile widget 102, which validation processor module 211 may then compare against one or more mobile widget specifications 217. In particular, mobile widget specifications 217 may include one or more activity standards 219 that define whether or not a mobile widget is considered acceptable to system 101, also referred to as a trusted mobile widget, or unacceptable to system 101, also referred to as an untrusted mobile widget or a hostile mobile widget. In one aspect, such activity standards 219 relate to how operator/carrier 110 (FIG. 1) desires mobile widget 102 to perform on wireless interface 106 (FIG. 1) of operator/carrier 102. For example, the activities of mobile widget 102 may affect the performance of wireless interface 106 and/or wireless communication device 704 and/or other wireless devices operating on wireless interface 106. For example, the one or more activity standards 219 may include, but are not limited to, standards for one or any combination of activities, such as: a number of generated messages; a type of generated message; an amount of memory usage; an amount of processor usage; operator-specific activities; access to one or more resources on a corresponding wireless communication device; a number of wireless connections; and any other activity affecting performance of the wireless network or devices on the wireless network.

Additionally, mobile widget specification 217, and correspondingly one or more activity standards 219, may vary depending on the respective mobile widget 102, for example, based on a widget classification or type 221. As such, in one aspect, each mobile widget 102 may be associated with one of the widget classifications or types 221, and validation processor module 211 may execute one or more validation processes 212 for a respective mobile widget 102 based on a given widget classification or type 221 corresponding to that mobile widget 102. For example, widget classification or type 221 may relate to the kind of content included in the respective mobile widget, which may relate to the expected activities of the mobile widget. Thus, widget validation component 214 may test a respective mobile widget 102 according to one or more classification-specific mobile widget specifications 217.

Moreover, in some aspects, widget validation component 214 not only validates mobile widgets 102 upon submission to system 100 (FIG. 1), but also after acceptance into system 100. For example, one or more validation processes 212 may include random or scheduled testing of one or more mobile widgets 102 active in system 100. In this case, for example, widget performance data 213 may include actual performance data collected from one or more mobile widgets 102 operating in system 100. For example, widget performance data 213 may be collected by WMC 704 on one or more wireless communication devices 700 and forwarded to UWM 200, and hence widget validation component 214, via the collection of metering/tracking data 209 performed by CAS 900. For example, CAS 900 may collect metering/tracking data 209 and forward it to UWM 200 directly or via. WMS 300. As such, validation processor module 211 or another component within system 100 may be operable to parse widget performance data 213 from metering/tracking data 209 for one or more mobile widgets 102. Thus, widget validation component 214 is able to perform on-going monitoring of mobile widgets 102 within system 100.

In another aspect, in the case when widget validation component 214 determines an active mobile widget 102 to be unacceptable, untrusted, or hostile, then widget validation component 214 may take any number of actions to protect system 100 (FIG. 1). Hostile mobile widgets may include, for example, mobile widgets that make an unnecessary amount of network calls, mobile widgets that require an abnormal amount of memory or make unnecessary handset file input/output calls, mobile widgets that send an abnormal amount of text messaging, and mobile widgets that send personal information in an insecure manner, among other hostile mobile widgets. Abnormal may include, for example, a number above a threshold set by a user or system operator or carrier to indicate when a widget may start to adversely affect a network's performance. In an aspect, message router 500 may track mobile widget 102 network calls determining whether mobile widget 102 is making an unnecessary amount of network calls. Message router 500 may forward the determined data regarding mobile widget 102 to UWM 200 directly or via WMS 300, and hence widget validation component 214. In another aspect, CAS 900 may collect metering/tracking data 209 regarding the amount of text messaging or file system access occurring from mobile widget 102 forwarding the data to UWM 200 directly or via WMS 300.

In one aspect, for example, widget validation component 214 may transmit a message to developer/provider 108 notifying them of the validation result. For example, the message may include the details and/or the results of the comparison of widget performance data 213 and mobile widget specification 217. Such notification allows developer/provider 108 to take corrective action to fix the problem causing the unacceptable results. In another aspect, widget validation component 214 may disable or remove the unacceptable mobile widget 102 from system 100. For example, widget validation component 214 may change an enable/disable setting in a record corresponding to mobile widget 102, or may send a disabling message 223 to effect removal or inactivation of the respective mobile widget 102 in system 100. Such settings or records may be stored in the memory or database of one or more system components, such as but not limited to one or any combination of UWM 200, WMS 300, or WMC 704. In one aspect, for example, disabling message 223 may be forwarded all the way to each WMC 704 having the respective unacceptable mobile widget 102. Such a disabling message 223 may cause WMC to execute a disabling module 225 to make the respective mobile widget inoperable on wireless device 700, or to remove the respective mobile widget from wireless device 700. In an aspect, digital locker 304 (FIG. 1) may maintain the licenses for the respective mobile widgets and remove or eliminate licenses that correspond to an unacceptable mobile widget 102. In another aspect, CAS 900 may implement traffic monitoring for the mobile widgets and upon detecting a suspicious or unacceptable mobile widget 102, mobile widget 102 may be disabled or may require further traffic analysis offline before disabling mobile widget 102. Alternatively, such a disabling message 223 may be a synchronization request message that prompts WMC 704 to synchronize settings for the resident version of mobile widget 102 with the settings for the network version of mobile widget 102, thereby causing mobile widget 102 to be inoperable on wireless interface/network 106 of operator/carrier 110.

Referring to FIG. 25, in one non-limiting aspect, a method 650 of managing a mobile widget on a network device includes receiving performance data corresponding to operation of a mobile widget at 652. The performance data can be data based on testing of mobile widget, or based on the actual operation of the mobile widget on a wireless interface/network.

The method also includes obtaining a mobile widget specification corresponding to the mobile widget, wherein the mobile widget specification comprises one or more acceptable activity standards for a respective one or more activities of an acceptable mobile widget at 654. The mobile widget specification may be specific to an operator/carrier network to enable the operator/carrier to define behavior of the mobile widget on the operator/carrier network. Further, the mobile widget specification may vary depending on a classification or type of the mobile widget, as different kinds of mobile widgets may be expected to have different behaviors.

Further, the method includes comparing the performance data to the mobile widget specification at 656. Such comparison includes evaluating one or more mobile widget activities against a corresponding one or more activity standards corresponding to the respective mobile widget.

The method also includes identifying the mobile widget as a trusted mobile widget if the performance data meets the respective one or more acceptable activity standards at 658. The identification enables a mobile widget to be accepted for operation of within a wireless network of mobile widgets.

Additionally, the method includes storing the identification corresponding to the mobile widget at 660. The identification, which corresponds to the mobile widget being acceptable for operation in a wireless network, may be stored in the memory or database of one or more system components, such as but not limited to one or any combination of UWM 200, WMS 300, or WMC 704. It should also be noted that an identification of the mobile widget being unacceptable or untrusted may also result from the comparison, and such identification may also likewise be stored and may further trigger actions to disable or remove the mobile widget from the system and/or to notify the developer/provider of the problem corresponding to the activities of the mobile widget.

Referring to FIG. 26, in another non-limiting aspect, a method 670 of managing a mobile widget on a wireless communication device includes tracking performance data corresponding to operation of a mobile widget on a wireless communication device at 672. A widget management client operating on a wireless device may collect widget activity data based on the actual operation of a mobile widget within the system, and as part of tracking/metering the activities corresponding to the mobile widget.

Further, the method includes forwarding the tracked performance data across a wireless network for analysis at 674. The widget management client may report the tracked activity data to one or more network infrastructure elements, which may be responsible for maintaining or improving the operation of the system of mobile widgets or the operation of a wireless network including the mobile widgets as well as other wireless communication devices.

The method also includes receiving a widget disabling message based on a comparison of the performance data to a mobile widget specification, wherein the mobile widget specification comprises one or more acceptable activity standards for a respective one or more activities of an acceptable mobile widget at 676. The tracked performance data may be used by the network elements to evaluate the mobile widget. Such tracked data, either alone or in combination with other similar tracked data for other wireless devices operating a similar mobile widget, may then be analyzed according to specified activity standards to determine an acceptability of the mobile widget. If the reported activities meet the standard, then the mobile widget may be allowed to continue to operate. If the reported activities do not conform to the standard, then the respective mobile widget may be disabled or removed from a device or from the network.

Additionally, the method includes disabling the mobile widget based on the widget disabling message at 678. As noted, based on the tracked performance data violating a standard, a mobile widget may be disabled from operation, thereby enabling a wireless network operator to achieve a standard of operation in the network.

Life Cycle Management

According to another aspect, systems, methods, and apparatus are provided that allow for mobile widgets portability between different platforms. In this regard, the mobile widgets are developed such that they can be implemented on any mobile device regardless of device type, device manufacturer, or device model. Although runtime environments in the mobile device environment are fractured, the portable mobile widgets of present aspects are capable of being executed on any wireless device's implementation of a web runtime technology. Portability of widgets is made possible by development of widgets that can be modified for different instantiations of the widget client.

For example, a widget may be configured to utilize audio resources, such as a music player widget or the like. If the widget is used a wireless device that supports only MP3 file playback capabilities, the widget resources are made available as MP3 files based on implementation of a platform within the client that supports MP3 files. However, if the user upgrades or otherwise changes wireless devices to a device that supports multiple forms of audio encoding, including more compact formatting of audio file playback, such as AAC or the like, the widget resources may be made available as AAC files or the like based on implementation of a platform within the client that supports AAC files.

In addition to supporting different wireless device manufacturer and model platforms, the mobile widget client may also be configured to support non-mobile environments, such as desktop platforms. Thus, allowing for portability not only between different wireless devices but also between wireless devices and non-wireless devices, such as personal computers or the like.

Figure 27:
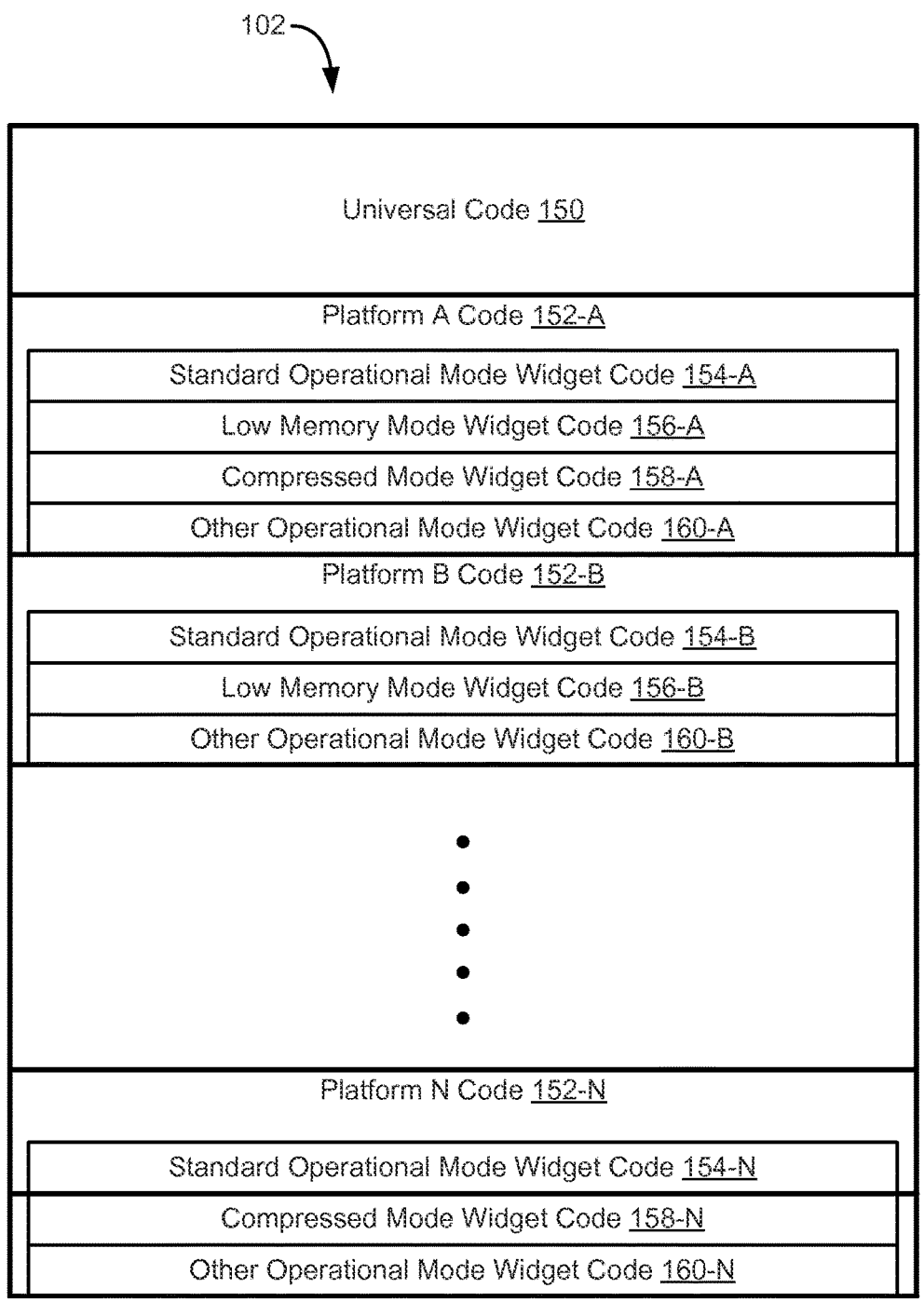
FIG. 27 is a schematic diagram of an aspect of a mobile widget portability/life cycle management in the system of FIG. 1.

Additionally, retelling to FIG. 27, each mobile widget client 102 may provide for multiple operational modes in addition to providing for multiple platform functionality. For example, multiple operational modes may include low memory widgets and compressed mode widgets, among other multiple operational modes. Thus, with respect to low memory widgets and compressed mode widgets, a single mobile widget client may include the standard operation mode widget, the corresponding low memory mode widget, the corresponding compressed mode widget, and any other operational mode for more than one platform.

FIG. 27 provides a block diagram of a portable mobile widget client according to present aspects. The mobile widget client 102 includes universal code 150 that is applicable to all platforms and all operation modes. Additionally, mobile widget client 102 includes platform specific code 152, such as 152-A, 152-B through 152-N for each specific platform, where N signifies the last sequential platform. Each platform includes at least standard operational mode code 154 and may optionally include other mode codes, such as low memory mode widget code 156, compressed mode widget code 158, and/or other operational mode widget code 160. In the illustrated example of FIG. 27, platform A code 152-A includes standard operational mode code 154-A, low memory mode widget code 156-A, compressed mode widget code 158-A, and other operational mode widget code 160-A; platform B code 152-B includes standard operational mode code 154-B, low memory mode widget code 156-B, and other operational mode widget code 160-B (omitting compressed mode widget code); and platform N code 152-N includes standard operational mode code 154-N, compressed mode widget code 158-N, and other operational mode widget code 160-N (omitting low memory mode code).

Widget Generated Content

Yet another aspect is defined by systems, methods, and apparatus that provided for mobile widgets operable to generate and output content to another entity, which is operable to use the output of the widget as input to another function. For example, a widget may be provided that is operable to receive user queries, such as a network search widget, communicate the queries to the network and receive data (e.g., search results) in response to the query. In another example, a widget may be provided that is operable to receive user inputs for a real-tine or near-real time service, such as Voice over IP (VoIP), chat or the like) and communicate the inputs to the network, which in turn communicates the inputs to intended addressee. In yet another example, a widget may be provided for purchasing transactions, such as the purchase of additional widgets or any other product or service. The purchasing widget is operable to allow the user to select or otherwise input purchase options, which are communicated to the network and, in response the wireless device wirelessly receives the product (e.g., anew widget) or service or receives confirmation of the purchase, via SMS message, email or the like.

Additionally, in one specific aspect, a widget may be operable to generate alerts, which may be communicated internally within the wireless device or externally to the network to trigger some action or event. For example, a widget may be configured to monitor battery level within the wireless device and provide for an alert/alarm to be communicated to an output user interface, such as display or an audio output, if the battery power level drops to a predetermined level. In addition, to sending the alert/alarm to user interfaces, such that the user is alerted of the low battery power level, the alert may also be sent to other applications running on the wireless device for the purpose of disabling applications, or changing the triode of operation of applications, such as moving an application from a standard mode of operation to a low battery power mode of operation or the like. In another example, a widget may be configured to monitor the location of the wireless device user (for example, a child) and alerts may be generated and communicated to the serving network if the user is outside of a predetermined location boundary, referred to in the art as a geofence. In response to receipt of the alert, the serving network may send a communication to another wired or wireless device, such as an SMS, email or the like, notifying the recipient (for example, a parent) that the wireless device user is outside of the predetermined location boundary.

Figure 28:
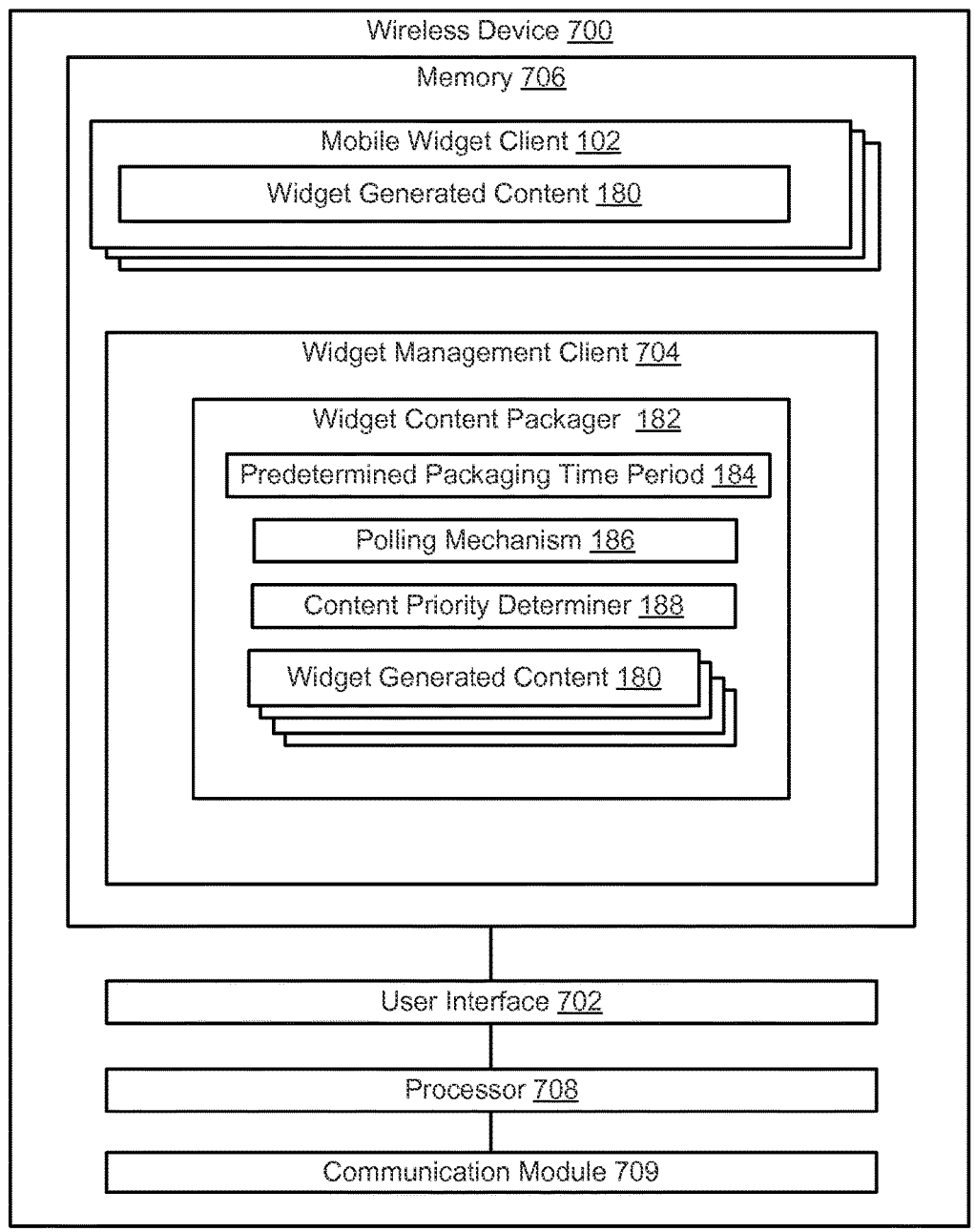
FIG. 28 is a schematic diagram of an aspect of a wireless device configured with content generating mobile widgets and a widget content packager.

Referring to FIG. 28, a block diagram is illustrated on a wireless device 700 configured with content generating widgets and a content bundler application, in accordance with aspects of the innovation. Similar to previously described wireless device, wireless device 700 includes processor 708, which is in communication with memory 706, communications module 709, and user interface 702. The wireless device includes one or more mobile widget clients 102 that are operable to generate content 180 that requires communication to the serving network. In order to efficiently communicate such content to the serving network it may desirable to bundle or package content 180 that is outputted by one or more of the widget clients 102. As such, Widget Management Client (WMC) 704 may further include a content packager 182 operable to receive content 180 from widget clients 102 and package the content in a single communication for the purpose of minimizing upstream data transmissions. The content packager 182 may be configured to package all generated content with a predetermined time period 184 or the content packager 182 may be configured to include a polling mechanism 186 operable to poll the content generating widgets 180 to determine if generated content is currently being generated or will be generated within a predetermined immediate time period for the purpose of determining the generated content that will be included in a pending package. Additionally, the content packager 182 may include a content priority determiner 188 operable to determine the significance or priority of content based on the widget client 102 or identifiers placed in the generated content. As such, prioritized content may be communicated immediately as opposed to being packaged. For example, clients 102 that generate alerts or alarms may need to be communicated to the serving network immediately so that appropriate actions can be taken at the network level in a timely fashion.

Widget Integration with IP Multimedia Subsystem (IMS)

In other aspects, systems, methods, and apparatus provide for widget integration with other network information to enable other services. In this regard, the widget can act as a portal to other information, such as user/subscriber information, session information, network capability information, or information regarding other network services. In one specific aspect, a widget may operable for providing caller identification from a call received on a legacy landline, Public Switch Telephone Network (PSTN) or VoIP—Session Initiation Protocol (SIP) device. In this regard, the widget, through the serving network, may be integrated with the IP Multimedia Subsystem (IMS) as a source for caller ID information, user/subscription information or the like.

IMS is a set of specifications that describes the Next Generation Networking (NGN) architecture for implementing IP based telephony and multimedia services. IMS defines a complete architecture and framework that enables the convergence of voice, video, data, and mobile network technology over an IP-based infrastructure. It fills the gap between the two most successful communication paradigms, cellular and Internet technology. Moreover, IMS provides seamless integration, coordination, and flow of information between widgets and the IMS core network. Thus, IMS allows for unified access methods to various operator networks by integrating the widget platforms with the operator networks.

In one aspect, widget/IMS integration provides the widget with a source for user/subscription information, such as user/subscriber identity, single sign-on, authentication, or the like. The present solution is in contrast to current mobile widget solutions, which do not have direct mechanisms for tapping into cellular authentication. The existing workarounds are clunky (e.g., sending a dummy http request and picking off user ID from the response header; sending an SMS and picking off the phone number at the widget server). Utilizing the IMS authentication allows the present mobile widget service to have direct IP-based access to user credentials. By providing for a network source of such information, widgets that utilize such user identification and/or authentication may not be required to have the user manually enter such data. Thus, this aspect provides for an added level of security in wireless devices, such as GSM devices or the like, which may have multiple users with each user being associated with an individual removable identity module.

Figure 29:
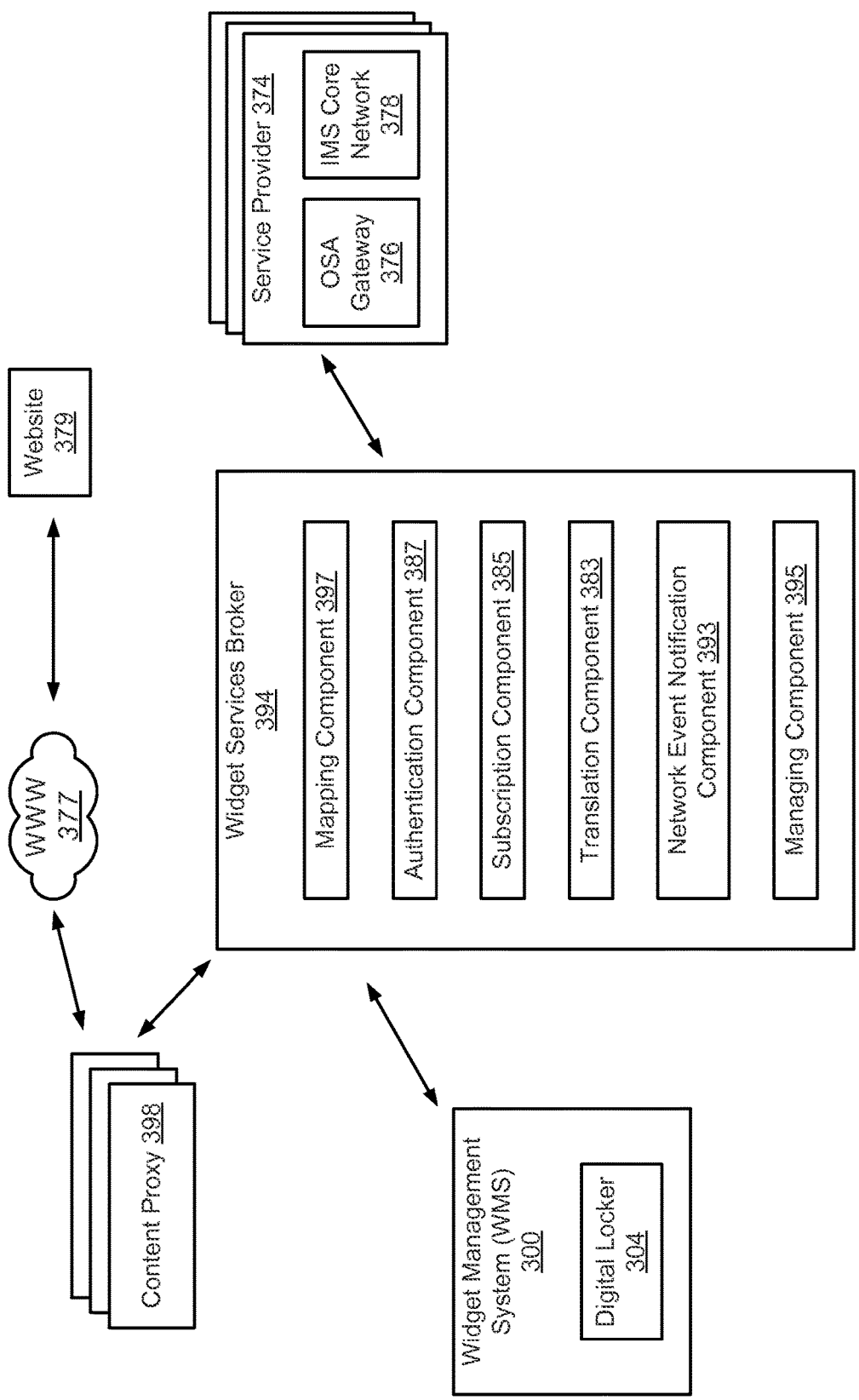
FIG. 29 is a schematic diagram of an example of the interaction of a widget service broker in accordance with an aspect.

Turning now to FIG. 29, illustrated is a schematic diagram of an example of the interaction of a widget service broker in accordance with an aspect. In the illustrated example, Widget Services Broker (WSB) 394 may interface widget services and capabilities with the various data from the network. In addition, WSB 394 may interface directly or indirectly to third party application services providing necessary widget content through one or more of IP, HTTP, or web services interfaces. For example, WSB 394 may interface via content proxies 398 to third party websites 379. Additionally, WSB 394 may interface with WMS 300, and one or more service providers 374.

In one aspect, WSB 394 may be operable for brokering and intermediating interactions between WMS 300 and the IMS network domains across multiple service providers 374. For example, WSB 394 may include mapping component 397 operable for discovering and maintaining mapping addresses pertaining to individual services offered by each domain and implementing the data requests and responses. Moreover, WSB 394 may use the mapping addresses for routing data between WMS 300 and IMS network domains.

In another aspect, WSB 394 may be operable to gain access to necessary service functions within each domain. For example, WSB 394 may include authentication component 387 operable for implementing the necessary Parlay/OSA authentication capabilities in order to gain access to necessary service functions within each domain.

In addition, WSB 394 may include subscription component 385 operable for subscribing to IMS networks 378 and implementing the appropriate accounting and policy management notification functions required from IMS network 378.

In an additional aspect, WSB 394 may be operable for authenticating, authorizing, managing, and servicing requests for network based data received from WMS 300 and content proxy 398. For example, WSB 394 may include a managing component 395 and translation component 383 operable for managing requests from, for example, WMS 300, content proxy 398, or end user 104 and translating protocols between different interface technologies.

Thus, WSB 394 may unify the messaging across different interface technologies and protocols allowing for unified access to various service providers 374. In an aspect, WSB 394 may be operable for channeling real time network event notifications to WMS 300. For example, WSB 394 may include network event notification component 393 notifying WMS 300 of real time network events. Real time network events may be for example, voice calls, SMS/MMS messaging, voicemail notifications, presence and availability information, charging or broadcast information of wireless device 700 (FIG. 1) or other registered devices in the IMS system, among other real time network events.

Figure 30:
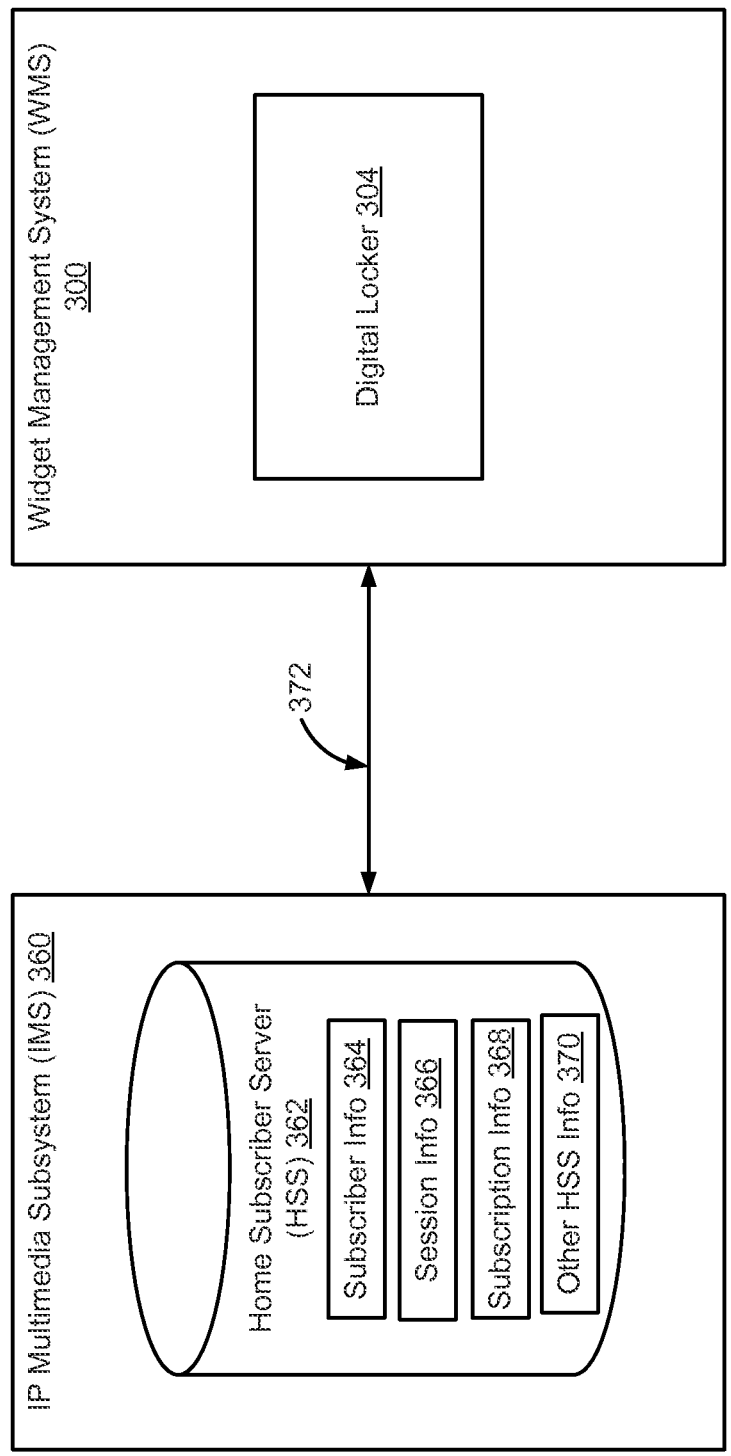
FIG. 30 is a block diagram depicting one example of the integration between IMS and widgets.

Referring now to FIG. 30, illustrated is a block diagram depicting one example of the integration between IMS and widgets, specifically widget management at the serving network. In the illustrated example, the digital locker 304 of the widget management system 300 acts as an extension to the Home Subscriber Server (HSS) 362 within the IMS architecture 360. The HSS 362 provides the digital locker 304 with a source for subscriber information 364, session information 366, subscription information 368, and any other HSS information 370. The digital locker 304 may be logically or physically separated from HSS 362. In this regard, the interface 372 between the digital locker 301 and HSS 362 may be Common Object Request Broker Architecture (CORBA)-based, which provides for tight coupling and deep integration, or eXtension Markup Language/Simple Object Access Protocol (XML/SOAP)-based or Hyper Text Transfer Protocol/Representational State Transfer (HTTP/REST)-based, both of which provide loose coupling, or any other suitable interface mechanism.

In one specific aspect, the IMS 360 integration with the VMS 300 and, in particular the HSS 362 integration with the digital locker 360, may provide for a public (i.e., outside) firewall for the widget(s) 102 being executed on the wireless device 700 and/or a private (i.e., inside) firewall for the widget management system 300.

Figure 31:
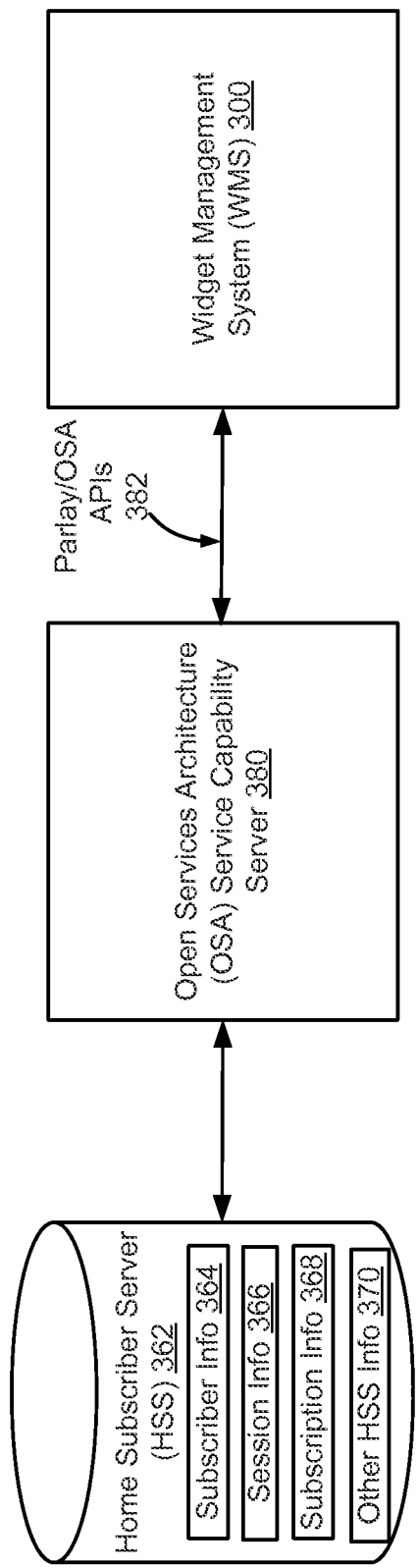
FIG. 31 is a block diagram of another integration architecture, in which service capability feature integration is made available to the widget management system

Referring now to FIG. 31, illustrated is a block diagram of another integration architecture having a service capability feature integration made available to the widget management system. Service Capability Server (SCS), such as Open Service Architecture (OSA) SCS 380, is integrated with the WMS 300 and the HSS 362 of the IMS 360. In the illustrated example, the HSS information, such as subscriber information 364, session information 366, subscription information 368, and any other HSS information 370, is made available to the WMS 300 via the SCS 380. The SCS interfaces with the WMS 300 via Parlay/OSA Application Programming Interfaces (APIs) 382, and the transport interface between the SCS 380 and the WMS 300 may be CORBA, Web Services Definition Language (WSDL), or any other suitable transport interface.

Figure 32:
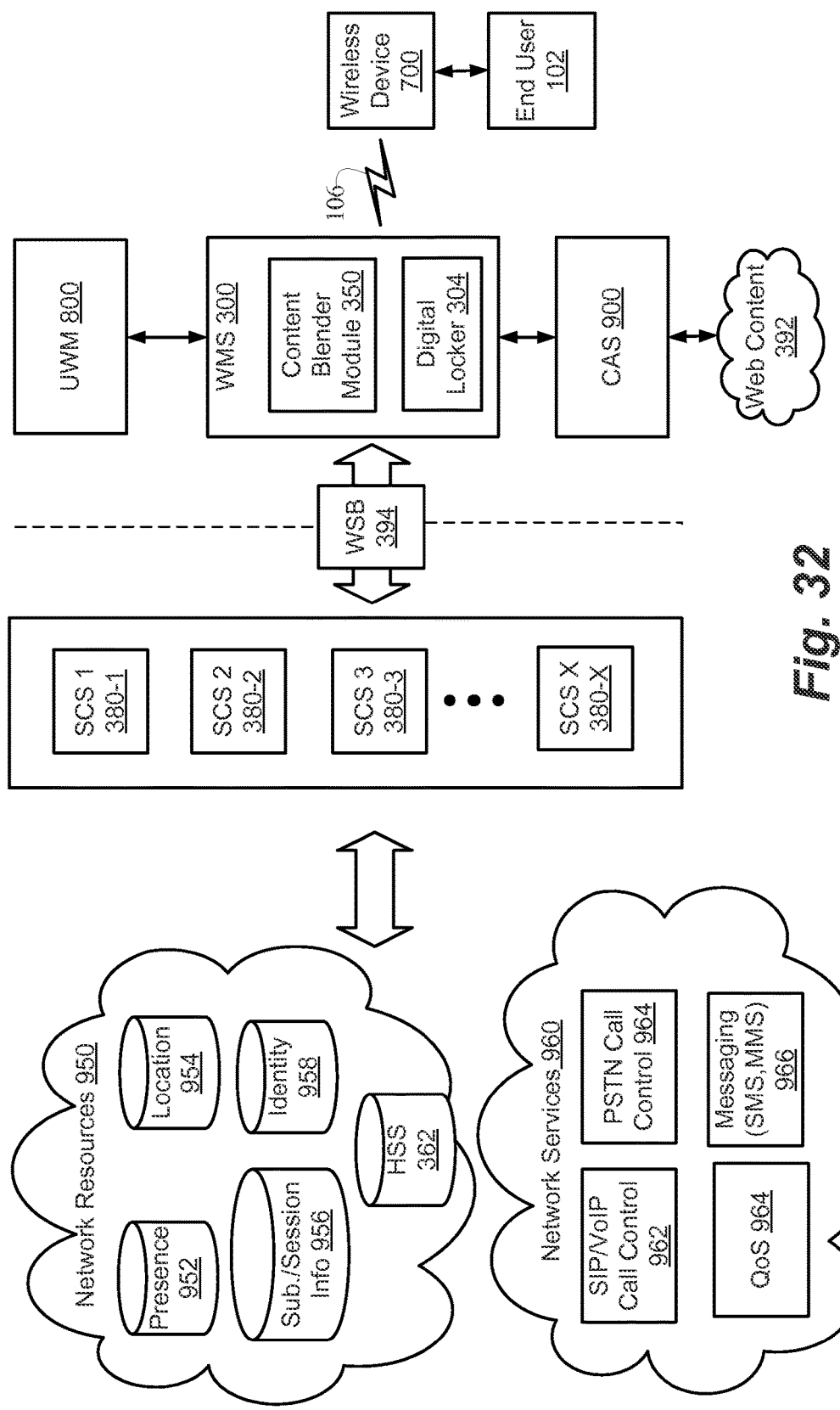
FIG. 32 is a more detailed block diagram illustrating another example of network service and network resources integration with widgets.

FIG. 32 is a more detailed block diagram illustrating another example of widget services broker (WSB) 394 integrating network service and network resources with widgets and, specifically, widget management system (WMS) 300. The WSB 394 interfaces WMS 300 with network resources 950 and network services 960 via one of a plurality of Service Capability Servers (SCS) 380. In the illustrated aspect, SCS 1 380-1 SCS 2 380-2, SCS 3 380-3 and SCS X 380-X are depicted, where "X" signifies the last SCS in the series of SCSs that may provide services, via WSB 391, between WMS 300 and network resources 950 and network services 960. Network resources may include, but are not limited to, device presence information 952, device location information 954, subscriber and/or session information 956, identity information 958, and the like, such as a network address book, billing information or the like. Network services may include, but are not limited to, SIP/VoIP call control 962, PSTN call control 964, Quality of Service (QoS) 964, messaging service 966, such as SMS, MMS, etc., and the like.

For example, in one aspect, SCS 380 may include a user authentication service SCS operable to authenticate an identity of wireless device 700 and/or end user 104 with a third party service, such as website. For example, such user authentication may be in the context of a user application, including a mobile widget. In one aspect, at the backend, the user authentication service SCS function 380 interfaces with the Generic Bootstrapping Architecture (GBA) elements and the HSS 362 to exchange authentication information in order to authenticate and validate the user 104 and/or device 700 and/or application, for example, based on a previously determined shared secret, such as a login and/or password. In some aspects, the interactions are encrypted and information is returned regarding the time validity of such authentication. Once the user 104 and/or device 700 and/or the application is authenticated, the WMS 300 saves the authentication information in the digital locker 304 and maps and applies this information for access to third party services, such as content provider websites, on behalf of the user. In other words, WSB 394 provides an interface between network resources 950 and/or network services 960, via one or more SCSs 380, to manage authorizing device 700 and/or user 102 and/or an application, such as a mobile widget 102, thereby providing subsequent, automatic authorization, and access to the respective resource or service based on the obtained authorization.

Figure 33:
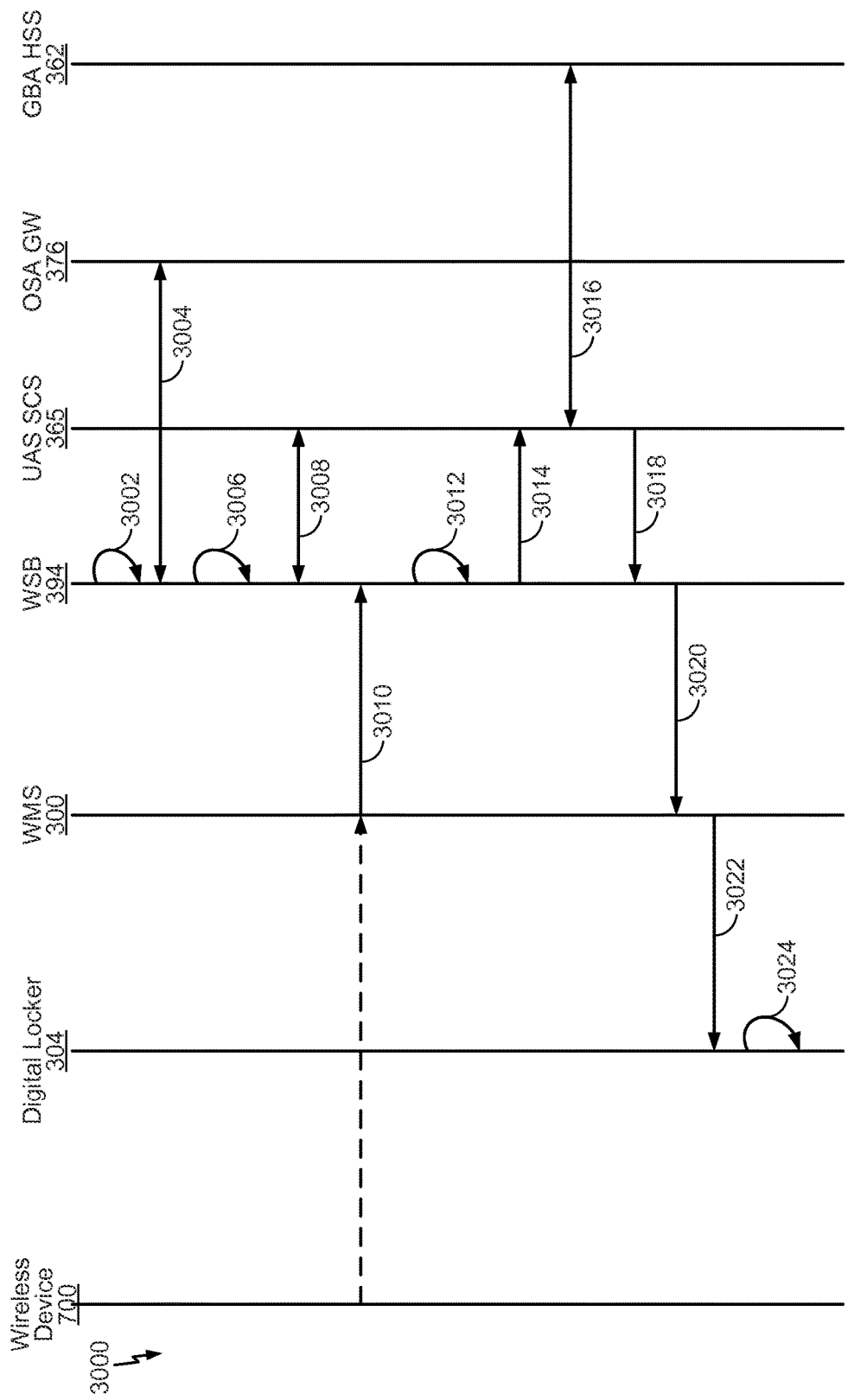
FIG. 33 is an example flow diagram illustrating user authentication in accordance with an aspect.

More specifically, turning now to FIG. 33, illustrated is an exemplary flow diagram 3000 illustrating user authentication in accordance with an aspect. While the illustrated example will be described in relation to widget user authentication, it should be appreciated that the below method of user authentication may be applied to web interactions in general and is not limited to widget applications. User authentication may be used, for example, for logging into websites that require a user name and password, validating that the user is a registered for access to a particular service or subscription, determining whether the user is paying for a specific service or subscription, or any other shared secret information relating to the user.

At 3002, WSB 394 is brought on-line, instantiated, or otherwise made operable within the system. At 3004, WSB 394 authenticates itself with an OSA Gateway (OSA GW) 376. Next, at 3006, WSB 394 discovers one or more available User Authentication Service Service Capability Servers WAS SCS) 381 (Note: For convenience, the figure only illustrates one SCS), and, at 3008, authenticates itself with the one or more available UAS SCS 365. The authentication process occurring between WSB 394 and GSA GW 376 and UAS SCS 365 in steps 3002, 3004, 3006 and 3008 may be a one time configuration with a particular system instantiating WSB 394.

Next, at 3010, WMS 300 sends an authentication request to WSB 394. The request may be automatically sent by WMS 300 or, as indicated by the dashed line, initiated by end user 104, device 700, WMC 704, or a user application such as a mobile widget 102. Note: For simplicity, the figure only illustrates device 700. The request may include, for example, a login request, request for subscription information (e.g., news reports from the Wall Street Journal), a payment request, a widget refresh request, or a service request, among other requests. In an aspect, the request may include parameters (e.g., a subscriber ID (SID) identifying the end user 104 and a service provider ID (SPID) identifying the network or service provider 374). In some aspects, multiple users from across various networks and service providers may be identified in the request. For example, in an aspect, multiple requests from multiple users may be combined into a single request message. In an aspect, the request message may be an XML tag including the various number of requests for a particular network.

At 3012, WSB 394 uses the parameters included in the request message to map the identified service provider 374 (FIG. 29), and thus the corresponding UAS SCS 365. For example, WSB 394 may use an internal mapping function stored in WSB 394 to map to service provider's 374 IP address and apply the correct protocols for the message to service provider 374. Thus, at 3014, WSB 394 sends a check user authorization based on the requested message to UAS SCS 365 in the correct format for service provider 374. Next, at 3016, UAS SCS 365 interacts with HSS 362 of the service provider to authenticate user 104 using the parameters from the request message received by UAS SCS 365. After UAS SCS 365 receives authentication of user 104 from HSS 362, at 3018, WSB 394 receives a check user authentication response from UAS SCS 365. The check user authentication response may include parameters, such as a SID and configurations based upon a particular service requested, whether user 104 is authorized for a particular website, or whether user 104 is authorized for a particular service, among other parameters. At 3020, WSB 394 sends WMS 300 a user authorization response with the parameters forwarded from UAS SCS 365 at 3018. Next, at 3022, WMS 300 sends a save user credentials message to digital locker 304 with the SID and the parameters forwarded from WSB 394. At 3024, after receiving the SID and parameters from WMS 300, digital locker 304 saves user 104 credentials for use in the current transaction, e.g., logging onto a website, or for use in future transactions.

Storing credentials for user 104 in digital locker 304 may avoid the necessity of user 104 sending the credentials every time user 104 tries to access a service provider or a website requiring user authentication. In other words, WSB 394 and WMS 300 can work together to manage authentication credentials for one or more services of interest to user 104.

Thus, the user may experience seamless interaction with the service providers or websites since the user does not need to provide the credentials for the user every time the user accesses the website or service provider. Instead, the WMS can retrieve the user's credentials from the digital locker and forward them to the VMS for authentication with the service provider or website.

Moreover, multiple authentications may be prevented by authenticating user 104 once with service provider 374. In one aspect, after the authentication of user 104, WSB may send a token or key, for example, to various service providers or websites authenticating user 104 for accessing the respective services provided. In another aspect, as illustrated in FIG. 34, after user's 104 credentials are stored in digital locker 304, WSB 394 may retrieve the user's credentials from digital locker 304 and send the information to the separate websites requesting user's 104 credentials. Therefore, if user 104 is trying to access multiple websites that require different passwords, digital locker 304 can retrieve the respective passwords for the various websites and login.

Additionally, the authentication may serve as verification for multiple domains across multiple application providers. Thus, the user has the ability to interface seamlessly between different operators and service providers with a single set of credentials without having separate credentials for different service providers.

Furthermore, it should be noted that the user's credentials may be associated with a particular wireless device allowing for the wireless device to be easily associated with a particular user.

Referring now to FIG. 34, correspondingly, once user authentication credentials are obtained and anti stored, in one aspect, the WMS 300 can act on behalf of a mobile widget user application 102 to obtain content and services. For example, FIG. 34 illustrates an example flow diagram 3030 identifying interactions between WMS 300 and IMS in accordance with such as aspect. At 3032, widget 102 sends an update widget request message to WMS 300. The update widget request message may include parameters, such as, SID and a widget identification (WID). In an aspect, user 104 (FIG. 1) may have multiple widgets with different WIDs stored in digital locker 304. The update widget request message may include, for example, refreshing widget 102, a request to receive data from content provider 902, among other update requests. Next, at 3034, WMS 300 may send a get widget information message to digital locker 304 with the WID as a parameter. At 3036, digital locker 304 may retrieve widget information corresponding to the WID sent from WMS 300. Widget information may include, for example, identification of personal information (e.g., passwords, billing information, login identifications, among others) of user 104 (FIG. 1), access control information, or URL information, among other widget information.

At 3038, after digital locker 304 retrieves widget information for widget 102, WMS 300 receives a get widget information response from digital locker 304. The get widget information response may include parameters, such as, WID, SID and any access or control information regarding content provider 902 related to widget 102. Next, at 3040, WMS 300 sends a user authentication request including parameters (e.g., SID) to digital locker 304. At 3042, after digital locker checks the stored user 104's credentials for authorization and validity. At 3044, if user 104 is valid, digital locker 304 forwards the shared secret parameters for accessing content provider 902 to WMS 300.

At 3048, after receiving the parameters for accessing content provider 902, WMS 300 sends content provider 902 a get content request message. The get content request message may contain parameters including the shared secret for connecting to content provider 902. Next, at 3050, content provider 902 sends the requested content to WMS 300. At 3052, WMS 300 sends widget 102 an update widget response with the provided content from content provider 902 and any additional resources widget 102 may need.

Referring back to FIG. 32, in another example, SCS 380 may include a network event notification service SCS operable to inform device 700 and/or end user 104 of IMS network events.

For example, referring to FIG. 35, a flow diagram 3054 illustrates interactions between the widget management system and a network event notification SCS in an accordance with an aspect. A network event notification (NEN) or network event may include, for example, events happening in an operator's network that need to be communicated to the user. For example, one aspect of such a network event notification includes remote access to caller ID information, which provides information regarding calls to a particular subscribed number, such as to a landline phone, with the network event notification SCS reflecting such information, such as a caller ID, back to the user/device via a widget, SMS/MMS messaging, voicemail notifications, etc.

At 3056, WSB 394 authenticates with service provider 374 (FIG. 29) via OSA GSW 376 establishing a relationship between WSB 394 and network 374. Next, at 3058, WSB 394 discovers the available NEN service capability servers (NEN SCS) 355, and at 3060, WSB 394 may be authenticated and authorized to communicate with NEN SCS 355. At 3062, WMS 300 sends a NEN registration message to WSB 394 including parameters indicating the NEN requested by user 104. For example, the parameters may be a subscriber ID (SID) identifying the end user 104, a service provider ID (SPID) identifying the network or service provider 374, and a NEN type identifying the type of NEN user 104 is requesting. Next, at 3064, WSB 394 uses the parameters included in the NEN registration message to map the identified service provider 374. For example, WSB 394 may use an internal mapping function stored in WSB 394 to map to service provider's 374 IP address and apply the correct protocols for the message to service provider 374. Thus, at 3066, WSB 394 sends a NEN request message to NEN SCS 355 in the correct format for service provider 374. The NEN request message may include the SID, a request ID, and the NEN type as parameters, for example.

At 3068, after receiving the NEN request message from WSB 394, NEN SCS 355 may register the NEN events forwarded in the NEN request message. Next, at 3070, NEN SCS 355 may monitor network 374 for the registered NEN events identified by the SPID parameter and the NEN type parameter. At 3072, after the NEN event occurs, NEN SCS 355 sends a notify NEN message to WSB 394 notifying WSB 394 that an NEN event has occurred. At 3074, WSB 394 forwards a NEN received message to WMS 300 indicating the SID, NEN type and any additional parameters forwarded from NEN SCS 355 relating to the NEN event. At 3076 and 3079, WMS 300 updates the digital locker 304 and widget 102 status by forwarding an update NEN status message to digital locker 304. The update NEN status message may include parameters identifying the SID, the NEN type and any additional parameters relating to the NEN event. Thus, user 104 may register once for a NEN and is notified upon occurrence of the event.

Therefore, WSB 394 provides access to any SCS 380, and thus to any network resources 950 and network services 960 services by any SCS 380.

In addition to providing network resource 950 and/or network service 960 in their original format, packaged at the WMS 300 for widget display, in one aspect, integration of network resources 950 and network services 960 provide WMS 300 with the capability to blend or "mash-up" network resource/service content with content provided by content access server 900, such as web content 392. Thus WMS 300 may additionally provide for a content blender module 350 operable for blending content from multiple sources, such as network resources, network services, content access server, such as web content, the wireless device/widget and the like. For example, in one aspect, content from a location tracking widget, such as a web-based map, and content from a network-resource, such as a user/device location 954, may be combined to form blended content. In another example, a network event, such as a telephone call, multimedia SIP session, SMS or MMS messaging session or the like may be delivered as a network service 960 to the wireless device 700 while the user is interacting with widget 102, managed via WMS 300, to provide for blended or "mashed-up" content that includes both the network service content and the content related to the widget.

Additionally, it should be noted that instead of or in addition to having a "Content Blender Module" to drive mash-ups, the mash-up can also be performed by the mobile widget. For example, the mobile widget may directly call into the IMS service, and the mobile widget similarly makes a separate call to the web service, thereby retrieving separate content to be mashed-up.

In addition to blending network resource/service content with content readily accessible to the widget, such as content from CAS 900, content generated by the widget 102 may also be blended or otherwise "mashed-up" to provide for multi-source widget content. For example, the widget 102 may generate preference data, based on a locally stored user profile, while the CAS 900 provides access to a web-based mapping content and the network resource 950 provides access to the user/device location 954. The resulting blended content may include the map, the user location on the map, and recommendations for attractions/restaurants in the area defined by the map, which are retrieved from the web content 392 based on the widget-generated user preference data. In another example, user interactivity with the widget 102 could generate content that triggers a service event in one of the SCSs 380 that could invoke service logic in the SCS 380.

FIG. 36 is a further block diagram illustration of an integrated widget system that provides further content integration and portability between platforms. In the example of FIG. 36, portability of widgets is shown by the fact that the widget may reside on any computing platform in FIG. 36 as user equipment (UE), such as: mobile device 700, for example, a cellular telephone; another wireless device 700-1, such as a laptop computer, standalone widget device or the like which may transmit or receive widget content via a WLAN, WiFi, WiMax connection or the like; and a wired device, such as a desktop computer or a television interface 701, such as an IPTV media server, a set top box or the like, which may transmit or receive content via a television connection, DSL wireline or the line. Thus, in one example in which the widget is a DVR programming widget, the widget may reside on a television interface, such as a set top box or the like, and additionally reside on the mobile devices, such as a cellular telephone or laptop computer. As such, the user/subscriber may be able to view upcoming television schedules as widget content provided from the web or another networked source and select programming for recording (i.e., generate content), which is communicated to the WMS, stored in the digital locker 304 and relayed to the TV interface for subsequent recording of the selected program.

In the illustrated example of FIG. 36, WMS 300 interfaces with IMS 360 and content server 900 via Service Capability interaction Manager (SCIM) 390. SCIM 390 may include logic associated with the execution of applications, other than widget applications, on the wireless device or other widget implementing devices and/or logics that provide interaction between widget behavior and/or widget generated content and network resources/services or the like. In one particular aspect, WMS 300 may be embodied within the MS, such as IMS application 369 or the like.

Turning to FIG. 37, illustrated is a system 2012 for widget management and network/resource/service integration. System 2012 can reside within a multiplexer, transmitter, mobile device, etc., for instance. As depicted, system 2012 includes functional blocks that can represent functions implemented by a processor, software, or combination thereof (e.g., firmware). System 2012 includes a logical grouping 2014 of electrical components that facilitate widget management and network/resource/service integration. Logical grouping 2014 can include means 2016 for providing for an interface between a widget management component and at least one of a network resource or a network service. Moreover, logical grouping 2002 can include means 2018 for accessing, at the widget management component via the interface, at least one of the network resource or the network service. Furthermore, logical grouping 2002 can include means 2020 for integrating the network resource or the network service with a widget functionality. Additionally, system 2012 can include a memory 2022 that retains instructions for executing functions associated with electrical components 2016, 2018, and 2020. While shown as being external to memory 2022, it is to be understood that electrical components 2016, 2018, and 2020 can exist within memory 2022.

Various examples are discussed below of the described aspects. For example, in one aspect, a method is provided for managing a mobile widget including receiving performance data corresponding to operation of a mobile widget. The method may also include obtaining a mobile widget specification corresponding to the mobile widget, wherein the mobile widget specification comprises one or more acceptable activity standards for a respective one or more activities of an acceptable mobile widget. In addition, the method may include comparing the performance data to the mobile widget specification. Further, the method may include identifying the mobile widget as a trusted mobile widget if the performance data meets the respective one or more acceptable activity standards. Moreover, the method may include storing the identification corresponding to the mobile widget.

The method may further include identifying the mobile widget as an listed mobile widget if the performance data does not meet the respective one or more acceptable activity standards. Additionally, the method may include disabling an ability of the untrusted mobile widget to operate on a wireless network. Alternatively, or in addition to, the method may include removing the untrusted mobile widget from a wireless network. Moreover, the method may include changing a setting on a network device to disable an ability of a network version of the untrusted mobile widget to operate on a wireless network; and transmitting a synchronization request message to a widget management client operating an end user version of the untrusted mobile widget, wherein the synchronization request message is operable to cause the end user version of the untrusted mobile widget to synchronize with the network version of the untrusted mobile widget to disable operation of the end user version of the untrusted mobile widget on the wireless network. Additionally, the method may include notifying a developer of the untrusted mobile widget, wherein the notifying further includes forwarding the comparison of the performance data to the mobile widget specification. Furthermore, the method may include notifying a user of the untrusted mobile widget and allowing the end user of the widget to confirm disabling or remove operation based on presented evidence.

In addition, the method may also include receiving the performance data further comprises receiving data tracked from actual operation of the mobile widget on a wireless network.

Moreover, the method may include testing the mobile widget according to a widget test protocol in order to generate the performance data.

The method may further include wherein the respective one or more acceptable activity standards comprises a standard for a number of generated messages. In addition, the method may further include wherein the respective one or more acceptable activity standards comprises a standard for a type of generated message. The method may also include wherein the respective one or more acceptable activity standards comprises a standard for an amount of memory usage. Moreover, the method may include wherein the respective one or more acceptable activity standards comprises a standard for an amount of processor usage. Further, the method may include wherein the respective one or more acceptable activity standards comprises a standard for operator-specific activities. Additionally, the method may include wherein the respective one or more acceptable activity standards comprises a standard for access to one or more resources on a corresponding wireless communication device. Furthermore, the method may include wherein the respective one or more acceptable activity standards comprises a standard for a number of wireless connections and amount of data communicated on a particular connection.

In addition, the method may also include identifying a mobile widget classification corresponding to the mobile widget; and wherein obtaining the mobile widget specification further comprises selecting the mobile widget specification from a plurality of mobile widget specifications each corresponding to one of a plurality of mobile widget classifications based on the mobile widget classification, wherein the respective one or more acceptable activity standards comprise a respective one or more classification-specific acceptable activity standards.

In another aspect, for example, at least one processor is provided for managing a mobile widget, including a first module for receiving performance data corresponding to operation of a mobile widget. The processor may also include a second module for obtaining a mobile widget specification corresponding to the mobile widget, wherein the mobile widget specification comprises one or more acceptable activity standards for a respective one or more activities of an acceptable mobile widget. In addition, the processor may include a third module for comparing the performance data to the mobile widget specification. Further, the processor may include a fourth module for identifying the mobile widget as a trusted mobile widget if the performance data meets the respective one or more acceptable activity standards. Moreover, the processor may include a fifth module for storing the identification corresponding to the mobile widget.

For example, in an additional aspect a computer program product for managing a mobile widget is provided including a computer-readable medium. The computer-readable medium may include at least one instruction for causing a computer to receive performance data corresponding to operation of a mobile widget. Further, the computer-readable medium may include at least one instruction for causing the computer to obtain a mobile widget specification corresponding to the mobile widget, wherein the mobile widget specification comprises one or more acceptable activity standards for a respective one or more activities of an acceptable mobile widget. Moreover, the computer-readable medium may include at least one instruction for causing the computer to compare the performance data to the mobile widget specification. In addition, the computer-readable medium may include at least one instruction for causing the computer to identify the mobile widget as a trusted mobile widget if the performance data meets the respective one or more acceptable activity standards. Furthermore, the computer-readable medium may include at least one instruction for causing the computer to store the identification corresponding to the mobile widget.

In another aspect, a network device for managing a mobile widget includes a network device for managing a mobile widget including means for receiving performance data corresponding to operation of a mobile widget. The network device may also include means for obtaining a mobile widget specification corresponding to the mobile widget, wherein the mobile widget specification comprises one or more acceptable activity standards for a respective one or more activities of an acceptable mobile widget. Further, the network device may include means for comparing the performance data to the mobile widget specification. The network device may also include means for identifying the mobile widget as a trusted mobile widget if the performance data meets the respective one or more acceptable activity standards. Moreover, the network device may include means for storing the identification corresponding to the mobile widget.

In a further aspect, for example, a network device for managing mobile widgets is provided including a memory comprising widget validation component, wherein the widget validation component comprises a mobile widget specification having one or more acceptable activity standards for a respective one or more activities of an acceptable mobile widget. The network device may also include a processor in communication with the memory and operable to execute the widget validation component and the mobile widget; wherein the widget validation component is operable to receive performance data corresponding to operation of a mobile widget; wherein the widget validation component is further operable to compare the performance data to the mobile widget specification; wherein the widget validation component is further operable to identify the mobile widget as a trusted mobile widget if the performance data meets the respective one or more acceptable activity standards; and wherein the widget validation component is further operable to store in the memory the identification corresponding to the mobile widget.

The network device may further include wherein the widget validation component is further operable to identify the mobile widget as an untrusted mobile widget if the performance data does not meet the respective one or more acceptable activity standards. In addition to, or alternatively to, the method may further include wherein the widget validation component is further operable to disable an ability of the untrusted mobile widget to operate on a wireless network. Further, the method may include wherein the widget validation component is further operable to remove the untrusted mobile widget from a wireless network. Moreover, the network may further include wherein the widget validation component is further operable to: change a setting on the network device to disable an ability of a network version of the untrusted mobile widget to operate on a wireless network; and initiate a transmission of a synchronization request message to a widget management client operating an end user version of the untrusted mobile widget, wherein the synchronization request message is operable to cause the end user version of the untrusted mobile widget to synchronize with the network version of the untrusted mobile widget to disable operation of the end user version of the untrusted mobile widget on the wireless network. Furthermore, the network device may include wherein the widget validation component is further operable to transmit a notification a developer of the untrusted mobile widget, wherein the notification comprises the comparison of the performance data to the mobile widget specification.

The network device may further include wherein the performance data further comprises data tracked from actual operation of the mobile widget on a wireless network. In addition, the network device may include wherein the widget validation component is further operable to test the mobile widget according to a widget test protocol in order to generate the performance data. The network device may also include wherein the respective one or more acceptable activity standards comprises a standard for a number of generated messages. Further, the network device may include wherein the respective one or more acceptable activity standards comprises a standard for a type of generated message. Additionally, the network device may include wherein the respective one or more acceptable activity standards comprises a standard for an amount of memory usage. The network device may also include wherein the respective one or more acceptable activity standards comprises a standard for an amount of processor usage. Furthermore, the network device may also include wherein the respective one or more acceptable activity standards comprises a standard for operator-specific activities. Moreover, the network device may include wherein the respective one or more acceptable activity standards comprises a standard for access to one or more resources on a corresponding wireless communication device. The network device may further include wherein the respective one or more acceptable activity standards comprises a standard for a number of wireless connections. In addition, the network device may further include wherein the widget validation component is further operable to: identify a mobile widget classification corresponding to the mobile widget; and wherein the widget validation component is further operable to select the mobile widget specification from a plurality of mobile widget specifications each corresponding to one of a plurality of mobile widget classifications based on the mobile widget classification, wherein the respective one or more acceptable activity standards comprise a respective one or more classification-specific acceptable activity standards.

In an another aspect, for example, a method of managing a mobile widget on a wireless communication device is provided including tracking performance data corresponding to operation of a mobile widget on a wireless communication device. The method may also include forwarding the tracked performance data across a wireless network for analysis. In addition, the method may include receiving a widget disabling message based on a comparison of the performance data to a mobile widget specification, wherein the mobile widget specification comprises one or more acceptable activity standards for a respective one or more activities of an acceptable mobile widget. Moreover, the method may include disabling the mobile widget based on the widget disabling message.

The method may further include wherein the disabling further comprises identifying the mobile widget as an untrusted mobile widget based on the performance data not meeting the respective one or more acceptable activity standards. Moreover, the method may also include wherein the disabling further comprises disabling an ability of the mobile widget to operate on a wireless network.

In addition, the method may further include removing the mobile widget from the wireless communication device.

Moreover, the method may also include wherein receiving the disabling message further comprises receiving a synchronization request message, further comprising synchronizing, based on the synchronization request message, an end user version of the mobile widget with a network version of the mobile widget to disable operation of the end user version of the mobile widget on the wireless network. Further, the method may include wherein tracking the performance data further comprises collecting data from actual operation of the mobile widget on the wireless communication device.

The method may additionally include testing the mobile widget according to a widget test protocol in order to generate the performance data.

Furthermore, the method may also include wherein the respective one or more acceptable activity standards comprises a standard for a number of generated messages. The method may in addition include wherein the respective one or more acceptable activity standards comprises a standard for a type of generated message. The method may also include wherein the respective one or more acceptable activity standards comprises a standard for an amount of memory usage. Moreover, the method may further include wherein the respective one or more acceptable activity standards comprises a standard for an amount of processor usage. Further, the method may also include wherein the respective one or more acceptable activity standards comprises a standard for operator-specific activities. In addition, the method may further include wherein the respective one or more acceptable activity standards comprises a standard for access to one or more resources on a corresponding wireless communication device. The method may also include wherein the respective one or more acceptable activity standards comprises a standard for a number of wireless connections. Furthermore, the method may include wherein the mobile widget corresponds to a widget classification, and wherein the mobile widget specification is selected from a plurality of mobile widget specifications each corresponding to one of a plurality of mobile widget classifications based on the mobile widget classification, wherein the respective one or more acceptable activity standards comprise a respective one or more classification-specific acceptable activity standards.

In another aspect, for example, at least one processor configured to manage a mobile widget on a wireless communication device is provided including a first module for tracking performance data corresponding to operation of a mobile widget on a wireless communication device. The processor may also include a second module for forwarding the tracked performance data across a wireless network for analysis. Moreover, the processor may further include a third module for receiving a widget disabling message based on a comparison of the performance data to a mobile widget specification, wherein the mobile widget specification comprises one or more acceptable activity standards for a respective one or more activities of an acceptable mobile widget. Further, the processor may include a fourth module for disabling the mobile widget based on the widget disabling message.

In yet another aspect, a computer program product for managing a mobile widget on a wireless communication device is provided including a computer readable medium. The computer readable medium may include at least one instruction for causing a computer to track performance data corresponding to operation of a mobile widget on a wireless communication device. The computer readable medium may also include at least one instruction for causing the computer to forward the tracked performance data across a wireless network for analysis. Further, the computer-readable medium may include at least one instruction for causing the computer to forward receive a widget disabling message based on a comparison of the performance data to a mobile widget specification, wherein the mobile widget specification comprises one or more acceptable activity standards for a respective one or more activities of an acceptable mobile widget. In addition, the computer-readable medium may include at least one instruction for causing the computer to forward disable the mobile widget based on the widget disabling message.

In still another aspect, for example, a wireless communication device operable to manage mobile widgets is provided including means for tracking performance data corresponding to operation of a mobile widget on a wireless communication device. In addition, the wireless communication device may also include means for forwarding the tracked performance data across a wireless network for analysis. Further, the wireless communication device may include means for receiving a widget disabling message based on a comparison of the performance data to a mobile widget specification, wherein the mobile widget specification comprises one or more acceptable activity standards for a respective one or more activities of an acceptable mobile widget. Moreover, the wireless communication device may include means for disabling the mobile widget based on the widget disabling message.

In another aspect, a wireless communication device operable to manage mobile widgets is provided including a memory comprising a widget management client, a mobile widget, and a disabling module. The wireless communication device may also include a processor in communication with the memory and operable to execute the widget management client and the disabling module; wherein the widget management client is operable to track performance data corresponding to operation of the mobile widget on the wireless communication device; wherein the widget management client is further operable to forward the tracked performance data across a wireless network for analysis; wherein the widget management client is further operable to receive a widget disabling message based on a comparison of the performance data to a mobile widget specification, wherein the mobile widget specification comprises one or more acceptable activity standards for a respective one or more activities of an acceptable mobile widget; and wherein the disabling module is operable to disable the mobile widget based on the widget disabling message.

The wireless communication device may further include wherein the disabling module is further operable to identify the mobile widget as an untrusted mobile widget based on the performance data not meeting the respective one or more acceptable activity standards. Further, the wireless communication device may include wherein the disabling module is further operable to disable an ability of the mobile widget to operate on a wireless network. In addition, the wireless communication device may further include wherein the disabling module is further operable to remove the mobile widget from the wireless communication device. The wireless communication device may further include wherein the disabling message further comprises a synchronization request message, wherein the widget management client is further operable to synchronize, based on the synchronization request message, an end user version of the mobile widget with a network version of the mobile widget to disable operation of the end user version of the mobile widget on the wireless network. Furthermore, the wireless communication device may include wherein the performance data comprises data collected from actual operation of the mobile widget on the wireless communication device.

In addition, the wireless communication device may further include wherein the widget management client is further operable to test the mobile widget according to a widget test protocol, wherein the performance data comprises data collected based on the test. The wireless communication device may also include wherein the respective one or more acceptable activity standards comprises a standard for a number of generated messages. Additionally, the wireless communication device may further include wherein the respective one or more acceptable activity standards comprises a standard for a type of generated message. Moreover, the wireless communication device may further include wherein the respective one or more acceptable activity standards comprises a standard for an amount of memory usage.

Further, the wireless communication device may also include wherein the respective one or more acceptable activity standards comprises a standard for an amount of processor usage. The wireless communication device may also include wherein the respective one or more acceptable activity standards comprises a standard for operator-specific activities. In addition, the wireless communication device may further include wherein the respective one or more acceptable activity standards comprises a standard for access to one or more resources on a corresponding wireless communication device. Moreover, the wireless communication device may further include wherein the respective one or more acceptable activity standards comprises a standard for a number of wireless connections. Furthermore, the wireless communication device may also include wherein the mobile widget corresponds to a widget classification, and wherein the mobile widget specification is selected from a plurality of mobile widget specifications each corresponding to one of a plurality of mobile widget classifications based on the mobile widget classification, wherein the respective one or more acceptable activity standards comprise a respective one or more classification-specific acceptable activity standards.

In yet another aspect, for example, a method for providing probability to mobile widgets is provided including providing for a mobile widget client that includes generic code operable to more than one platform and a plurality of platform specific codes operable to a specific platform, wherein the platform specific codes includes one or more operational modes. The method may also include implementing the mobile widget client in a plurality of platforms associated with the plurality of platform specific codes.

The method may further include wherein providing for the mobile widget client further comprises providing for the mobile widget client that includes a plurality of platform specific codes, wherein the platform specific codes include wireless device type-specific codes. In addition, the method may further include wherein providing for the mobile widget client that includes a plurality of wireless device type-specific codes further defines wireless device type as at least one of a wireless device category, or a wireless device manufacturer or a wireless device model.

Further, the method may also include wherein providing for the mobile widget client further comprises providing for the mobile widget client that includes a plurality of platform specific codes, wherein the platform specific codes include desktop specific codes.

In addition, the method may further include wherein providing for the mobile widget client further comprises providing for the mobile widget client that includes a plurality of platform specific codes each platform specific code including one or more operational modes, wherein the one or more operational modes include at least one of a standard operational mode, or a low memory operation mode or a compressed operation mode.

In still another aspect, for example, at least one processor configured to schedule a content update of a mobile widget is provided including a first module for providing for a mobile widget client that includes generic code operable to more than one platform and a plurality of platform specific codes operable to a specific platform, wherein the platform specific codes includes one or more operational modes. The processor may also include a second module for implementing the mobile widget client in a plurality of platforms associated with the plurality of platform specific codes.

In yet another aspect, a computer program product is provided including a computer-readable medium. The computer-readable medium may include at least one instruction for causing a computer to provide for a mobile widget client that includes generic code operable to more than one platform and a plurality of platform specific codes operable to a specific platform, wherein the platform specific codes includes one or more operational modes. The computer-readable medium may also include at least one instruction for causing the computer to implement the mobile widget client in a plurality of platforms associated with the plurality of platform specific codes.

In another aspect, for example, an apparatus is provided including means for providing for a mobile widget client that includes generic code operable to more than one platform and a plurality of platform specific codes operable to a specific platform, wherein the platform specific codes includes one or more operational modes. Further, the apparatus may include means for implementing the mobile widget client in a plurality of platforms associated with the plurality of platform specific codes.

In yet another aspect, a system for creating portability for mobile widgets is provided including a widget development module operable for providing a mobile widget client that includes generic code operable to more than one platform and a plurality of platform specific codes operable to a specific platform, wherein the platform specific codes includes one or more operational modes. In addition, the system may include a widget deployment module in communication with the widget development module that is operable implementing the mobile widget client in a plurality of platforms associated with the plurality of platform specific codes.

The system may further include wherein the widget development module is further operable to provide the mobile widget client that includes a plurality of platform specific codes, wherein the platform specific codes include wireless device-type specific codes. In addition, the system may further include wherein the widget development module is further operable to provide the mobile widget client that includes a plurality of wireless device-type specific codes further defines wireless device type as at least one of a wireless device category, or a wireless device manufacturer or a wireless device model.

Further, the system may also include wherein the widget development module is further operable to provide the mobile widget client that includes a plurality of platform specific codes, wherein the platform specific codes include desktop specific codes.

Moreover, the system may further include wherein the widget development module is further operable to provide the mobile widget client, that includes a plurality of platform specific codes each platform specific code including one or more operational modes, wherein the one or more operational modes include at least one of a standard operational mode, or a low memory operation mode or a compressed operation mode.

In still another aspect, for example, a method for generating content at a widget for upstream control of an event is provided including generating content at a mobile widget. The method may also include communicating the content to a network entity, wherein the mobile widget generated content is operable for controlling an event at the network entity.

The method may further include wherein generating content at a mobile widget further comprises generating an alert at the mobile widget based on an occurrence of a predetermined event. In addition, the method may further include wherein communicating the content further comprises communicating the alert to the network entity, wherein the alert is operable for notifying; a third party of the predetermined event that generated the alert. Alternatively, or in addition to, the method may further include wherein communicating the content further comprises communicating the alert to another wireless device.

In addition, the method may further include wherein communicating the content further comprises packaging content generated from more than one widget in a communication package and communicating the communication package to the network entity.

In another aspect, at least one processor configured to generate content at a widget and communicate the content for upstream control of an event is provided including a first module for generating content at a mobile widget. The processor may also include a second module for communicating the content to a network entity, wherein the mobile widget generated content is operable for controlling an event at the network entity.

In another aspect, a computer program product is provided including a computer-readable medium. The computer-readable medium may include at least one instruction for causing a computer to generate content at a mobile widget. Further, the computer-readable medium may also include at least one instruction for causing the computer to communicate the content to a network entity, wherein the mobile widget generated content is operable for controlling an event at the network entity.

In still another aspect, for example, an apparatus is provided including means for generating content at a mobile widget. Further, the apparatus may include means for communicating the content to a network entity, wherein the mobile widget generated content is operable for controlling an event at the network entity.

In yet another aspect, an apparatus for generating widget content and communicating the content for upstream control of an event is provided including a processor. In addition, the apparatus may include a memory in communication with the processor. Moreover, the apparatus may include at least one mobile widget client stored in the memory, executable by the processor and operable to generate content. Furthermore, the apparatus may include a communications module in communication with the processor and operable to communicate the content to a network entity, wherein the mobile widget generated content is operable for controlling an event at the network entity.

The apparatus may further include wherein one of the at least one mobile widget clients is further operable to generate an alert at the mobile widget based on an occurrence of a predetermined event. In addition, the apparatus may further include wherein the communications module is further operable to communicate the alert to the network entity, wherein the alert is operable for notifying a third party of the predetermined event that generated the alert. Moreover, the apparatus may further include wherein the communications module is further operable to communicate the alert to another wireless device. In addition, the apparatus may further include a content packaging module stored in the memory, executable by the processor and operable to package content generated from more than one widget in a communication package and wherein the communications module is further operable to communicate the communication package to the network entity.

In another aspect, for example, a method for controlling a network event based on content received from a mobile widget is provided including receiving, at a network entity, content generated at mobile widget executing on a wireless device. The method may also include controlling a predetermined event at the network entity based on received mobile widget-generated content.

The method may further include wherein receiving, at a network entity, content generated at a mobile widget, further comprises receiving, the network entity, an alert generated at the mobile widget. In addition, the method may further include wherein controlling a predetermined event further comprises notifying a third party of an event that generated the alert.

Further, the method may include wherein receiving, at the network entity, content generated at the mobile widget further comprises receiving a communication package that included more than one content generated from more than one mobile widget being executed at the wireless device.

In yet another aspect, at least one processor configured to control a network event based on content received from a mobile widget is provided including a first module for receiving content generated at mobile widget executing on a wireless device. The processor may also include a second module for controlling a predetermined event at the network entity based on received mobile widget-generated content.

In another aspect, for example, a computer program product is provided including a computer-readable medium. The computer-readable medium may include at least one instruction for causing a computer to receive content generated at mobile widget executing on a wireless device. Moreover, the computer-readable medium may also include at least one instruction for causing the computer to control a predetermined event at the network entity based on received mobile widget-generated content.

In another aspect, for example, an apparatus is provided including means for receiving, at a network entity, content generated at mobile widget executing on a wireless device. The apparatus may also include means for controlling a predetermined event, at the network entity based on received mobile widget-generated content.

In still another aspect, an apparatus for controlling a network event based on content received from a mobile widget is provided including a processor. Further, the apparatus may include a memory in communication with the processor. Moreover, the apparatus may also include a widget management module stored in the memory, executable by the processor and operable to receive content generated at mobile widget executing on a wireless device and control a predetermined event at the network entity based on received mobile widget-generated content.

The apparatus may further include wherein the widget management module is further operable to receive an alert generated from a mobile widget executing on the wireless device and notifying a third party of an alert triggering event that triggered generation of the alert at the mobile widget.

Moreover, the apparatus may further include wherein the widget management module is further operable to receive a content package that includes a plurality of content generated by a plurality of mobile widgets executing on the wireless device.

The various illustrative logics, logical blocks, modules, and circuits described in connection with the embodiments disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but, in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration. Additionally, at least one processor may comprise one or more modules operable to perform one or more of the steps and/or actions described above.

Further, the steps and/or actions of a method or algorithm described in connection with the aspects disclosed herein may be embodied directly in hardware, in a software module executed by a processor, or in a combination of the two. A software module may reside in RAM memory, flash memory, ROM memory, EPROM memory, EEPROM memory, registers, a hard disk, a removable disk, a CD-ROM, or any other form of storage medium known in the art. An exemplary storage medium may be coupled to the processor, such that the processor can read information from, and write information to, the storage medium. In the alternative, the storage medium may be integral to the processor. Further, in some aspects, the processor and the storage medium may reside in an ASIC. Additionally, the ASIC may reside in a user terminal. In the alternative, the processor and the storage medium may reside as discrete components in a user terminal. Additionally, in some aspects, the steps and/or actions of a method or algorithm may reside as one or any combination or set of codes and/or instructions on a machine readable medium and/or computer readable medium, which may be incorporated into a computer program product.

In one or more aspects, the functions described may be implemented in hardware, software, firmware, or any combination thereof. If implemented in software, the functions may be stored or transmitted as one or more instructions or code on a computer-readable medium. Computer-readable media includes both computer storage media and communication media including any medium that facilitates transfer of a computer program from one place to another. A storage medium may be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Also, any connection may be termed a computer-readable medium. For example, if software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk, and blu-ray disc where disks usually reproduce data magnetically, while discs usually reproduce data optically with lasers. Combinations of the above should also be included within the scope of computer-readable media.

While the foregoing disclosure discusses illustrative aspects and/or embodiments, it should be noted that various changes and modifications could be made herein without departing from the scope of the described aspects and/or embodiments as defined by the appended claims. Furthermore, although elements of the described aspects and/or embodiments may be described or claimed in the singular, the plural is contemplated unless limitation to the singular is explicitly stated. Additionally, all or a portion of any aspect and/or embodiment may be utilized with all or a portion of any other aspect and/or embodiment, unless stated otherwise.

What is claimed is:

1. A method of managing a mobile widget, comprising:
   receiving performance data corresponding to operation of a mobile widget;
   obtaining a mobile widget specification corresponding to the mobile widget, wherein the mobile widget specification includes one or more acceptable activity standards for a respective one or more activities of an acceptable mobile widget;
   comparing the performance data to the mobile widget specification;
   identifying the mobile widget either as a non-hostile mobile widget if the performance data meets the respective one or more acceptable activity standards or as a hostile mobile widget if the performance data does not meet the respective one or more acceptable activity standards; and
   storing, based on the identifying, an identification corresponding to the mobile widget that indicates whether or not the mobile widget is hostile or non-hostile.

2. The method of claim 1, wherein the identification corresponding to the mobile widget is a digital certificate.

3. The method of claim 1, wherein the one or more acceptable activity standards for the respective one or more activities include one or more of:
   a number of generated messages,
   a type of generated message, or
   an amount of memory usage, or
   an amount of processor usage, or
   operator-specific activities, or
   access to one or more resources on a corresponding wireless communication device,
   a number of wireless connections, or
   a given activity affecting performance of a wireless network or one or more devices on the wireless network, or
   any combination thereof.

4. The method of claim 1,
   wherein the one or more acceptable activity standards are specific to a particular type of mobile widget, and
   wherein one or more different acceptable activity standards are used to evaluate whether another mobile widget with a different type is a non-hostile mobile widget.

5. The method of claim 1, further comprising:
   if the identifying identifies the mobile widget as hostile mobile widget,
      disabling an ability of the untrusted hostile mobile widget to operate on a wireless network, or
      removing the hostile mobile widget from the wireless network, or
      changing a setting on a network device to disable an ability of a network version of the hostile mobile widget to operate on the wireless network, or
      transmitting a synchronization request message to a widget management client operating an end user version of the hostile mobile widget, wherein the synchronization request message is configured to cause the end user version of the hostile mobile widget to synchronize with the network version of the hostile mobile widget to disable operation of the end user version of the hostile mobile widget on the wireless network, or
      notifying a developer of the hostile mobile widget, wherein the notifying further includes forwarding the comparison of the performance data to the mobile widget specification, or
      notifying a user of the hostile mobile widget and allowing the end user of the hostile mobile widget to confirm disabling or removal of the hostile mobile widget, or
      any combination thereof.

6. The method of claim 1,
   wherein the performance data is received based on automated or manual testing of the mobile widget in a test or emulation environment, or
   wherein the performance data is received from one or more wireless communication devices that are deployed for operation with a wireless network while being configured to execute the mobile widget, or
   any combination thereof.

7. A method of managing a mobile widget on a wireless communication device, comprising:
   tracking performance data corresponding to operation of a mobile widget on a wireless communication device;
   forwarding the tracked performance data across a wireless network for analysis;
   receiving a widget disabling message based on a comparison of the performance data to a mobile widget specification, wherein the mobile widget specification includes one or more acceptable activity standards for a respective one or more activities of an acceptable mobile widget; and
   disabling the mobile widget based on the widget disabling message, wherein the one or more acceptable activity standards for the respective one or more activities further include one or more of:
a number of generated messages, or
an amount of memory usage, or
an amount of processor usage, or
a number of wireless connections, or
any combination thereof.

8. The method of claim 7, wherein the one or more acceptable activity standards for the respective one or more activities further include one or more of:
a type of generated message, or
operator-specific activities, or
access to one or more resources on a corresponding wireless communication device, or
a given activity affecting performance of a wireless network or one or more devices on the wireless network, or
any combination thereof.

9. The method of claim 7,
wherein the one or more acceptable activity standards are specific to a particular type of mobile widget, and
wherein one or more different acceptable activity standards are used to evaluate whether another mobile widget with a different type is a non-hostile mobile widget.

10. The method of claim 7, wherein the disabling is performed by an end user.

11. The method of claim 7,
wherein the disabling is performed by a network device that changes a setting so as to disable an ability of a network version of the mobile widget from operation on the wireless network, or
wherein the disabling includes transmitting a synchronization request message to a widget management client operating an end user version of a hostile mobile widget, wherein the synchronization request message is configured to cause the end user version of the hostile mobile widget to synchronize with the network version of the hostile mobile widget to disable operation of the end user version of the hostile mobile widget on the wireless network, or
any combination thereof.

12. The method of claim 7,
wherein the tracking of the performance data is based upon automated or manual testing of the mobile widget in a test or emulation environment, or
wherein the tracking of the performance data is based upon performance feedback that is received from one or more wireless communication devices that are deployed for operation with a wireless network while being configured to execute the mobile widget, or
any combination thereof.

13. A mobile widget manager, comprising:
a memory; and
at least one processor coupled to the memory and configured to:
receive performance data corresponding to operation of a mobile widget;
obtain a mobile widget specification corresponding to the mobile widget, wherein the mobile widget specification includes one or more acceptable activity standards for a respective one or more activities of an acceptable mobile widget;
compare the performance data to the mobile widget specification;
identify the mobile widget either as a non-hostile mobile widget if the performance data meets the respective one or more acceptable activity standards or as a hostile mobile widget if the performance data does not meet the respective one or more acceptable activity standards; and
storing an identification corresponding to the mobile widget that indicates whether or not the mobile widget is hostile or non-hostile.

14. The mobile widget manager of claim 13, wherein the identification corresponding to the mobile widget is a digital certificate.

15. The mobile widget manager of claim 13, wherein the one or more acceptable activity standards for the respective one or more activities include one or more of:
a number of generated messages,
a type of generated message, or
an amount of memory usage, or
an amount of processor usage, or
operator-specific activities, or
access to one or more resources on a corresponding wireless communication device,
a number of wireless connections, or
a given activity affecting performance of a wireless network or one or more devices on the wireless network, or
any combination thereof.

16. The mobile widget manager of claim 13,
wherein the one or more acceptable activity standards are specific to a particular type of mobile widget, and
wherein one or more different acceptable activity standards are used to evaluate whether another mobile widget with a different type is a non-hostile mobile widget.

17. A wireless communication device, comprising:
a memory; and
at least one processor coupled to the memory and configured to:
track performance data corresponding to operation of a mobile widget on a wireless communication device;
forward the tracked performance data across a wireless network for analysis;
receive a widget disabling message based on a comparison of the performance data to a mobile widget specification, wherein the mobile widget specification includes one or more acceptable activity standards for a respective one or more activities of an acceptable mobile widget; and
disable the mobile widget based on the widget disabling message,
wherein the one or more acceptable activity standards for the respective one or more activities further include one or more of:
a number of generated messages, or
an amount of memory usage, or
an amount of processor usage, or
a number of wireless connections, or
any combination thereof.

18. The wireless communication device of claim 17, wherein the one or more acceptable activity standards for the respective one or more activities further include one or more of:
a type of generated message, or
operator-specific activities, or
access to one or more resources on a corresponding wireless communication device, or a given activity affecting performance of a wireless network or one or more devices on the wireless network, or any combination thereof.

19. The wireless communication device of claim 17, wherein the one or more acceptable activity standards are specific to a particular type of mobile widget, and wherein one or more different acceptable activity standards are used to evaluate whether another mobile widget with a different type is a non-hostile mobile widget.

\* \* \* \* \*